US012567938B2

(12) United States Patent
Oteri et al.

(10) Patent No.: US 12,567,938 B2
(45) Date of Patent: *Mar. 3, 2026

(54) SSB AND RMSI MULTIPLEXING PATTERNS

(71) Applicant: Apple Inc., Cupertino, CA (US)

(72) Inventors: Oghenekome Oteri, San Diego, CA (US); Chunhai Yao, Beijing (CN); Chunxuan Ye, San Diego, CA (US); Dawei Zhang, Saratoga, CA (US); Haitong Sun, Cupertino, CA (US); Huaning Niu, San Jose, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,949

(22) Filed: Mar. 11, 2024

(65) Prior Publication Data

US 2024/0214168 A1 Jun. 27, 2024

Related U.S. Application Data

(63) Continuation of application No. 17/442,062, filed as application No. PCT/CN2021/071949 on Jan. 14, 2021, now Pat. No. 11,962,540.

(51) Int. Cl.
*H04L 5/00* (2006.01)
*H04W 72/1273* (2023.01)

(52) U.S. Cl.
CPC .......... *H04L 5/0064* (2013.01); *H04L 5/0053* (2013.01); *H04L 5/0094* (2013.01); *H04W 72/1273* (2013.01)

(58) Field of Classification Search
CPC ... H04L 5/0064; H04L 5/0053; H04L 5/0094; H04L 5/0048; H04L 5/0091; H04L 27/26025; H04L 5/0007; H04L 5/0044; H04L 27/2613; H04L 27/2666; H04L 5/0051; H04L 41/0806; H04L 5/0092;
(Continued)

(56) References Cited

U.S. PATENT DOCUMENTS

| | | | | |
|---|---|---|---|---|
| 11,962,540 B2 * | 4/2024 | Oteri | ..................... | H04L 5/0064 |
| 2018/0262313 A1 * | 9/2018 | Nam | ..................... | H04L 5/0044 |

(Continued)

FOREIGN PATENT DOCUMENTS

CN 110932828 A 3/2020

OTHER PUBLICATIONS

"3rd Generation Partnership Project; Technical Specification Group Radio Access Network; NR; Physical layer procedures for control (Release 16)" , 3GPP TS 38.213 V16.4.0 , Dec. 2020 , 181 pages.
(Continued)

*Primary Examiner* — Nimesh Patel
(74) *Attorney, Agent, or Firm* — Kilpatrick Townsend & Stockton LLP

(57) ABSTRACT
The present application relates to devices and components including apparatus, systems, and methods related to multiplexing patterns for synchronization signal/physical broadcast channel block (SSB) and remaining minimum system information (RMSI).

20 Claims, 30 Drawing Sheets

100

(58) Field of Classification Search

CPC ....... H04L 5/00; H04L 1/0009; H04L 1/0025; H04L 5/003; H04L 5/0073; H04L 1/1607; H04L 1/1812; H04L 1/1822; H04L 1/1864; H04L 1/1854; H04L 1/189; H04L 1/1896; H04L 27/261; H04L 5/0023; H04L 5/0096; H04W 72/1273; H04W 72/0446; H04W 72/0453; H04W 72/04; H04W 48/12; H04W 72/23; H04W 72/30; H04W 56/001; H04W 56/00; H04W 16/14; H04W 48/10; H04W 56/0015; H04W 56/0025; H04W 72/12; H04W 74/0808; H04W 72/54; H04W 8/22; H04W 72/20; H04W 74/006; H04W 48/08; H04W 52/42; H04W 72/044; H04W 72/046; H04W 72/232; H04W 72/25; H04W 16/28; H04W 28/0289; H04W 36/0064; H04W 52/0212; H04W 72/231; H04W 74/002; Y02D 30/70; H04B 7/0695; H04B 17/318; H04B 7/06952; H04B 7/008; H04B 17/373; H04B 7/0404; H04B 7/0617; H04B 7/0691; H04B 7/15528; H04B 17/382; H04B 7/0413

USPC ................ 370/329, 328, 338, 341, 345, 350

See application file for complete search history.

(56) References Cited

U.S. PATENT DOCUMENTS

| | | | |
|---|---|---|---|
| 2019/0132882 A1 | 5/2019 | Li et al. | |
| 2019/0363809 A1 | 11/2019 | Yoon et al. | |
| 2020/0059927 A1* | 2/2020 | Sun | ...................... H04L 5/0053 |
| 2020/0154446 A1 | 5/2020 | Yerramalli et al. | |
| 2020/0228275 A1* | 7/2020 | Li | ...................... H04W 2/0446 |
| 2020/0329494 A1 | 10/2020 | Mondal et al. | |
| 2021/0007066 A1* | 1/2021 | Lin | ...................... H04L 5/0053 |

OTHER PUBLICATIONS

"3rd Generation Partnership Project; Technical Specification Group Radio Access Network; NR; Physical layer procedures for data (Release 16)" , 3GPP TS 38.214 V16.4.0 , Dec. 2020 , 169 pages.

"3rd Generation Partnership Project; Technical Specification Group Radio Access Network; Study on requirements for NR beyond 52.6 GHZ (Release 16)" , 3GPP TR 38.807 V16.0.0, Dec. 2019 , 68 pages.

"New SID: Study on Supporting NR from 52.6GHz to 71 GHZ" , Intel Corporation, 3GPP TSG RAN Meeting #86, RP-193259 , Dec. 9-12, 2019 , 3 pages.

"New WID on Extending Current NR Operation to 71GHz" , 3GPP TSG RAN Meeting #86, RP-193229 , Dec. 9-12, 2019 , 5 pages.

"Revised SID: Study on Supporting NR from 52.6GHz to 71 GHZ" , Intel Corporation, 3GPP TSG RAN Meeting #88e, RP-200902 , Jun. 29-Jul. 3, 2020 , 3 pages.

"Summary of Offline Discussion on RMSI" , CATT, 3GPP TSG RAN WG1 Meeting #92bis, R1-1803731 , Apr. 16-20, 2018 , 15 pages.

"Summary of Offline Discussion on RMSI" , CATT, 3GPP TSG RAN WG1 Meeting #92bis, R1-1805600 , Apr. 16-20, 2018 , 17 pages.

The U.S. Appl. No. 17/442,062, "Notice of Allowance," mailed Nov. 27, 2023, 9 pages.

The International Application No. PCT/CN2021/071949, "International Preliminary Report on Patentability," mailed Jul. 27, 2023, 6 pages.

The International Application No. PCT/CN2021/071949, "International Search Report and Written Opinion," mailed Oct. 14, 2021, 9 pages.

* cited by examiner

200 frequency

Pattern 1

300 frequency

Pattern 2

400

Pattern 3

900 902 904

| Row Index | Dmrs-TypeA-Position | PDSCH mapping type | $K_0$ | $S$ | $L$ |
|---|---|---|---|---|---|
| 1 | 2,3 | Type B | 0 | 2 | 3 |
| 2 | 2,3 | Type B | 0 | 4 | 3 |
| 3 | 2,3 | Type B | 0 | 6 | 3 |
| 4 | 2,3 | Type B | 0 | 8 | 3 |
| 5 | 2,3 | Type B | 0 | 10 | 2 |
| 6 | 2,3 | Type B | 1 | 2 | 3 |
| 7 | 2,3 | Type B | 1 | 4 | 3 |
| 8 | 2,3 | Type B | 0 | 2 | 6 |
| 9 | 2,3 | Type B | 0 | 4 | 6 |
| 10 | 2,3 | Type B | 0 | 6 | 6 |
| 11 | 2,3 | Type B | 0 | 8 | 6 |
| 12 (Note 1) | 2,3 | Type B | 0 | 10 | 6 |
| 13 (Note 1) | 2,3 | Type B | 0 | 2 | 7 |
| 14 (Note 1) | 2 | Type A | 0 | 2 | 12 |
| 15 | 2 | Type A | 0 | 3 | 11 |
| 16 | 3 | Reserved | 1 | 2 | 6 |

Note 1: If the PDSCH was scheduled with SI-RNTI in PDCCH Type0 common search space, the UE may assume that this PDSCH resource allocation is not applied

Figure 9

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 4 |
| 2 | 1 | 48 | 1 | 14 |
| 3 | 1 | 48 | 2 | 14 |
| 4 | 3 | 24 | 2 | $-20$ if $k_{SSB}=0$ <br> $-21$ if $k_{SSB}>0$ |
| 5 | 3 | 24 | 2 | 24 |
| 6 | 3 | 48 | 2 | $-20$ if $k_{SSB}=0$ <br> $-21$ if $k_{SSB}>0$ |
| 7 | 3 | 48 | 2 | 48 |
| 8 | 3 | 96 | 2 | $-20$ if $k_{SSB}=0$ <br> $-21$ if $k_{SSB}>0$ |
| 9 | 3 | 96 | 2 | 36 |
| 10 | 3 | 24 | 1 | $-20$ if $k_{SSB}=0$ <br> $-21$ if $k_{SSB}>0$ |
| 11 | 3 | 24 | 1 | 24 |
| 12 | 2 | 48 | 1 | 49 |
| 13 | | | Reserved | |
| 14 | | | Reserved | |
| 15 | | | Reserved | |

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 48 | 1 | 0 |
| 1 | 1 | 48 | 1 | 8 |
| 2 | 1 | 48 | 2 | 0 |
| 3 | 1 | 48 | 2 | 8 |
| 4 | 2 | 24 | 1 | $-41$ if $k_{SSB}=0$ <br> $-42$ if $k_{SSB}>0$ |
| 5 | 2 | 24 | 1 | 25 |
| 6 | 2 | 48 | 1 | $-41$ if $k_{SSB}=0$ <br> $-42$ if $k_{SSB}>0$ |
| 7 | 2 | 48 | 1 | 49 |
| 8 | 2 | 96 | 1 | $-41$ if $k_{SSB}=0$ <br> $-42$ if $k_{SSB}>0$ |
| 9 | 3 | 48 | 1 | |
| 10 | | | Reserved | |
| 11 | | | Reserved | |
| 12 | | | Reserved | |
| 13 | | | Reserved | |
| 14 | | | Reserved | |
| 15 | | | Reserved | |

| | SSB SCS | Data SCS | Ratio | Existing | Max pattern (New) | NOTE |
|---|---|---|---|---|---|---|
| Design 1 | 120 | 120 | 1 | 1,3 | | Discussed in Rel 15. No adopted |
| Design 2 | 120 | 480 | 4 | | 2 | 2.x: allows early CORESET decoding |
| Design 3 | 120 | 960 | 8 | | 2 | 2.x: allows early CORESET decoding |
| Design 4 | 120 | 120 | 1 | | 3 | Reduced RMSI payload. May increase # PRBs to increase payload |
| Design 5 | 120 | 480 | 4 | | 3.x | 3.x FDM but not perfect overlap. May repeat, increase RMSI or reduce BW to not change AGC |
| Design 6 | 120 | 960 | 8 | | 3.x | 3.x FDM but not perfect overlap. May repeat, increase RMSI or reduce BW to not change AGC |

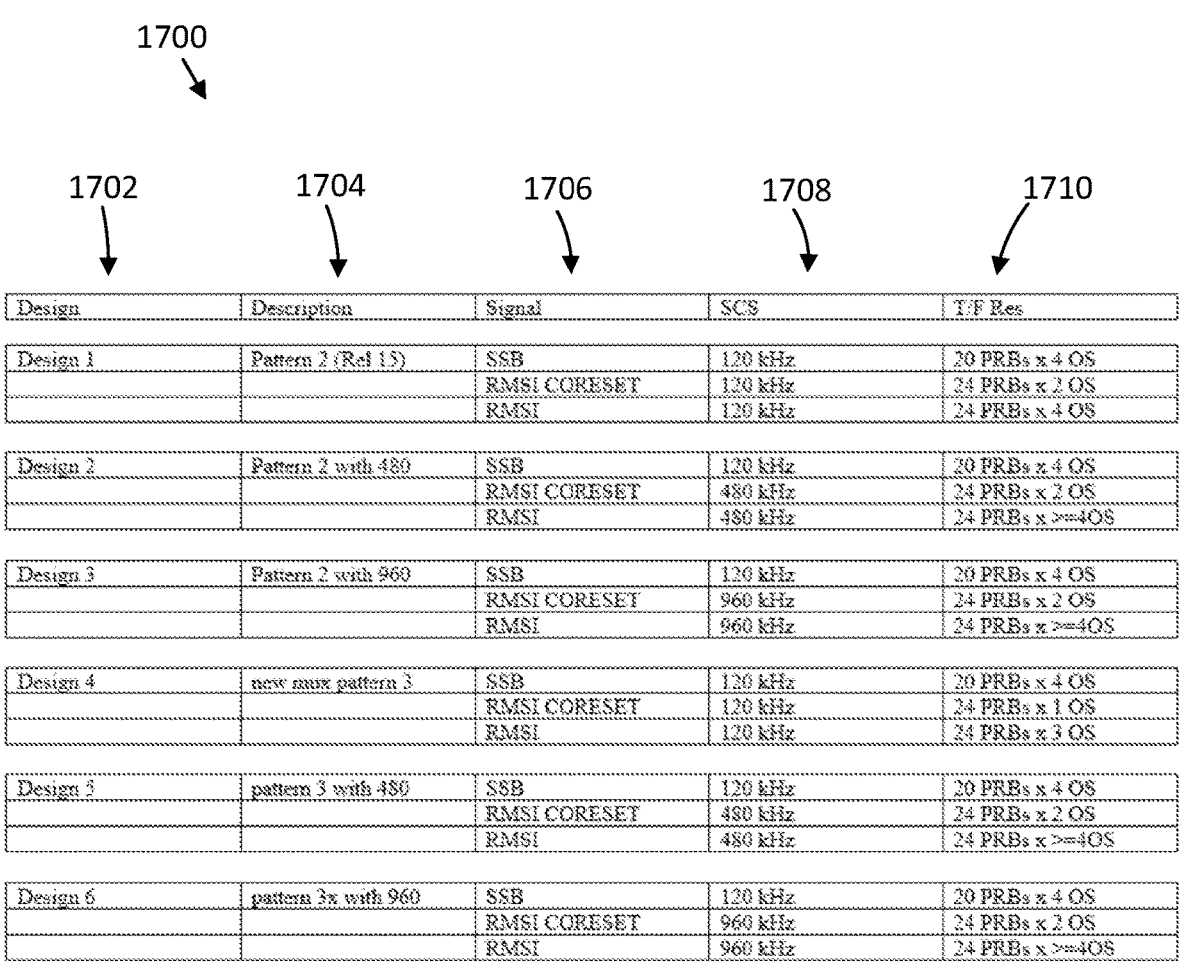

| Design | Description | Signal | SCS | T/F Res |
|---|---|---|---|---|
| Design 1 | Pattern 2 (Rel 15) | SSB | 120 kHz | 20 PRBs x 4 OS |
| | | RMSI CORESET | 120 kHz | 24 PRBs x 2 OS |
| | | RMSI | 120 kHz | 24 PRBs x 4 OS |
| Design 2 | Pattern 2 with 480 | SSB | 120 kHz | 20 PRBs x 4 OS |
| | | RMSI CORESET | 480 kHz | 24 PRBs x 2 OS |
| | | RMSI | 480 kHz | 24 PRBs x >=4OS |
| Design 3 | Pattern 2 with 960 | SSB | 120 kHz | 20 PRBs x 4 OS |
| | | RMSI CORESET | 960 kHz | 24 PRBs x 2 OS |
| | | RMSI | 960 kHz | 24 PRBs x >=4OS |
| Design 4 | new mux pattern 3 | SSB | 120 kHz | 20 PRBs x 4 OS |
| | | RMSI CORESET | 120 kHz | 24 PRBs x 1 OS |
| | | RMSI | 120 kHz | 24 PRBs x 3 OS |
| Design 5 | pattern 3 with 480 | SSB | 120 kHz | 20 PRBs x 4 OS |
| | | RMSI CORESET | 480 kHz | 24 PRBs x 2 OS |
| | | RMSI | 480 kHz | 24 PRBs x >=4OS |
| Design 6 | pattern 3x with 960 | SSB | 120 kHz | 20 PRBs x 4 OS |
| | | RMSI CORESET | 960 kHz | 24 PRBs x 2 OS |
| | | RMSI | 960 kHz | 24 PRBs x >=4OS |

| 1902 | SSB SCS | Data SCS 1904 | Ratio 1906 | Existing | Mux pattern (New) 1910 | NOTE 1912 |
|---|---|---|---|---|---|---|
| Design 7 | 240 | 120 | 0.5 | | 2 | Rel 15 |
| Design 8 | 240 | 480 | 2 | | 2 | 2 x: allows early CORESET decoding |
| Design 9 | 240 | 960 | 4 | | 2 | 2 x: allows early CORESET decoding |
| Design 10 | 240 | 120 | 0.5 | | 3 | May increase # PRBs to increase payload |
| Design 11 | 240 | 480 | 2 | | 3.x | 3 x FDM but not perfect overlap. May repeat, increase RMSI or reduce BW to not change AGC |
| Design 12 | 240 | 960 | 4 | | 3.x | 3 x FDM but not perfect overlap. May repeat, increase RMSI or reduce BW to not change AGC |

2002        2004        2006        2008        2010

| Design | Description | Signal | SCS | T/F Res |
|---|---|---|---|---|
| Design 7 | Pattern 2 (Rel 15) | SSB | 240 kHz | 20 PRBs x 4 OS |
| | | RMSI CORESET | 120 kHz | 48 PRBs x 1 OS |
| | | RMSI | 120 kHz | 48 PRBs x 2 OS |
| Design 8 | Pattern 2 with 480 | SSB | 240 kHz | |
| | | RMSI CORESET | 480 kHz | 48 PRBs x 1 OS |
| | | RMSI | 480 kHz | 48 PRBs x >= 4 OS |
| Design 9 | Pattern 2 with 960 | SSB | 240 kHz | 20 PRBs x 4 OS |
| | Option 1 | RMSI CORESET | 960 kHz | 48 PRBs x 1 OS |
| | | RMSI | 960 kHz | 48 PRBs x 4 OS |
| | Option 2 | RMSI CORESET | 960 kHz | 24 PRBs x 2 OS |
| | | RMSI | 120 kHz | 24 PRBs x 8 OS |
| Design 10 | Pattern 3 | SSB | 240 kHz | 20 PRBs x 4 OS |
| | | RMSI CORESET | 120 kHz | 48 PRBs x 1 OS |
| | | RMSI | 120 kHz | 48 PRBs x 1 OS |
| Design 11 | Pattern 3 with 480 | SSB | 240 kHz | 20 PRBs x 4 OS |
| | | RMSI CORESET | 480 kHz | 48 PRBs x 1 OS |
| | | RMSI | 480 kHz | 48 PRBs x 4 OS |
| Design 12 | Pattern 3 with 960 | SSB | 240 kHz | 20 PRBs x 4 OS |
| | Option 1 | RMSI CORESET | 960 kHz | 48 PRBs x 1 OS |
| | | RMSI | 960 kHz | 48 PRBs x 4 OS |
| | Option 2 | RMSI CORESET | 960 kHz | 24 PRBs x 2 OS |
| | | RMSI | 960 kHz | 48 PRBs x 8 OS |

Figure 22:
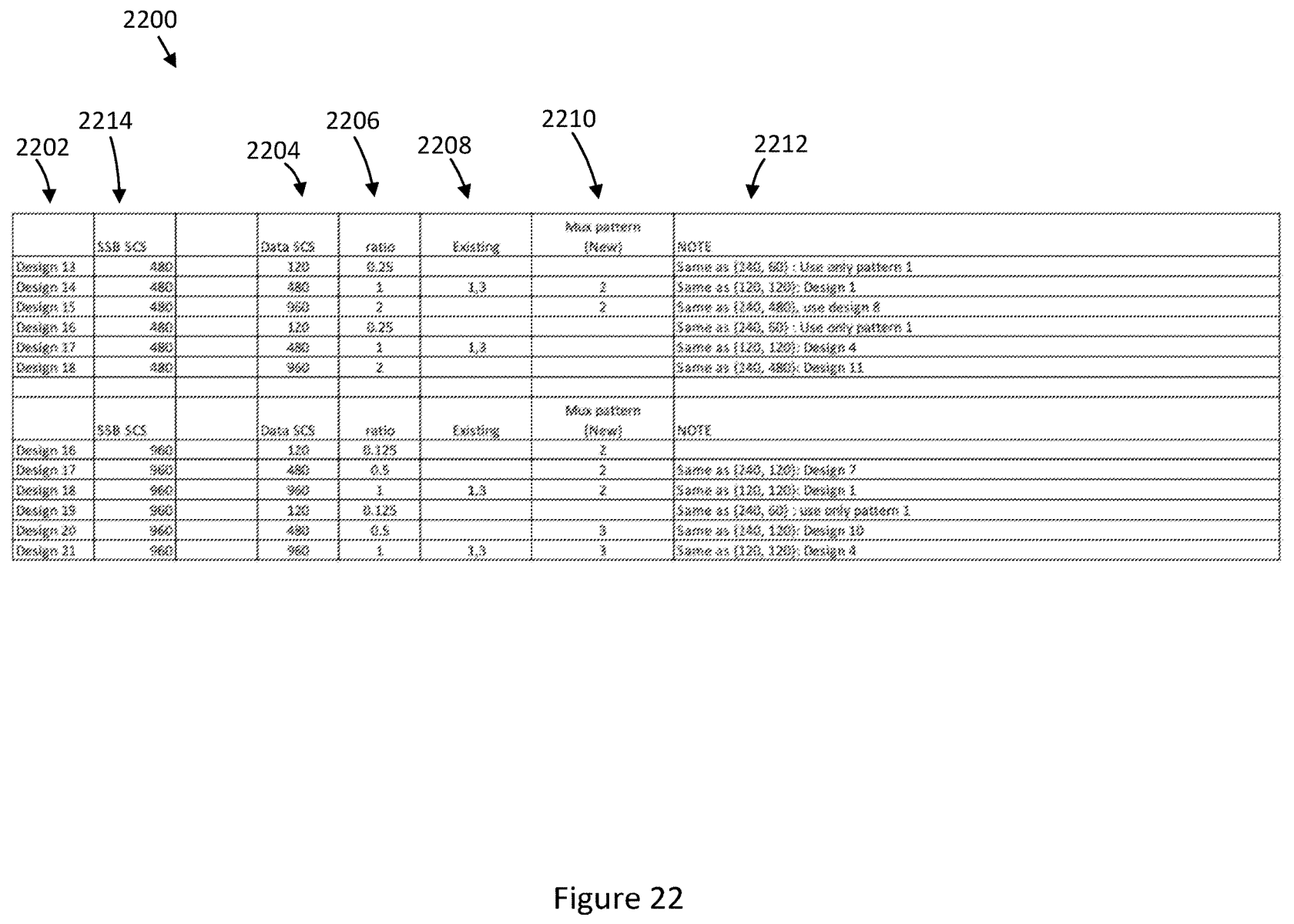

| | SSB SCS | Data SCS | ratio | Existing | Mux pattern (New) | NOTE |
|---|---|---|---|---|---|---|
| Design 13 | 480 | 120 | 0.25 | | | Same as {240, 60} : Use only pattern 1 |
| Design 14 | 480 | 480 | 1 | 1,3 | 1 | Same as {120, 120}: Design 1 |
| Design 15 | 480 | 960 | 2 | | 2 | Same as {240, 480}: use design 8 |
| Design 16 | 480 | 120 | 0.25 | | | Same as {240, 60} : Use only pattern 1 |
| Design 17 | 480 | 480 | 1 | 1,3 | | Same as {120, 120}: Design 4 |
| Design 18 | 480 | 960 | 2 | | | Same as {240, 480}: Design 11 |

| | SSB SCS | Data SCS | ratio | Existing | Mux pattern (New) | NOTE |
|---|---|---|---|---|---|---|
| Design 16 | 960 | 120 | 0.125 | | 2 | Same as {240, 120}: Design 7 |
| Design 17 | 960 | 480 | 0.5 | | 2 | Same as {120, 120}: Design 1 |
| Design 18 | 960 | 960 | 1 | 1,3 | 2 | Same as {240, 60} : use only pattern 1 |
| Design 19 | 960 | 120 | 0.125 | | 3 | Same as {240, 120}: Design 10 |
| Design 20 | 960 | 480 | 0.5 | | | Same as {120, 120}: Design 4 |
| Design 21 | 960 | 960 | 1 | 1,3 | 1 | Same as {120, 120}: Design 4 |

| Design | Description | Signal | SCS | T/F Res |
|---|---|---|---|---|
| Design 1 new | New SSB pattern | SSB | 120 kHz | 20 PRBs x 4 OS |
| | Mux Pattern 2 | RMSI CORESET | 120 kHz | 24 PRBs x 2 OS |
| | | RMSI | 120 kHz | 24 PRBs x 4 OS |
| Design 2 new | New SSB pattern | SSB | 120 kHz | 20 PRBs x 4 OS |
| | Mux Pattern 2 | RMSI CORESET | 480 kHz | 24 PRBs x 2 OS |
| | | RMSI | 480 kHz | 24 PRBs x 4 OS |
| Design 3 new | New SSB pattern | SSB | 120 kHz | 20 PRBs x 4 OS |
| | Mux Pattern 2 | RMSI CORESET | 960 kHz | 24 PRBs x 2 OS |
| | | RMSI | 960 kHz | 24 PRBs x 4 OS |
| Design 4 new | New SSB pattern | SSB | 120 kHz | 20 PRBs x 4 OS |
| | Mux Pattern 3 | RMSI CORESET | 120 kHz | 24 PRBs x 2 OS |
| | | RMSI | 120 kHz | 24 PRBs x 4 OS |
| Design 5 new | New SSB pattern | SSB | 120 kHz | 20 PRBs x 4 OS |
| | Mux Pattern 3 | RMSI CORESET | 480 kHz | 24 PRBs x 2 OS |
| | | RMSI | 480 kHz | 24 PRBs x 4 OS |
| Design 6 new | New SSB pattern | SSB | 120 kHz | 20 PRBs x 4 OS |
| | Mux Pattern 3 | RMSI CORESET | 960 kHz | 24 PRBs x 2 OS |
| | | RMSI | 960 kHz | 24 PRBs x 4 OS |

| Design | Description | Signal | SCS | T/F Res |
|---|---|---|---|---|
| Design 7 new | New SSB Pattern, Mux2 | SSB | 240 kHz | 20 PRBs x 4 OS |
|  | Option 1 | RMSI CORESET | 120 kHz | 48 PRBs x 1 OS |
|  |  | RMSI | 120 kHz | 48 PRBs x 2 OS |
|  |  |  |  |  |
|  | Option 2 | RMSI CORESET | 120 kHz | 48 PRBs x 1 OS |
|  |  | RMSI | 120 kHz | 48 PRBs x 2 OS |
|  |  |  |  |  |
|  | Option 3 | SSB | 240 kHz | 20 PRBs x 4 OS |
|  |  | RMSI CORESET | 120 kHz | 48 PRBs x 1 OS |
|  |  | RMSI | 120 kHz | 48 PRBs x 2 OS |
| Design 8 new | Pattern 2 with 480 | SSB | 240 kHz | 20 PRBs x 4 OS |
|  | Option 1 | RMSI CORESET | 480 kHz | 48 PRBs x 1 OS |
|  |  | RMSI | 480 kHz | 48 PRBs x 4 OS |
|  |  |  |  |  |
|  | Option 2 | RMSI CORESET | 480 kHz | 24 PRBs x 2 OS |
|  |  | RMSI | 480 kHz | 24 PRBs x 8 OS |
| Design 9 new | Pattern 2 with 960 | SSB | 240 kHz | 20 PRBs x 4 OS |
| Mux 2 | Option 1 | RMSI CORESET | 960 kHz | 48 PRBs x 1 OS |
|  |  |  |  |  |
|  |  | RMSI | 960 kHz | 48 PRBs x 4 OS |
|  |  |  |  |  |
|  | Option 2 | RMSI CORESET | 960 kHz | 24 PRBs x 1 OS |
|  |  |  |  |  |
|  |  | RMSI | 960 kHz | 24 PRBs x 4 OS |
| Design 10 new | New SSB Pattern, Mux3 | SSB | 240 kHz | 20 PRBs x 4 OS |
|  |  | RMSI CORESET | 120 kHz | 48 PRBs x 1 OS |
|  |  | RMSI | 120 kHz | 48 PRBs x 2 OS |
| Design 11 new | Pattern 3 with 480 | SSB | 240 kHz | 20 PRBs x 4 OS |
|  |  | RMSI CORESET | 120 kHz | 48 PRBs x 1 OS |
|  |  | RMSI | 120 kHz | 48 PRBs x 1 OS |
| Design 12 new | Pattern 3 with 960 | SSB | 240 kHz | 20 PRBs x 4 OS |
|  | Option 1 | RMSI CORESET | 960 kHz | 48 PRBs x 1 OS |
|  |  |  |  |  |
|  |  | RMSI | 960 kHz | 48 PRBs x 4 OS |
|  |  |  |  |  |
|  | Option 2 | RMSI CORESET | 960 kHz | 48 PRBs x 1 OS |
|  |  |  |  |  |
|  |  | RMSI | 960 kHz | 48 PRBs x 4 OS |

2802    Determining a Value of a SSB SCS

2804    Determining a Value of an RMSI SCS

2806    Determining whether the Value of the SSB SCS is equal to the Value of the RMSI SCS 2808    Determining Characteristics of a Multiplexing Pattern 2810    Transmitting an Indication of the Determined Multiplexing Pattern

2900

2902 — Identifying an Indication of a Multiplexing Pattern

2904 — Identifying a SSB and RMSI Transmission

2906 — Processing the SSB and RMSI Transmission

3000
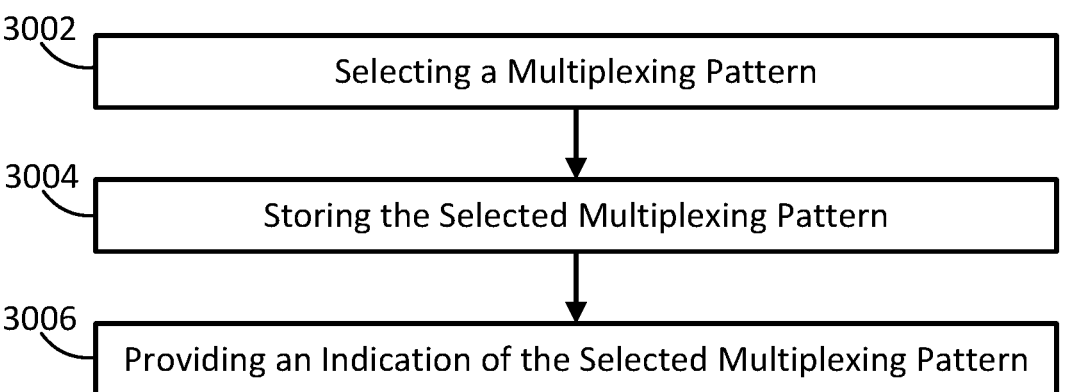
3002
Selecting a Multiplexing Pattern
3004
Storing the Selected Multiplexing Pattern
3006
Providing an Indication of the Selected Multiplexing Pattern
Figure 30

3100

3102 — Determining a RMSI SCS

3104 — Determining a SSB SCS

3106 — Determining that the SSB SCS is less than the RMSI SCS

3108 — Determining a Number of Symbols

3110 — Determining a Use for Excess RMSI OFDM Symbols

3112 — Providing an Indication of the Number of Symbols

3200
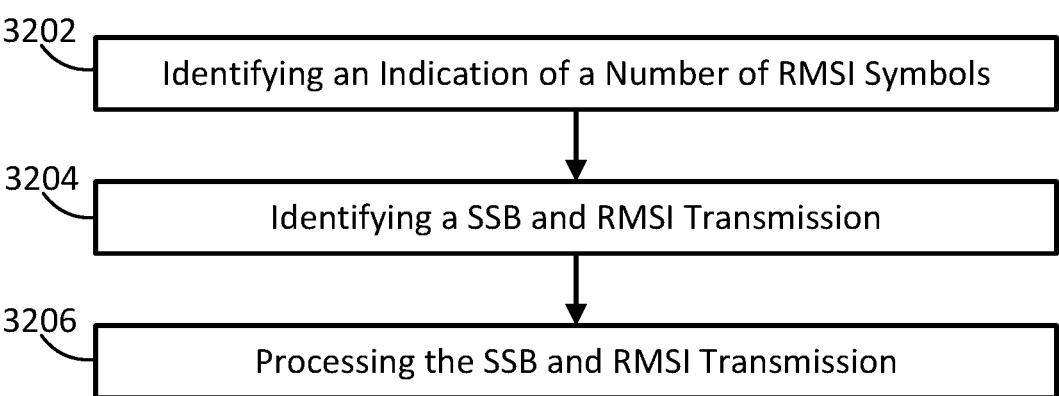
3202 — Identifying an Indication of a Number of RMSI Symbols
3204 — Identifying a SSB and RMSI Transmission
3206 — Processing the SSB and RMSI Transmission
Figure 32

3300
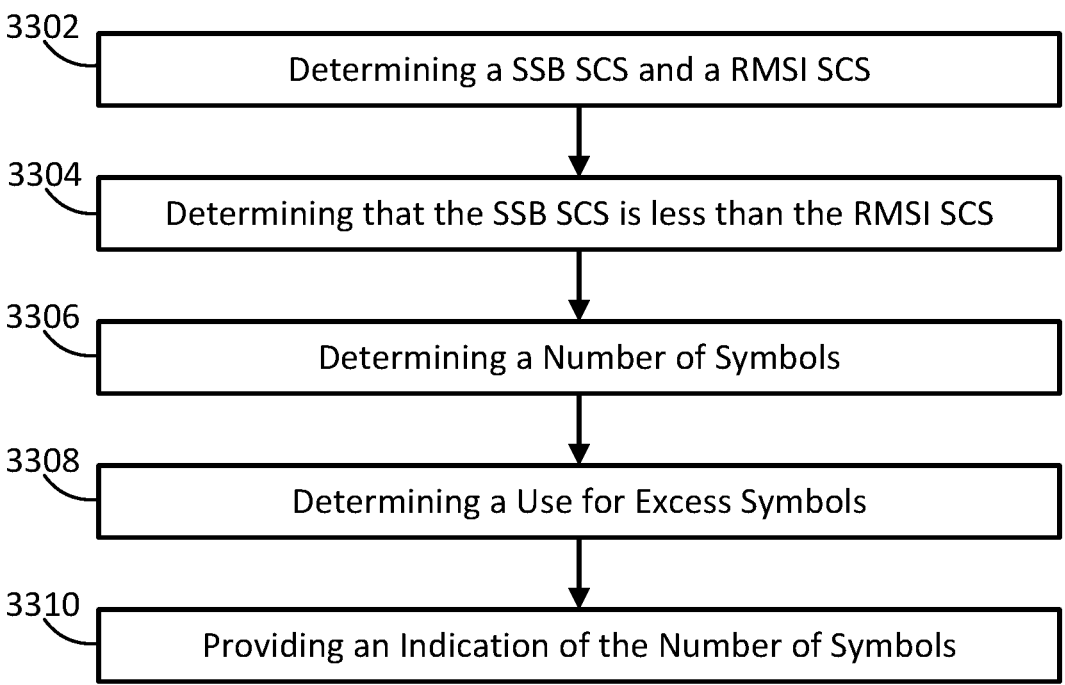
3302    Determining a SSB SCS and a RMSI SCS
3304    Determining that the SSB SCS is less than the RMSI SCS
3306    Determining a Number of Symbols
3308    Determining a Use for Excess Symbols
3310    Providing an Indication of the Number of Symbols
Figure 33

SSB AND RMSI MULTIPLEXING PATTERNS

CROSS-REFERENCE TO RELATED APPLICATIONS

This application claims is a continuation of U.S. nonprovisional application Ser. No. 17/442,062, entitled "SSB and RMSI Multiplexing Patterns," filed on Sep. 22, 2021, that is a national entry application of Patent Cooperation Treaty application No. PCT/CN2021/071949, entitled "SSB and RMSI Multiplexing Patterns," filed on Jan. 14, 2021, the disclosures of which are incorporated by reference herein in their entireties for all purposes.

BACKGROUND

In Third Generation Partnership Project (3GPP) networks, transmissions between NodeBs and user equipments may have set layouts of elements in the time and frequency domains to facilitate processing of the elements. In some instances, patterns have developed, such synchronization signal/physical broadcast channel (SSB) and control resource set (CORESET) multiplexing patterns, that define relationships between the elements in the time and frequency domains for a transmission.

BRIEF DESCRIPTION OF THE DRAWINGS

FIG. 9 illustrates example default physical downlink shared channel (PDSCH) time domain resource allocation for new radio (NR) operating between 52.6 gigahertz (GHz) and 71 GHz in accordance with some embodiments.

FIG. 12 illustrates example details for a set of resource blocks and slot symbols of control resource set (CORESET) for Type0-physical downlink control channel (PDCCH) search space set when {synchronization signal (SS)/physical broadcast channel (PBCH) block, PDCCH} subcarrier spacing (SCS) is {120, 120} kHz in accordance with some embodiments.

FIG. 13 illustrates example details for a set of resource blocks and slot symbols of CORESET for Type0-PDCCH search space set when {SSB, PDCCH} SCS is {240, 120} kHz in accordance with some embodiments.

FIG. 16 illustrates example details for some designs utilizing legacy SSB and at 120 kHz SCS in accordance with some embodiments.

FIG. 17 illustrates example details for the designs described of FIG. 16 in accordance with some embodiments.

FIG. 18 illustrates example configurations of the designs of FIG. 16 in accordance with some embodiments.

FIG. 19 illustrates example details for some designs utilizing legacy SSB and at 240 kHz SCS in accordance with some embodiments.

FIG. 20 illustrates example details for the designs described of FIG. 19 in accordance with some embodiments.

FIG. 21 illustrates example configurations of the designs of FIG. 16 in accordance with some embodiments.

FIG. 22 illustrates example details for some designs utilizing SSB and at 480 kHz SCS and 960 kHz SCS in accordance with some embodiments.

FIG. 23 illustrates example details for the enhanced designs in accordance with some embodiments.

FIG. 24 illustrates example configurations of the designs of FIG. 23 in accordance with some embodiments.

FIG. 25 illustrates example details for the enhanced designs in accordance with some embodiments.

FIG. 26 illustrates example configurations 2600 of a first portion of the designs of FIG. 25 in accordance with some embodiments.

FIG. 27 illustrates example configurations 2700 of a second portion of the designs of FIG. 25 in accordance with some embodiments.

FIG. 30 illustrates an example procedure for providing a selected multiplexing pattern in accordance with some embodiments.

FIG. 32 illustrates an example procedure for processing an SSB and RMSI transmission in accordance with some embodiments.

FIG. 33 illustrates an example procedure for determining a use for excess symbols in a multiplexing pattern in accordance with some embodiments.

DETAILED DESCRIPTION

Figure 1:
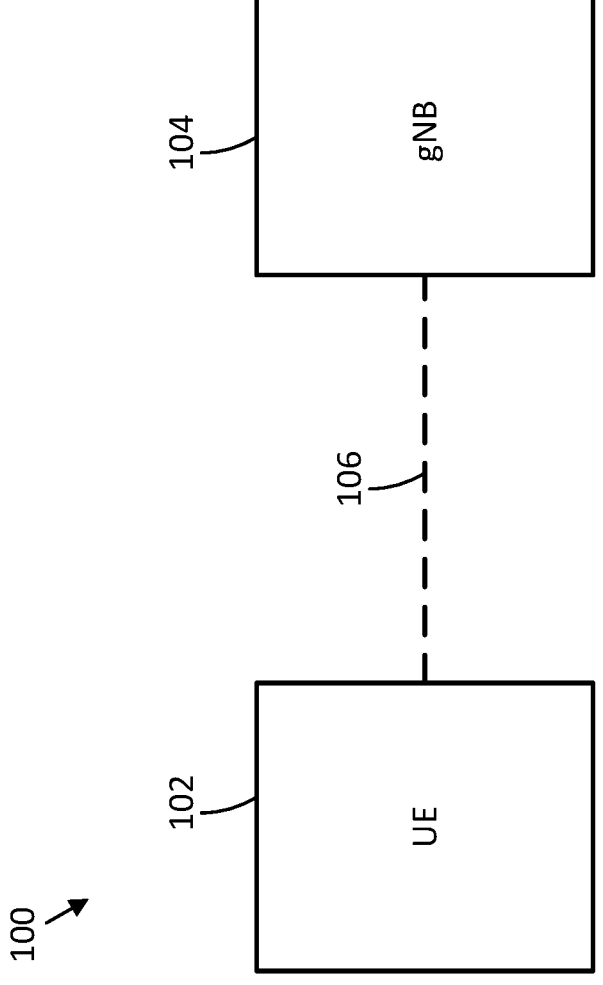
FIG. 1 illustrates an example network arrangement in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Frequencies between 52.6 gigahertz (GHz) and 71 GHz are of interest in short term because of proximity to sub-52.6 GHz (current new radio (NR) system) and commercial opportunities for high data rate communications, for example, (un)licensed spectrum between 57 GHz and 71 GHz. For example, operation of a wireless network within the 52.6 GHz to 71 GHz range is a developing area with much undefined operation and a high demand for defining operation within the 52.6 GHz to 71 GHz range. The feasibility of using legacy waveforms and required changes for frequencies between 52.6 GHz and 71 GHz may be beneficial to take advantage these opportunities by minimizing specification burden and maximizing the leverage of frequency range 2 (FR2)-based implementations.

Figure 35:
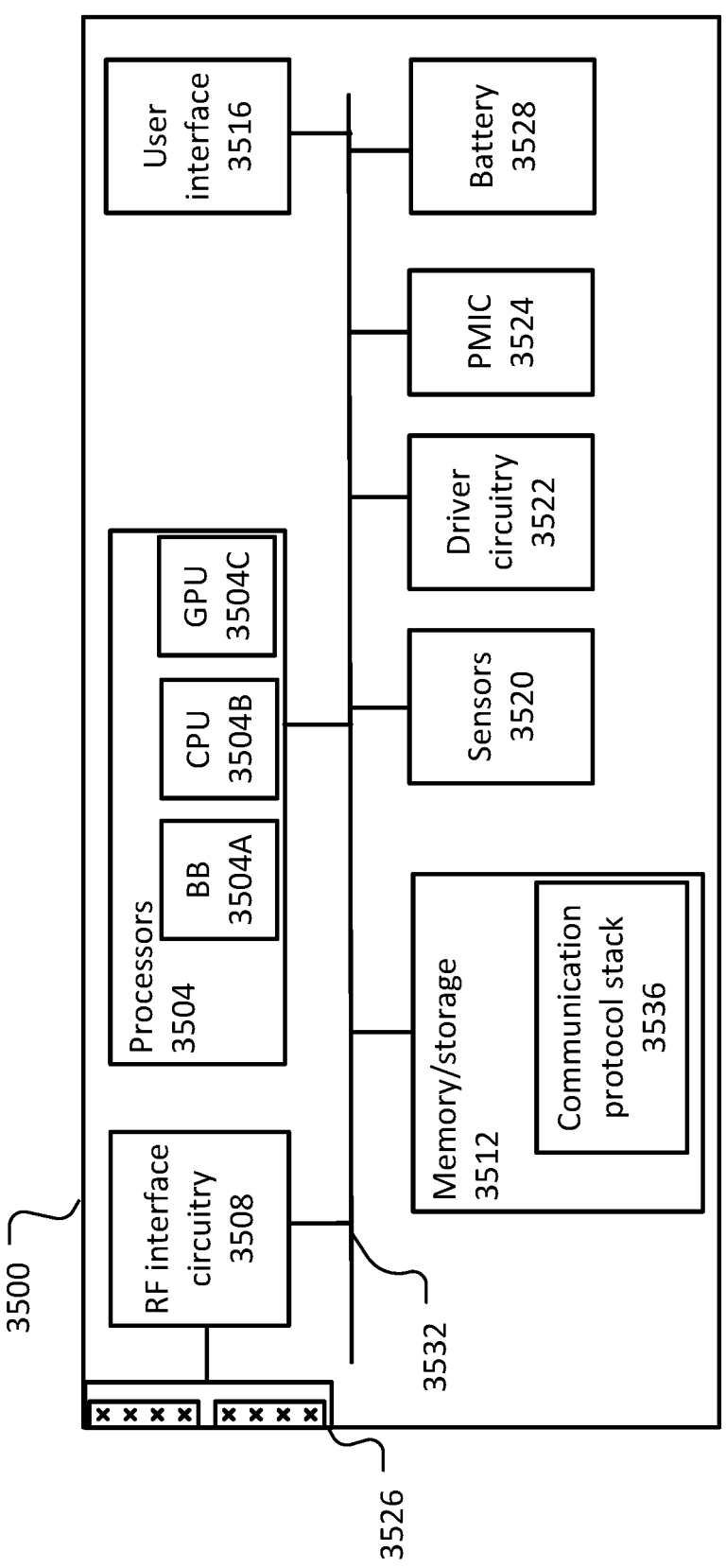
FIG. 35 illustrates an example user equipment in accordance with some embodiments.
Figure 36:
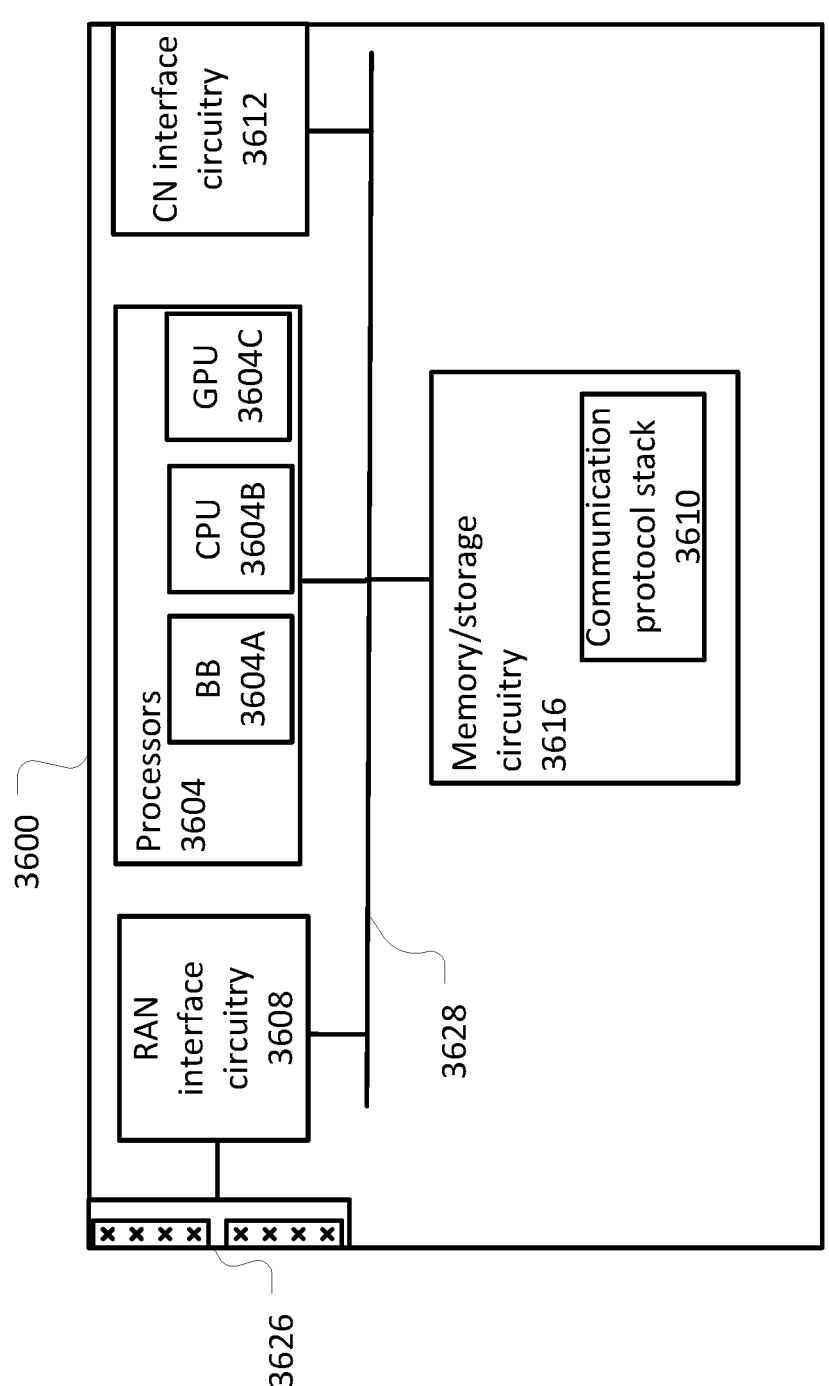
FIG. 36 illustrates an example next generation NodeB in accordance with some embodiments.

FIG. 1 illustrates an example network arrangement 100 in accordance with some embodiments. The network arrangement 100 may include a user equipment (UE) 102 and next generation NodeB (gNB) 104. The UE 102 may include one or more of the features of the UE 3500 (FIG. 35). The gNB 104 may include one or more of the features of the gNB 3600 (FIG. 36).

A wireless connection 106 may be established between the UE 102 and the gNB 104. For example, the UE 102 may establish the connection 106 with the gNB 104. The connection 106 may be utilized for exchanging communications between the UE 102 and the gNB 104. In particular, the connection 106 may be utilized transmissions described throughout the disclosure. Further, the UE 102 and the gNB 104 may perform the corresponding operations described throughout the disclosure, including the multiplexing patterns described throughout the disclosure. The UE 102 and the gNB 104 may operate in the 52.6 GHz to 71 GHz in some instances. In other instances, the UE 102 and the gNB 104 may operate in millimeter wave (mmWave). The mmWave may be between 24 GHz and 100 GHz in some embodiments.

It may be beneficial to determine the required changes to NR using existing downlink (DL)/uplink (UL) NR waveform to support operation between 52.6 GHz and 71 GHz. For example, it may be beneficial to consider applicable numerology including subcarrier spacing, channel bandwidth (BW) (including the maximum BW), and their impact to FR2 physical layer design to support system functionality considering practical RF impairments. Further, it may be beneficial to identify potential critical problems to physical signal/channels, if any. Channel access mechanism assuming beam based operation in order to comply with the regulatory requirements applicable to unlicensed spectrum for frequencies between 52.6 GHz and 71 GHz may be considered. Potential interference impact, if identified, may require interference mitigation solutions as part of channel access mechanism.

Leveraging FR2 design to the extent possible, this NR operation extended up to 71 GHz considering, both, licensed and unlicensed operation may be considered. An objective for the operation extended up to 71 GHz may include physical layer aspects. The physical layer aspects may include new numerology or numerologies (μ value in TS 38.211 (3GPP Organizational Partners. (2020-12). 3$^{rd}$ Generation Partnership Project; Technical Specification Group Radio Access Network; NR; Physical channels and modulation (Release 16) (3GPP TS 38.211 V16.4.0)) for operation in the 52.6 GHz to 71 GHz frequency range. Addressing impact on physical signals/channels if any. The physical layer aspects for the objectives may further include time line related aspects adapted to each of the new numerologies, for example bandwidth part (BWP) and beam switching times, hybrid automatic repeat request (HARQ) scheduling, user equipment (UE) processing, preparation and computation times for physical downlink shared channel (PDSCH), physical uplink shared channel (PUSCH)/sounding reference signal (SRS) and channel state information (CSI), respectively. Further physical layer aspects for consideration of the objectives includes support of up to 64 synchronization signal/physical broadcast channel (SSB) beams for licensed and unlicensed operation in the 52.6 GHz to 71 GHz frequency range.

Another objective for NR operation extended up to 71 GHz considering, both, licensed and unlicensed operation, includes physical layer procedure(s). The physical layer procedures for consideration may include channel access mechanism assuming beam based operation in order to comply with regulatory requirements applicable to unlicensed spectrum for frequencies between 52.6 GHz and 71 GHz.

The available bandwidth within a given carrier for remaining minimum system information (RMSI) transmission for SSB and control resource set (CORESET) multiplexing pattern 2 and 3 may be for consideration. Depending on the supported carrier bandwidth and configured values of O and M, multiplexing pattern 1 can make available more time/frequency resources for RMSI PDSCH in a slot than pattern 2 and 3. However, the 52.6 GHz to 71 GHz frequency range may present some challenges for different patterns. For example, the 52.6 GHz to 71 GHz frequency range may not provide enough time/frequency resources for RMSI PDSCH for legacy pattern 2 and pattern 3. Legacy pattern 1 allows for y symbols in time based on the time domain resource allocation (TDRA), while legacy Pattern 2 and 3 are limited in time as they have to be equal to the time duration of the SSB.

Another challenge presented for the 52.6 GHz to 71 GHz frequency range is that legacy pattern 2 cannot be used in the {120 kHz, 120 kHz} configuration while pattern 3 cannot be used in the {240 kHz,120 kHz} configuration. Note that {X,Y} represents X being the SSB subcarrier (SCS), and Y being the CORESET/RMSI SCS for operation. Given the large number of SSBs (up to 64), reducing the overhead especially for {240 kHz, 120 kHz} may be beneficial.

Another challenge presented for the 52.6 GHz to 71 GHz frequency range is that the use of 480 kilohertz (kHz) and 960 kHz for data is available. In particular, 480 kHz and 960 kHz may be utilized for the SSB SCS and/or the CORESET/RMSI SCS. However, patterns have not been defined for the new SCS values.

Figure 2:
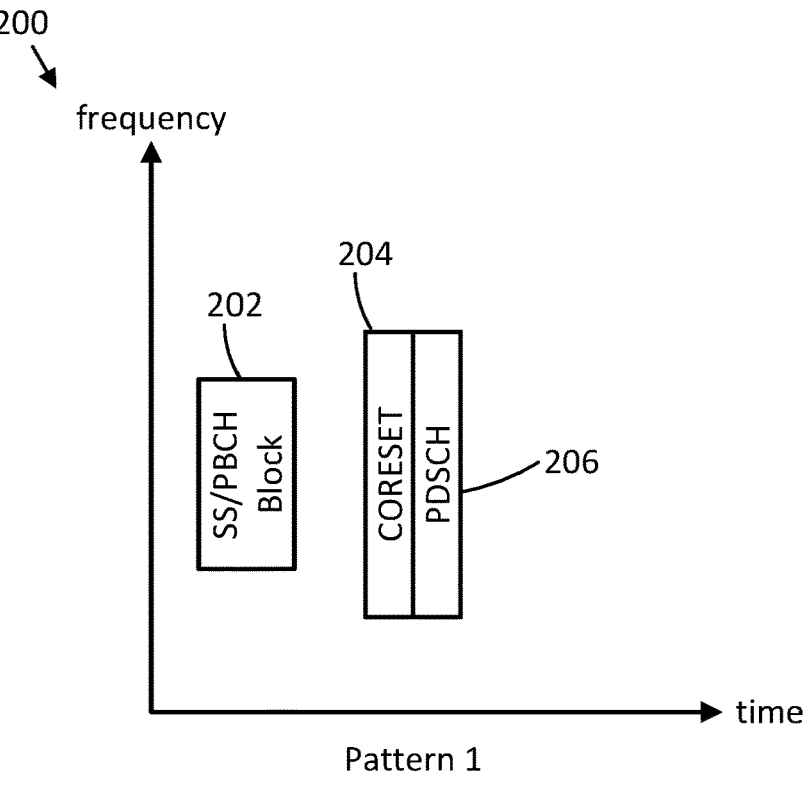
FIG. 2 illustrates an example multiplexing pattern 1 transmission arrangement in accordance with some embodiments.

FIG. 2 illustrates an example multiplexing pattern 1 transmission arrangement 200 in accordance with some embodiments. In particular, FIG. 2 illustrates elements to be transmitted within the multiplexing pattern 1 transmission arrangement 200 on a frequency versus time graph. The multiplexing pattern 1 transmission arrangement 200 may define timing and frequency for elements transmitted within an SSB and CORESET multiplexing pattern. The multiplexing pattern 1 transmission arrangement 200 may be utilized for a {120 kHz, 120 kHz} configuration and a {240 kHz, 120 kHz} configuration.

The multiplexing pattern 1 transmission arrangement 200 may include an SSB transmission 202, a CORESET transmission 204, and a PDSCH transmission 206. Each of the SSB transmission 202, the CORESET transmission 204, and the PDSCH transmission 206 may comprise one or more symbols to be transmitted. As can be seen, the SSB transmission 202 may be transmitted before the CORESET transmission 204 and the PDSCH transmission 206 in time. There may be a gap in time between the SSB transmission 202 and the CORESET transmission 204, where the gap may comprise one or more symbols. The CORESET transmission 204 may be between the SSB transmission 202 and the PDSCH transmission 206 in time. For example, the CORESET transmission 204 may be transmitted right before the PDSCH transmission 206 in time, such that the CORESET transmission 204 ends as the PDSCH transmission 206 begins. The SSB transmission 202, the CORESET transmission 204, and the PDSCH transmission 206 may overlap in frequency. For example, the CORESET transmission 204 and the PDSCH transmission 206 may transmit within the same frequency range. The SSB transmission 202 may transmit within a frequency range that overlaps and is smaller than the frequency range of the CORESET transmission 204 and the PDSCH transmission 206. Based on the timing and frequency of the elements within the multiplexing pattern 1 transmission arrangement 200, the multiplexing pattern 1 may be referred to as having time division multiplexing (TDM).

When the multiplexing pattern 1 transmission arrangement 200 is utilized for the {120 kHz, 120 kHz} configuration, the number of resource blocks may be defined to be 24 or 48. Further, the number of symbols for the CORESET may defined to be 1 or 2. The number of symbols for the PDSCH RMSI for the multiplexing pattern 1 transmission arrangement 200 may be defined based on the TDRA. For example, the [resource block (RB), #CORESET, #RMSI] may be defined as [24, 1, y], [24, 2, y], [48, 1, y], or [48, 2, y] for the multiplexing pattern 1 transmission arrangement 200 being utilized for the {120 kHz, 120 kHz}, where the y indicated value is based on the TDRA.

When the multiplexing pattern 1 transmission arrangement 200 is utilized for the {240 kHz, 120 kHz} configuration, the number of resource blocks may be defined to be 48. Further, the number of symbols for the CORESET may be defined to be 1 or 2. The number of symbols for the PDSCH RMS for the multiplexing pattern 1 transmission arrangement 200 may be defined based on the TDRA. For example, the [RB, #CORESET, #RMSI] may be defined as [48, 1, y] or [48, 2, y] for the multiplexing pattern 1 transmission arrangement 200 being utilized for the {120 kHz, 120 kHz}, where the y indicated value is based on the TDRA.

Figure 3:
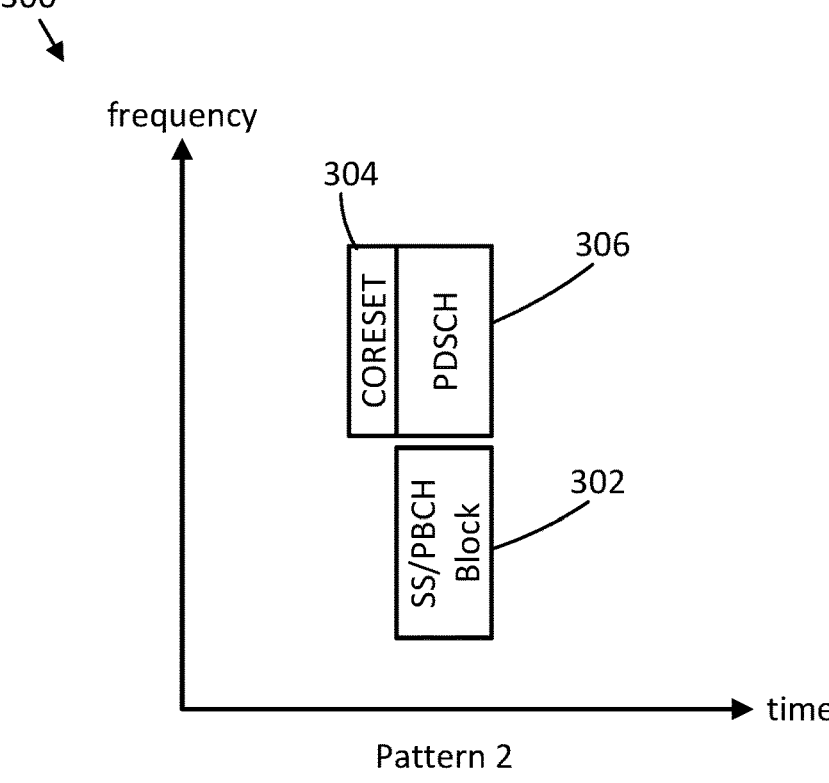
FIG. 3 illustrates an example multiplexing pattern 2 transmission arrangement for 120 kilohertz (kHz) and 240 kHz synchronization signal/physical broadcast channel block (SSB) in accordance with some embodiments.

FIG. 3 illustrates an example multiplexing pattern 2 transmission arrangement 300 for 120 kHz and 240 kHz SSB in accordance with some embodiments. In particular, FIG. 3 illustrates elements to be transmitted within the multiplexing pattern 2 transmission arrangement 300 on a frequency versus time graph. The multiplexing pattern 2 transmission arrangement 300 may define timing and frequency for elements transmitted within an SSB and CORESET multiplexing pattern. The multiplexing pattern 2 transmission arrangement 300 may be utilized for a {240 kHz, 120 kHz} configuration.

The multiplexing pattern 2 transmission arrangement 300 may include an SSB transmission 302, a CORESET transmission 304, and a PDSCH transmission 306. Each of the SSB transmission 302, the CORESET transmission 304, and the PDSCH transmission 306 may comprise one or more symbols to be transmitted. As can be seen, the CORESET transmission 304 may be transmitted before both the SSB transmission 302 and the PDSCH transmission 306 in time. The SSB transmission 302 and the PDSCH transmission 306 may be transmitted at the same time. The CORESET transmission 304 may be transmitted right before the SSB transmission 302 and the PDSCH transmission 306 in time, such that the CORESET transmission 304 ends as the SSB transmission 302 and the PDSCH transmission 306 begins. In other embodiments, there may be space between the CORESET transmission 304, and the SSB transmission 302 and the PDSCH transmission 306 in time. The CORESET transmission 304 may transmit within the same frequency range as the PDSCH transmission 306. The SSB transmission 302 may transmit within a different frequency range than the CORESET transmission 304 and the PDSCH transmission 306. Based on the timing and frequency of the elements within the multiplexing pattern 2 transmission arrangement 300, the multiplexing pattern 2 may be referred to as having a combination of TDM and frequency division multiplexing (FDM).

When the multiplexing pattern 2 transmission arrangement 300 is utilized for the {240 kHz, 120 kHz} configuration, the number of resource blocks may be defined to be 24 or 48. Further, the number of symbols for the CORESET may be defined to be 1. The number of symbols for the PDSCH RMSI for the multiplexing pattern 2 transmission arrangement 300 may be defined to be 2. For example, the [RB, #CORESET, #RMSI] may be defined as [24, 1, 2] or [48, 1, 2] for the multiplexing pattern 2 transmission arrangement 300 being utilized for the {240 kHz, 120 kHz}.

Figure 4:
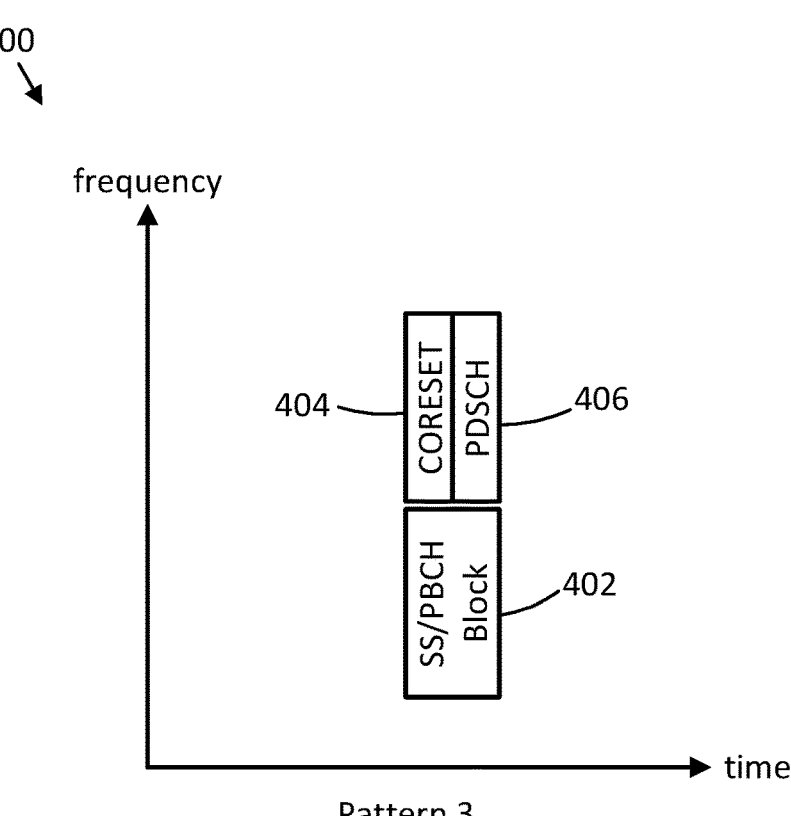
FIG. 4 illustrates an example multiplexing pattern 3 transmission arrangement for 120 kHz and 240 kHz SSB in accordance with some embodiments.

FIG. 4 illustrates an example multiplexing pattern 3 transmission arrangement 400 for 120 kHz and 240 kHz SSB in accordance with some embodiments. In particular, FIG. 4 illustrates elements to be transmitted within the multiplexing pattern 3 transmission arrangement 400 on a frequency versus time graph. The multiplexing pattern 3 transmission arrangement 400 may define timing and frequency for elements transmitted within an SSB and CORESET multiplexing pattern. The multiplexing pattern 3 transmission arrangement 400 may be utilized for a {120 kHz, 120 kHz} configuration.

The multiplexing pattern 3 transmission arrangement 400 may include an SSB transmission 402, a CORESET transmission 404, and a PDSCH transmission 406. Each of the SSB transmission 402, the CORESET transmission 404, and the PDSCH transmission 406 may comprise one or more symbols to be transmitted. The SSB transmission 402 may be transmitted at the same time as the CORESET transmission 404 and the PDSCH transmission 406. The CORESET transmission 404 may be transmitted before the PDSCH transmission 406 in time. For example, the CORESET transmission 404 may be transmitted right before the PDSCH transmission 406 in time, such that the CORESET transmission 404 ends as the PDSCH transmission 406 begins. The CORESET transmission 404 may be transmitted for a first portion of the time that the SSB transmission 402 is transmitted with the CORESET transmission 404 beginning at a same time as the SSB transmission 402 begins. The PDSCH transmission may be transmitted for a second portion of the time that the SSB transmission 402 is transmitted with the PDSCH transmission 406 ending at a same time as the SSB transmission 402 ends. The CORESET transmission 404 may be transmitted in a same frequency range as the PDSCH transmission 406. The SSB transmission 402 may be transmitted in a different frequency range than the CORESET transmission 404 and the PDSCH transmission 406. Based on the timing and frequency of the elements within the multiplexing pattern 3 transmission arrangement 400, the multiplexing pattern 3 may be referred as having FDM.

When the multiplexing pattern 3 transmission arrangement 400 is utilized for the {120 kHz, 120 kHz} configuration, the number of resource blocks may be defined to be 24 or 48. Further, the number of symbols for the CORESET may be defined to be 2. The number of symbols for the PDSCH RMS for the multiplexing pattern 3 transmission arrangement 400 may be defined to be 2. For example, the

[RB, #CORESET, #RMSI] may be defined as [24, 2, 2] or [48, 2, 2] for the multiplexing pattern 3 transmission arrangement 400 being utilized for the {120 kHz, 120 kHz}.

For each of the following combination of synchronization signal (SS)/physical broadcast channel (PBCH) SCS and RMSI CORESET SCS, the multiplexing patterns between SSB and RMSI (CORESET and PDSCH), RMSI CORESET bandwidth (BW), RMSI CORESET duration, and physical resource block (PRB)-level offset are jointly coded in a table using 4 bits of RMSI configuration in NR-PBCH. In particular, the joint coding using the 4 bits of RMSI may be applicable to the combinations of {SSB SCS, RMSI SCS}={15, 15}, {15, 30}, {30, 15}, {30, 30}, {120, 60}, {120,120}, {240, 60}, {240, 120}} kHz.

Definition for the multiplexing pattern tables SS/PBCH SCS and RMSI CORESET SCS. "Pattern 1" refers to the multiplexing pattern that SSB and RMSI CORESET occur in different time instances, and SSB transmission (TX) BW and the initial active DL BWP containing RMSI CORESET overlap. The multiplexing pattern 1 transmission arrangement 200 may be an example of "Pattern 1." "Pattern 2" refers to the multiplexing pattern that SSB and RMSI CORESET occur in different time instances, and SSB TX BW and the initial active DL BWP containing RMSI CORE-SET do not overlap. The multiplexing pattern 2 transmission arrangement 300 may be an example of "Pattern 2." "Pattern 3" refers to the multiplexing pattern that SSB and RMSI CORESET occur in the same time instance, and SSB TX BW and the initial active DL BWP containing RMSI CORE-SET do not overlap. The multiplexing pattern 3 transmission arrangement 400 may be an example of "Pattern 3."

Legacy NR does not support RMSI search space sets configuration where the SSBs and corresponding RMSI search space sets occur in the same time instances if the carrier frequency is lower than 6 GHz.

NR may support RMSI search space sets configuration for the following combinations with the same numerologies of the SSB, the RMSI search space sets, and PDSCH, where the SSBs, and corresponding RMSI search space sets and PDSCH occur in the same time instances. In particular, the RMSI search space sets configuration may be supported for the combination of {SSB SCS, RMSI PDSCH SCS}={120, 120} kHz. The RMSI search space sets configuration may include two symbols for physical downlink control channel (PDCCH) and two symbols for PDSCH. This may be pattern 3 in the RMSI search space sets configurations.

NR may support RMSI search space sets configuration for the following combinations with different numerologies of the SSB and the RMSI PDSCH, when the SSBs and corresponding RMSI PDSCH occur in the same time instances. In particular, the RMSI search space sets configuration may be supported for the combinations of {SSB SCS, RMSI PDSCH SCS}={120, 60}, {240, 120} kHz. This is pattern 2 in the RMSI search space sets configurations.

For pattern 3, the RMSI CORESET monitoring window associated with the SSB SSB_i in a burst set, may be defined as follows. The starting symbol index R for the RMSI CORESET monitoring window may be the same as the starting symbol of the SSB. The duration of the monitoring window may be 1.

For pattern 2, the RMSI CORESET monitoring window associated with the SSB SSB_i in a burst set, may be defined as follows. The starting symbol index R for the RMSI CORESET monitoring window may occur earlier than the SSB symbols in the same slot or one slot before. The duration of the monitoring window may be 1.

NR may support RMSI PDCCH aggregation levels of 4 control channel elements (CCEs), 8 CCEs, and 16 CCEs.

If during cell search a UE determines from master information block (MIB) that a CORESET for Type0-PDCCH common search space (CSS) set is present, the UE may determine a number of consecutive resource blocks and a number of consecutive symbols for the CORESET of the Type0-PDDCH CSS set from controlResourceSetZero in pdcch-ConfigS1B1 for operation without shared spectrum channel access, or for operation with shared spectrum channel access. The UE may further determine PDCCH monitoring occasions from searchSpaceZero in pdcch-ConfigS1B1, included in MIB. The TDRA may define the number of symbols for multiplexing pattern 2/3 to be equal to 2.

An applicable PDSCH time domain resource allocation for DCI formats 1_0 and 1_1 may be defined. For example, a radio network temporary identifier (RNTI) for the PDSCH time domain resource allocation may be defined as a system information (SI)-RNTI. The PDCCH search space for the PDSCH time domain resource allocation may be Type0 common. For the SSB and CORESET multiplexing pattern 1, the PDSCH time domain resource allocation to apply may be default A for normal cyclic prefix (CP). The PDSCH time domain resource allocation to apply for the SSB and CORE-SET multiplexing pattern 2 may be default B. Further, the PDSCH time domain resource allocation to apply for the SSB and CORESET multiplexing pattern 3 may be default C.

Some frequency range 1 (FR1)/frequency range 2 (FR2) allowed multiplexing patterns have been defined for data SCS of 120 kHz or less. The FR1 may be defined as being frequencies below 6 GHz. The FR2 may be defined as being frequencies between 24 GHz and 52.6 GHz. For example, pattern 1 may be used for SSB SCS of 15 kHz and data SCS of 15 kHz in FR1. Accordingly, the ratio between the SSB SCS and the data SCS is 1 in this instance. Pattern 1 may be used for less 6 GHz and/or there may be BW limitations.

Pattern 1 may also be used for SSB SCS of 15 kHz and data SCS of 30 kHz in FR1. Accordingly, the ratio between the SSB SCS and the data SCS is 2 in this instance. Pattern 1 may be used for less 6 GHz and/or there may be BW limitations.

Pattern 1 may also be used for SSB SCS of 30 kHz and data SCS of 15 kHz in FR1. Accordingly, the ratio between the SSB SCS and the data SCS is 0.5 in this instance. Pattern 1 may be used for less 6 GHz and/or there may be BW limitations.

Pattern 1 may also be used for SSB SCS of 30 kHz and data SCS of 30 kHz in FR1. Accordingly, the ratio between the SSB SCS and the data SCS is 0.5 in this instance. Pattern 1 may be used for less 6 GHz and/or there may be BW limitations.

Pattern 1 or pattern 2 may be used for SSB SCS of 120 kHz and data SCS of 60 kHz in FR2. Accordingly, the ratio between the SSB SCS and the data SCS is 0.5 in this instance. Pattern 1 may be used as a baseline and pattern 2 may be used for different numerology.

Pattern 1 or pattern 3 may be used for SSB SCS of 120 kHz and data SCS of 120 kHz in FR2. Accordingly, the ratio between the SSB SCS and the data SCS is 1 in this instance. Pattern 1 may be used as a baseline and pattern 3 may be used for same numerology.

Pattern 1 may be used for SSB SCS of 240 kHz and data SCS of 60 kHz in FR2. Accordingly, the ratio between the SSB SCS and the data SCS is 0.25 in this instance. The SSB SCS of 240 kHz and data SCS of 60 kHz may be problematic for due to limited orthogonal frequency division multiplexing (OFDM) symbols.

Pattern 1 or pattern 2 may be used for SSB SCS of 240 kHz and data SCS of 120 kHz in FR2. Accordingly, the ratio between the SSB SCS and the data SCS is 0.5 in this instance. Pattern 1 may be used as a baseline and pattern 2 may be used for different numerology.

An approach for new radio (NR) operating between 52.6 gigahertz (GHz) and 71 GHz with SSB SCS being equal to data SCS is having pattern 2 and pattern 3 enhancement. For example, pattern 1 and pattern 3 enhancement may be applied for {SSB:120 kHz, PDCCH/PDSCH: 120 kHz}. The enhanced pattern 2 and pattern 3 may also be used for mmWave in some embodiments.

Legacy mixed numerology approaches may be limited to legacy pattern 1 and legacy pattern 2. For example, for FR2, mixed numerology occurs with {120, 60}, {240, 60} and {240,120} i.e., SSB>RMSI. For {120, 60}, {240,120}, legacy pattern 3 will have 2 symbols (for example, 1 for CORESET and 1 for RMSI). Due to only having one symbol for CORESET and one symbol for RMSI, legacy pattern 3 may have too little payload. Given the larger BWs available in greater than 52.6 GHz, the enhanced pattern 3 may increase the number of physical resource blocks (PRBs) and address the issue of the legacy pattern 3 having too little payload. Accordingly, the enhanced pattern 3 may be allowed for use in mixed numerology due to the increased payload as compared to legacy pattern 3. For {240, 60}, both legacy pattern 2 and legacy pattern 3 are not feasible as the RMSI is four times the duration of the SSB. This implies the SSB covers only one symbol. With adoption of 480 kHz and 960 kHz for SSB SCS<RMSI SCS a change in the design may be beneficial.

A first approach for enhancement of pattern 2 and pattern 3 (which may be referred to as approach 1-1) is to increase the number of symbols in time in the pattern 2 and pattern 3 without changing the arrangement of the patterns. For the pattern 2 enhancement, a new configuration with a 1 or 2 symbol CORESET and a 4 symbol PDSCH may be introduced. This pattern 2 enhancement may have new spacing between SSB blocks (up to 3 symbols between blocks) to allow for UL and DL transmission. In a first option for the pattern 2 enhancement, there may be at least one symbol between the PDCCH and the PDSCH to allow for processing. For example, 1 symbol UL transmission (TX), 1 symbol PDCCH transmission, and 1 symbol processing of PDCCH then PDSCH/SSB may be introduced.

Figures 5, 6, 7, 8:
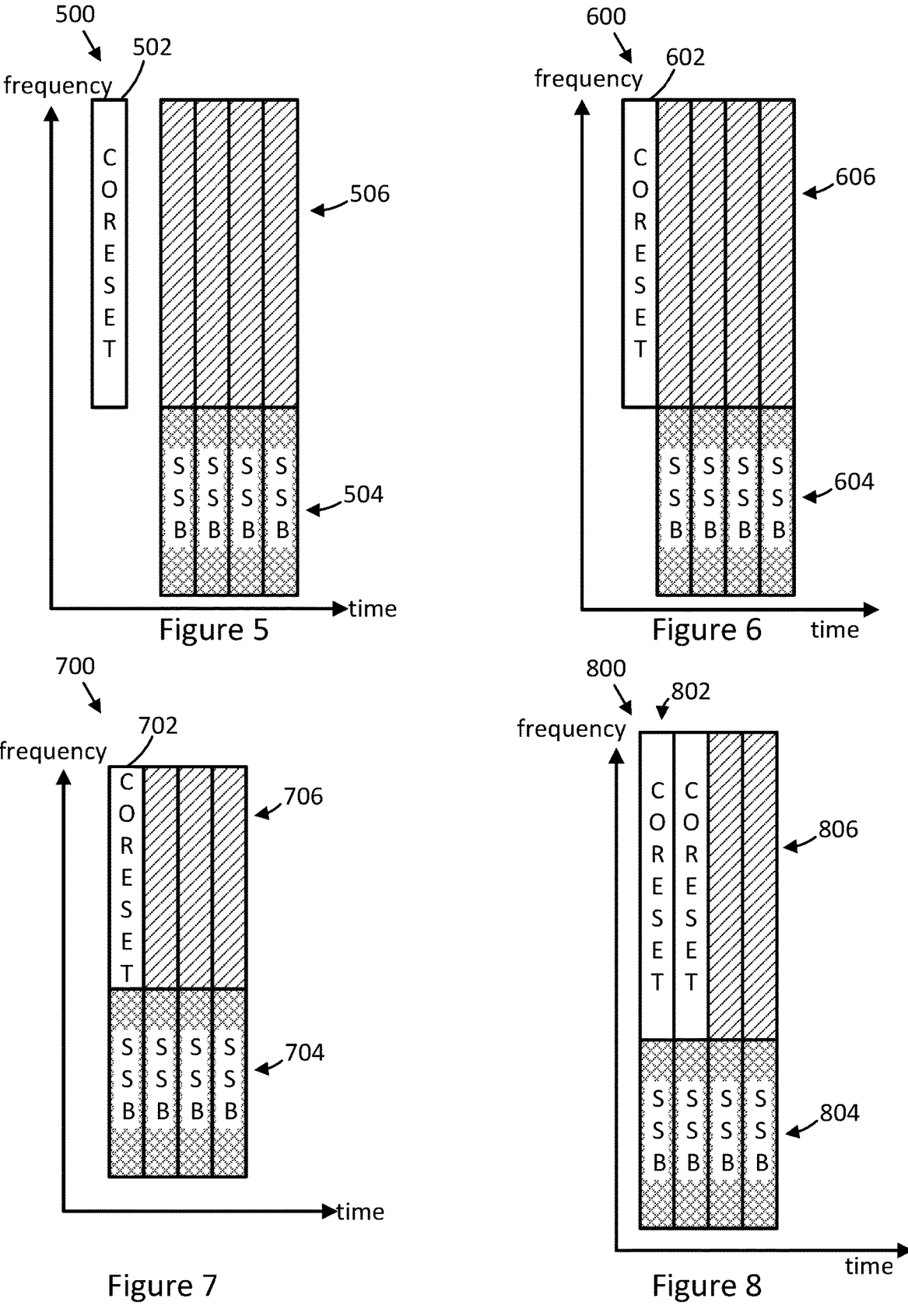
FIG. 5 illustrates an example enhanced pattern 2 in accordance with some embodiments.
FIG. 6 illustrates an example enhanced pattern 2 in accordance with some embodiments.
FIG. 7 illustrates an example enhanced pattern 3 in accordance with some embodiments.
FIG. 8 illustrates another example enhanced pattern 3 in accordance with some embodiments.

FIG. 5 illustrates an example enhanced pattern 2 500 in accordance with some embodiments. The enhanced pattern 2 500 may include a one symbol CORESET 502 in the illustrated embodiment. It should be understood that the enhanced pattern 2 500 may include a two symbol CORESET in other embodiments, where the two symbol CORESET has the same frequency and time relationships to the other elements within the enhanced pattern 2 500 as the frequency and time relationships of the first symbol CORESET 502 to the other elements as described herein.

The enhanced pattern 2 500 may further include a four symbol PDSCH 506. In particular, the four symbol PDSCH 506 may include four symbols as shown. The four symbol PDSCH 506 may overlap in frequency with the one symbol CORESET 502 and may be later in time than the one symbol CORESET 502. For example, the four symbol PDSCH 506 and the one symbol CORESET 502 may have the same frequency range. There may be at least one symbol in the time domain between the one symbol CORESET 502 and the four symbol PDSCH 506 to allow for processing of the one symbol CORESET 502. For example, the enhanced pattern 2 500 may include one symbol for UL transmission, followed by one symbol for PDCCH transmission, then one symbol for processing of the PDCCH transmission, and then the four symbol PDSCH 506. The increase in symbols in the time domain of the four symbol PDSCH 506 for the enhanced pattern 2 500 as compared to pattern 2 may provide for adequate time/frequencies for RMSI PDSCH for NR operating between 52.6 GHz and 71 GHz, where pattern 2 may have inadequate time/frequencies for RMSI PDSCH for NR operating between 52.6 GHz and 71 GHz. Further, the enhanced pattern 2 may provide adequate time/frequencies for RMSI PDSCH for mmWave in some embodiments.

The enhanced pattern 2 500 may further include SSB blocks 504. In the illustrated embodiment, the SSB blocks 504 includes four symbols. The four symbols of the SSB blocks 504 may correspond in time with the four symbol PDSCH 506, such that the four symbol PDSCH 506 and the SSB blocks 504 occur at the same time. The SSB blocks 504 may be at different frequencies from the four symbol PDSCH 506, such that the SSB blocks 504 and the four symbol PDSCH 506 do not overlap in frequency. As with the four symbol PDSCH 506, the SSB blocks 504 may occur after the one symbol CORESET 502 in time and at least one symbol in the time domain may be between the one symbol CORESET 502 and the SSB blocks 504.

In a second option for the pattern 2 enhancement with increased number of symbols, the UE may buffer all the transmissions and as such there may be no need for a gap between the PDCCH and PDSCH. For example, the UE may buffer any CORESET symbols, PDSCH symbols, and/or SSB symbols within an enhanced pattern 2 and process the symbols at later times than received. There may be 1 symbol processing for this enhanced pattern 2.

FIG. 6 illustrates an example enhanced pattern 2 600 in accordance with some embodiments. The enhanced pattern 2 600 may include a one symbol CORESET 602 in the illustrated embodiment. It should be understood that the enhanced pattern 2 600 may include a two symbol CORESET in other embodiments, where the two symbol CORESET has the same frequency and time relationships to the other elements within the enhanced pattern 2 600 as the frequency and time relationships of the first symbol CORESET 602 to the other elements as described herein.

The enhanced pattern 2 600 may further include a four symbol PDSCH 606. In particular, the four symbol PDSCH 606 may include four symbols as shown. The four symbol PDSCH 606 may overlap in frequency with the one symbol CORESET 602 and may be later in time than the one symbol CORESET 602. For example, the four symbol PDSCH 606 and the one symbol CORESET 602 may have the same frequency range. Due to the buffering, the one symbol CORESET 602 may be right before the four symbol PDSCH 606 in time, such that the one symbol CORESET 602 ends as the four symbol PDSCH 606 is beginning. The increase in symbols in the time domain of the four symbol PDSCH 606 for the enhanced pattern 2 600 as compared to pattern 2 may provide for adequate time/frequencies for RMSI PDSCH for NR operating between 52.6 GHz and 71 GHz, where pattern 2 may have inadequate time/frequencies for RMSI PDSCH for NR operating between 52.6 GHz and 71 GHz. The enhanced pattern 2 600 may also provide for adequate time/frequencies for RMSI PDSCH for mmWave in some embodiments.

The enhanced pattern 2 600 may further include SSB blocks 604. In the illustrated embodiment, the SSB blocks 604 includes four symbols. The four symbols of the SSB blocks 604 may correspond in time with the four symbol PDSCH 606, such that the four symbol PDSCH 606 and the SSB blocks 604 occur at the same time. The SSB blocks 604 may be at different frequencies from the four symbol PDSCH 606, such that the SSB blocks 604 and the four symbol PDSCH 606 do not overlap in frequency. As with the four symbol PDSCH 606, the SSB blocks 604 may occur after the one symbol CORESET 602 in time and the one symbol CORESET 602 might be right before the SSB blocks 604 in time.

For the pattern 3 enhancement with the increased number of symbols, a new configuration with 1 symbol CORESET and 3 symbol PDSCH may be defined as an enhanced pattern 3. To enable signaling of length, a new default TDRA table may be created with PDSCH duration of 3 or 6 symbols.

FIG. 7 illustrates an example enhanced pattern 3 700 in accordance with some embodiments. The enhanced pattern 3 700 may include a one symbol CORESET 702 in the illustrated embodiment.

The enhanced pattern 3 700 may further include a three symbol PDSCH 706. In particular, the three symbol PDSCH 706 may include three symbols as shown. The three symbol PDSCH 706 may overlap in frequency with the one symbol CORESET 702 and may be later in time than the one symbol CORESET 702. For example, the three symbol PDSCH 706 and the one symbol CORESET 702 may have the same frequency range. The one symbol CORESET 702 may be right before the three symbol PDSCH 706 in time, such that the one symbol CORESET 702 ends as the three symbol PDSCH 706 is beginning. The increase in symbols in the time domain of the three symbol PDSCH 706 for the enhanced pattern 3 700 as compared to pattern 3 may provide for adequate time/frequencies for RMSI PDSCH for NR operating between 52.6 GHz and 71 GHz, where pattern 3 may have inadequate time/frequencies for RMSI PDSCH for NR operating between 52.6 GHz and 71 GHz. The enhanced pattern 3 700 may also provide for adequate time/frequencies for RMSI PDSCH for mmWave in some embodiments.

The enhanced pattern 3 700 may further include SSB blocks 704. In the illustrated embodiment, the SSB blocks 704 includes four symbols. The four symbols of the SSB blocks 704 may correspond in time with the one symbol CORESET 702 and the three symbol PDSCH 706, such that the one symbol CORESET 702, the three symbol PDSCH 706, and the SSB blocks 704 occur at the same time. For example, the one symbol CORESET 702 may occur at a same time as a first symbol of the SSB blocks 704 and the three symbol PDSCH 706 may occur at a same time as the following three symbols of the SSB blocks 704. The SSB blocks 704 may be at different frequencies from the one symbol CORESET 702 and the three symbol PDSCH 706, such that the SSB blocks 704 do not overlap in frequency with the one symbol CORESET 702 and the three symbol PDSCH 706.

FIG. 8 illustrates another example enhanced pattern 3 800 in accordance with some embodiments. The enhanced pattern 3 800 may include a two symbol CORESET 802 in the illustrated embodiment.

The enhanced pattern 3 800 may further include a two symbol PDSCH 806. In particular, the two symbol PDSCH 806 may include two symbols as shown. The two symbol PDSCH 806 may overlap in frequency with the two symbol CORESET 802 and may be later in time than the two symbol CORESET 802. For example, the two symbol PDSCH 806 and the two symbol CORESET 802 may have the same frequency range. The two symbol CORESET 802 may be right before the two symbol PDSCH 806 in time, such that the two symbol CORESET 802 ends as the two symbol PDSCH 806 is beginning. The increase in symbols in the time domain of the two symbol PDSCH 806 for the enhanced pattern 3 800 as compared to pattern 3 may provide for adequate time/frequencies for RMSI PDSCH for NR operating between 52.6 GHz and 71 GHz, where pattern 3 may have inadequate time/frequencies for RMSI PDSCH for NR operating between 52.6 GHz and 71 GHz. The enhanced pattern 3 800 may also provide for adequate time/frequencies for RMSI PDSCH for mmWave in some embodiments.

The enhanced pattern 3 800 may further include SSB blocks 804. In the illustrated embodiment, the SSB blocks 804 includes four symbols. The four symbols of the SSB blocks 804 may correspond in time with the two symbol CORESET 802 and the two symbol PDSCH 806, such that the two symbol CORESET 802, the two symbol PDSCH 806, and the SSB blocks 804 occur at the same time. For example, the two symbol CORESET 802 may occur at a same time as a first two symbols of the SSB blocks 804 and the two symbol PDSCH 806 may occur at a same time as the following two symbols of the SSB blocks 804. The SSB blocks 804 may be at different frequencies from the two symbol CORESET 802 and the two symbol PDSCH 806, such that the SSB blocks 804 do not overlap in frequency with the two symbol CORESET 802 and the two symbol PDSCH 806.

For the enhanced pattern 2 and the enhanced pattern 3 with the increased number of symbols, the new configurations may increase the number of RBs allowed to increase RMSI payload. In particular, the increased RMSI payload may include 36, 60, 72, 84, or 96 RBs. For example, each symbol of the enhanced pattern 2 and the enhanced pattern 3 with the increased number of symbols may have 36, 60, 72, 84, or 96 RBs within each symbol.

FIG. 9 illustrates example default PDSCH time domain resource allocation for NR operating between 52.6 GHz and 71 GHz in some embodiments. In particular, FIG. 9 illustrates a table 900 of default PDSCH time domain resource allocation for NR operating between 52.6 GHz and 71 GHz (which may be defined as frequency range 3 (FR3) in some instances). The default PDSCH time domain resource allocation for NR operating between 52.6 GHz and 71 GHz may be modified from a default PDSCH time domain resource allocation for FR2. In one embodiment, the default PDSCH TDRA to be used may be signaled in the PBCH. In some embodiments, the PDSCH time domain resource allocation may be used for mmWave.

The table 900 may include row index values 902 and length values 904. In particular, the length values 904 may indicate the PDSCH duration corresponding to each of the index values. As can be seen from the table 900, the length values 904 for the row index values 902 of 1-4, 6, and 7 have been set to 3. The length values 904 for the row index values 902 of 5 has been set to 2. The length values 904 of the row index values 902 of 8-12 and 15 have been set to 6. These values may be updated for NR operating between 52.6 GHz and 71 GHz as compared to the default PDSCH time domain resource allocation for FR2.

An approach for NR operating between 52.6 GHz and 71 GHz with SSB SCS being a different value than the data SCS is having enhanced pattern 2 and enhanced pattern 3. For example, pattern 2 and pattern 3 enhancement may be applied for {SSB: 240 kHz, PDCCH/PDSCH: 120 kHz}. The enhancement of pattern 2 and pattern 3 for SSB SCS being a different value than the data SCS may include increasing the number of RBs allowed.

For pattern 2, legacy configuration sets have the CORESET number of resource blocks being equal to 24 or 48 with the number of symbols being equal to 2. The enhanced pattern 2 configuration may increase the number of RBs allowed to increase payload. For example, the enhanced pattern 2 may have 36, 60, 72, 84, or 96 RBs. In particular, the enhanced pattern 2 may have 36, 60, 72, 84, or 96 RBs within each symbol.

Figures 10, 11:
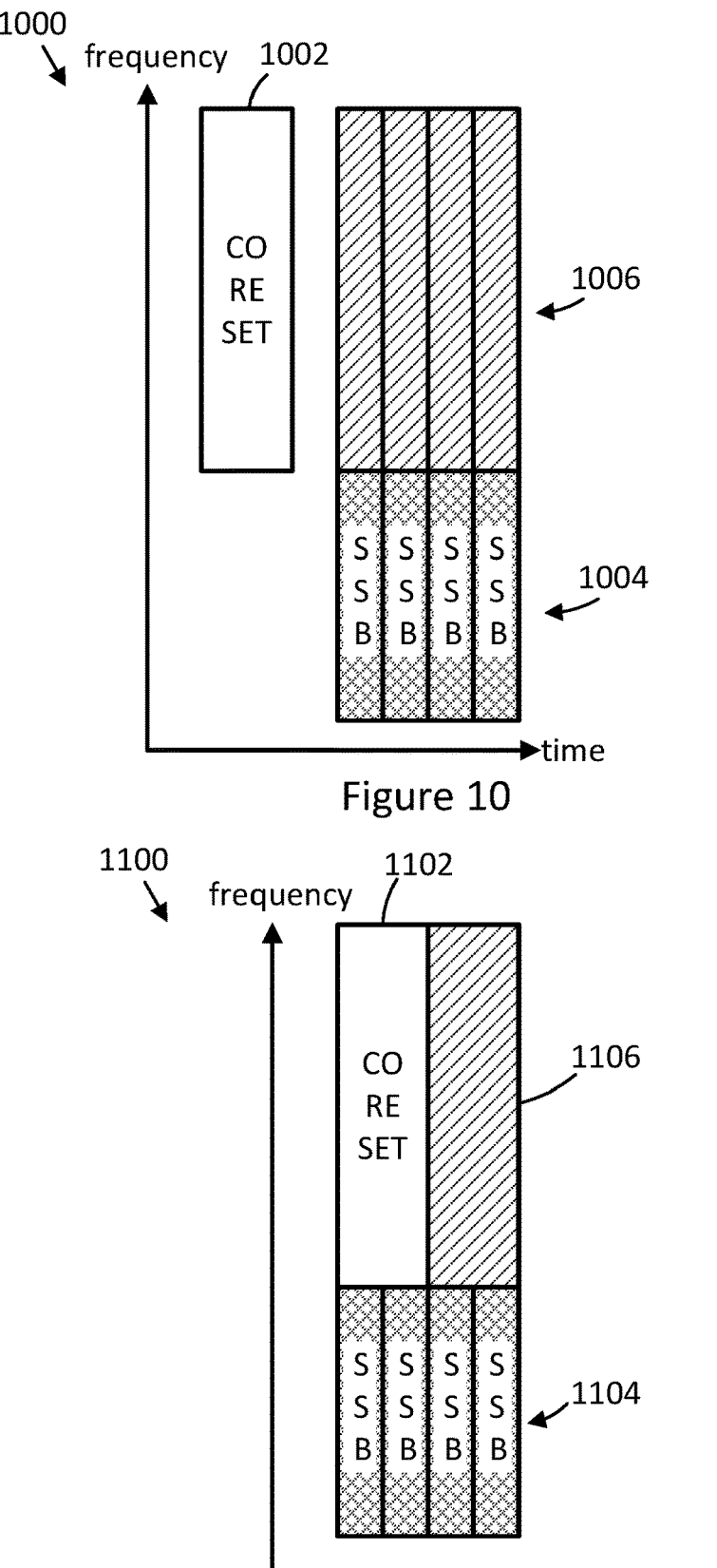
FIG. 10 illustrates an example enhanced pattern 2 in accordance with some embodiments.
FIG. 11 illustrates an example enhanced pattern 3 in accordance with some embodiments.

FIG. 10 illustrates an example enhanced pattern 2 1000 in accordance with some embodiments. The enhanced pattern 2 1000 may include a one symbol CORESET 1002 in the illustrated embodiment. The one symbol CORESET 1002 may include up to 36, 60, 72, 84, or 96 RBs within the symbol.

The enhanced pattern 2 1000 may further include a four symbol PDSCH 1006. In particular, the four symbol PDSCH 1006 may include four symbols as shown. Each symbol of the four symbol PDSCH 1006 may include up to 36, 60, 72, 84, or 96 RBs within the symbol. The four symbol PDSCH 1006 may overlap in frequency with the one symbol CORESET 1002 and may be later in time than the one symbol CORESET 1002. For example, the three symbol PDSCH 1006 and the one symbol CORESET 1002 may have the same frequency range. There may be at least one symbol in the time domain between the one symbol CORESET 1002 and the four symbol PDSCH 1006 to allow for processing of the one symbol CORESET 1002. In other embodiments, the one symbol CORESET 1002 may be right before the four symbol PDSCH 1006 in time, such that the one symbol CORESET 1002 ends as the four symbol PDSCH 1006 is beginning. The increase in RBs in the time domain of the four symbol PDSCH 1006 for the enhanced pattern 2 1000 as compared to pattern 2 may provide for adequate time/frequencies for RMSI PDSCH for NR operating between 52.6 GHz and 71 GHz, where pattern 2 may have inadequate time/frequencies for RMSI PDSCH for NR operating between 52.6 GHz and 71 GHz. The enhanced pattern 2 1000 may also provide for adequate time/frequencies for RMSI PDSCH for mmWave in some embodiments.

The enhanced pattern 2 1000 may further include SSB blocks 1004. In the illustrated embodiment, the SSB blocks 1004 includes four symbols. The four symbols of the SSB blocks 1004 may correspond in time with the four symbol PDSCH 1006, such that the four symbol PDSCH 1006 and the SSB blocks 1004 occur at the same time. The SSB blocks 1004 may be at different frequencies from the four symbol PDSCH 1006, such that the SSB blocks 1004 do not overlap in frequency with the four symbol PDSCH 1006.

The enhanced pattern 3 may have increased number of RBs to increase payload as compared to legacy pattern 3. For example, the enhanced pattern 3 may have 48, 96, or 192 RBs. The enhanced pattern 3 may have 48, 96, or 192 RBs per symbol. Further, the enhanced pattern 3 configuration may have 1 symbol CORESET and 1 symbol RMSI to reduce SSB transmission overhead. A UE may buffer the RMSI symbol to wait before decoding CORESET. For example, the UE may buffer the one symbol RMSI and hold off processing the RMSI symbol until after the CORESET has been decoded.

FIG. 11 illustrates an example enhanced pattern 3 1100 in accordance with some embodiments. The enhanced pattern 3 1100 may include a one symbol CORESET 1102 in the illustrated embodiment.

The enhanced pattern 3 1100 may further include a one symbol PDSCH 1106. In particular, the one symbol PDSCH 1106 may include one symbol as shown. The one symbol PDSCH 1106 may overlap in frequency with the one symbol CORESET 1102 and may be later in time than the one symbol CORESET 1102. For example, the one symbol PDSCH 1106 and the one symbol CORESET 1102 may have the same frequency range. The one symbol CORESET 1102 may be right before the one symbol PDSCH 1106 in time, such that the one symbol CORESET 1102 ends as the one symbol PDSCH 1106 is beginning. Having the one symbol CORESET 1102 and the one symbol PDSCH 1106 may reduce the SSB transmission overhead for NR operating between 52.6 GHz and 71 GHz as compared to the legacy pattern 3.

The enhanced pattern 3 1100 may further include SSB blocks 1104. In the illustrated embodiment, the SSB blocks 1104 includes four symbols. Due to the difference in SCS between the SSB SCS and the PDSCH SCS, the time of the SSB symbols may be longer or shorter than the times of the one symbol CORESET 1102 and the one symbol PDSCH 1106. In the illustrated embodiment, the symbols of the SSB blocks 1104 are shorter in time than the times for the one symbol CORESET 1102 and the one symbol PDSCH 1106 due to the SSB SCS being greater than the PDSCH SCS. The four symbols of the SSB blocks 1104 may correspond in time with the one symbol CORESET 1102 and the one symbol PDSCH 1106, such that the one symbol CORESET 1102, the one symbol PDSCH 1106, and the SSB blocks 1104 occur at the same time. For example, the one symbol CORESET 1102 may occur at a same time as a first two symbols of the SSB blocks 1104 and the one symbol PDSCH 1106 may occur at a same time as the following two symbols of the SSB blocks 1104. The SSB blocks 1104 may be at different frequencies from the one symbol CORESET 1102 and the one symbol PDSCH 1106, such that the SSB blocks 1104 do not overlap in frequency with the one symbol CORESET 1102 and the one symbol PDSCH 1106.

FIG. 12 illustrates example details for a set of resource blocks and slot symbols of CORESET for Type0-PDCCH search space set when {SSB, PDCCH} SCS is {120, 120} kHz in accordance with some embodiments. In particular, FIG. 12 illustrates a table 1200 of a set of resource blocks and slot symbols of CORESET for {120 kHz, 120 kHz} search space for NR operating between 52.6 GHz and 71 GHz. For example, the table 1200 may correspond to the enhanced pattern 2 1000 (FIG. 10). The set of resource blocks and slot symbols of CORESET for NR operating between 52.6 GHz and 71 GHz may be modified from a set of resource blocks and slot symbols of CORESET for FR2.

The table 1200 may provide index values 1202, SSB and CORESET multiplexing pattern values 1204, number of RBs values 1206, number of symbols values 1208, and offset (RBs) values 1210. In particular the SSB and CORESET multiplexing pattern values 1204 may indicate the pattern corresponding to an index value of the index values 1202, and the number of RBs values 1206, the number of symbols values 1208, and the offset (RBs) values 1210 may indicate the number of RBs, the number of symbols, and the offset (RBs) respectfully for the multiplexing pattern.

The table 1200 may be updated from a table for a set of resource blocks and slot symbols of CORESET for FR2 to define additional indexes 8-12. The index value 1202 of 8 may utilize pattern 3, have a maximum number of 96 RBs, have a number of symbols of 2, an offset of −20 if $k_{SSB}$=0 or −21 if $k_{SSB}$>0. The index value 1202 of 9 may utilize pattern 3, have a maximum number of 96 RBs, have a number of symbols of 2, an offset of 36. The index value 1202 of 10 may utilize pattern 3, have a maximum number of 24 RBs, have a number of symbols of 1, an offset of –20 if $k_{SSB}$=0 or –21 if $k_{SSB}$>0. The index value 1202 of 11 may utilize pattern 3, have a maximum number of 24 RBs, have a number of symbols of 1, an offset of 24. The index value 1202 of 12 may utilize pattern 2, have a maximum number of 48 RBs, have a number of symbols of 1, an offset of 49.

FIG. 13 illustrates example details for a set of resource blocks and slot symbols of CORESET for Type0-PDCCH search space set when {SSB, PDCCH} SCS is {240, 120} kHz in accordance with some embodiments. In particular, FIG. 13 illustrates a table 1300 of a set of resource blocks and slot symbols of CORESET for {240 kHz, 120 kHz} search space for NR operating between 52.6 GHz and 71 GHz. For example, the table 1300 may correspond to the enhanced pattern 3 1100 (FIG. 11). The set of resource blocks and slot symbols of CORESET for NR operating between 52.6 GHz and 71 GHz may be modified from a set of resource blocks and slot symbols of CORESET for FR2.

The table 1300 may provide index values 1302, SSB and CORESET multiplexing pattern values 1304, number of RBs values 1306, number of symbols values 1308, and offset (RBs) values 1310. In particular the SSB and CORE-SET multiplexing pattern values 1304 may indicate the pattern corresponding to an index value of the index values 1302, and the number of RBs values 1306, the number of symbols values 1308, and the offset (RBs) values 1310 may indicate the number of RBs, the number of symbols, and the offset (RBs) respectfully for the multiplexing pattern.

The table 1300 may be updated from a table for a set of resource blocks and slot symbols of CORESET for FR2 to define additional indexes 8 and 9. The index value 1302 of 8 may utilize pattern 2, have a maximum number of 96 RBs, have a number of symbols of 1, an offset of –41 if $k_{SSB}$=0 and –42 if $k_{SSB}$>0. The index value 1202 of 9 may utilize pattern 3, have a maximum number of 48 RBs, and have a number of symbols of 1, an offset of 36.

Legacy same numerology approaches may be limited to legacy pattern 1 and legacy pattern 3. Legacy pattern 2 may not have been available for the legacy same numerology approaches possibly due to overhead of extra CORESET symbol being quite high and FDM was designed to minimize beam sweeping time. This condition may be relaxed due to the short duration of 480 kHz and 960 kHz and enhanced pattern 2 designs may be produced.

For pattern 2 and pattern 3 multiplexing, the number of RMSI symbols may be such that the duration of RMSI is less than the duration of SSB. Additional symbols for RMSI may be available with candidates of 120 kHz, 480 kHz and 960 kHz.

A first approach may be, for SSB SCS less than RMSI SCS the number of RMSI OFDM Symbols (OSs) may be greater than or equal to the number of SSB OS is to determine a use for the excess RMSI OSs. For example, there may be more RMSI Oss within a multiplexing pattern due to a value of the SSB SCS being less than the RMSI SCS. It may be determined what these excess symbols are to be used for. The excess symbols may be used for RMSI payload increase, for example from 2 OS to 4 OS, as a first option. The excess symbols may be used for a reduced number of RBs (for example, from 48 PRBs with 1 OS to 24 PRBs with 2 OS) in a second option. Option 3: The excess symbols may be used for increased reliability in a third option, for example RMSI repetition and/or indication of repetition in PBCH or TDRA.

A second approach for the additional SCSs may be an indication of a number of RMSI symbols. For example, indicate the number of symbols used for RMSI based on the SCS may be indicated. In a first option, the number of symbols used for RMSI based on the SCS may be pre-determined by a specification. In a second option, the number of symbols used for RMSI based on the SCS may be dynamically indicated to UE by one or more of a PBCH, a DCI field in CORESET #0, and/or in TDRA table.

A third approach for the additional SCS may include a TDRA table update. In a first option, a number of bits greater than 4 (for example 1 entries) may be increased and additional lengths may be allowed. In a second option, a multiplication factor, for example 2 bits with entries 1, 1.5, 2, 3, may be created. The length in TDRA field may be multiplied by the created multiplication factor. In a third option, multiple default TDRA tables may be created. Which TDRA table is used in PBCH or CORESET #0 may be dynamically indicated. For example, a PBCH may dynamically indicate a specific default TDRA table from a set of default TDRA tables.

A fourth approach for the additional SCS may be use of certain multiplexing patterns. In a first option, legacy patterns (such as legacy pattern 1, legacy pattern 2 or legacy pattern 3) may be used, such as the legacy patterns from the NR release 15 (Rel. 15). In a second option, pattern 3.x, which has RMSI CORESET beginning at the start of the SSB (similar to pattern 3), may be defined. However, duration of RMSI/RMSI CORSET for pattern 3.x may be less than the duration of SSB for the pattern 3.x. In a third option, a UE may require pattern 3, for example, equal duration of SSB/RMSI to prevent need for change of automatic gain control (AGC) during transmission. A gNB may transmit garbage/unspecified signal during non-overlapping region. Further, the gNB may transmit a specified signal for example and may repeat RMSI during non-overlapping region or transmit longer RMSI in non-overlapping region.

Figures 14, 15:
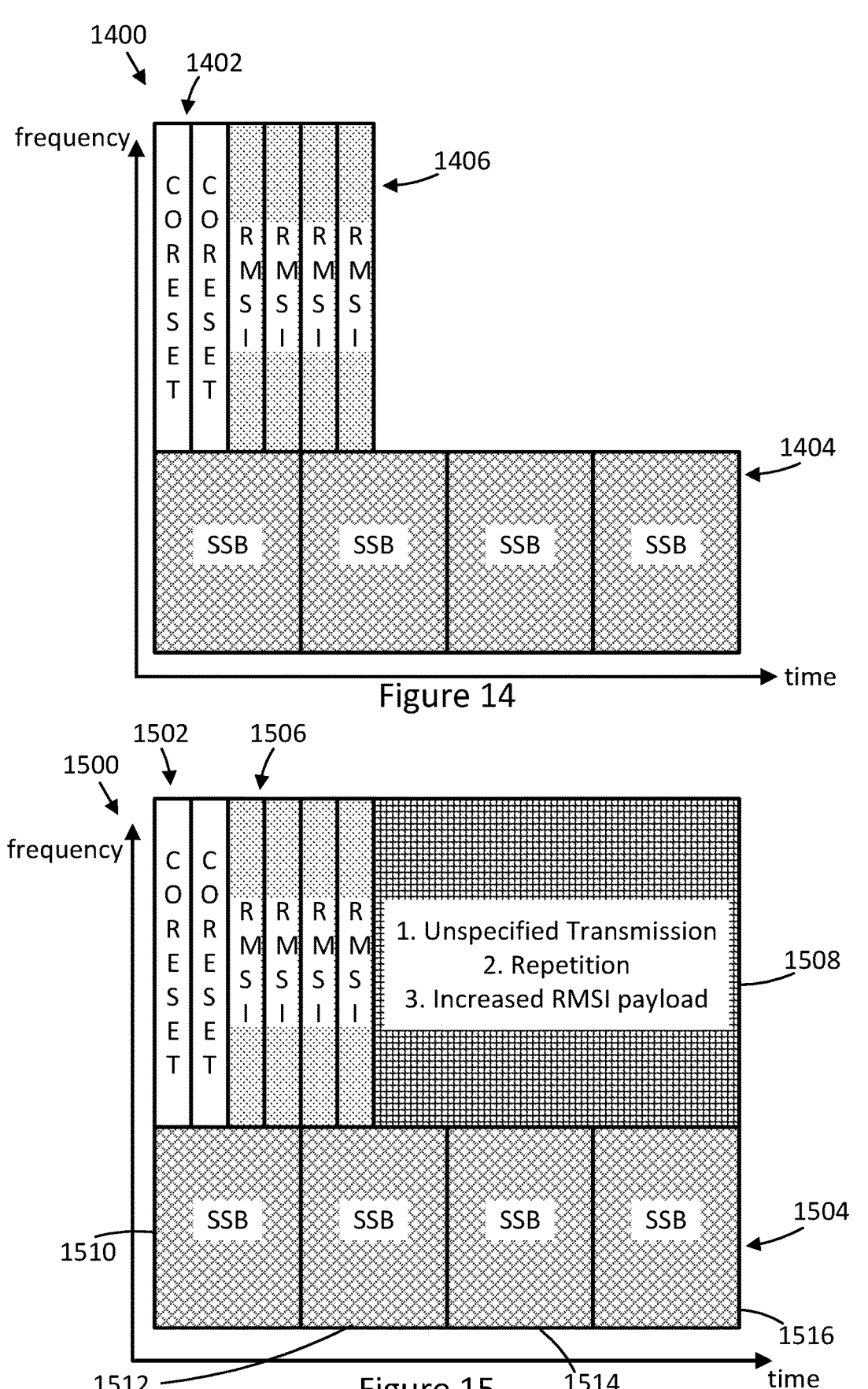
FIG. 14 illustrates an example multiplexing pattern 3.x according to some embodiments.
FIG. 15 illustrates another example multiplexing pattern 3.x according to some embodiments.

FIG. 14 illustrates an example multiplexing pattern 3.x 1400 in accordance with some embodiments. The pattern 3.x 1400 may correspond to the second option for the fourth approach for the additional SCS provided above. The pattern 3.x 1400 may include a CORESET group 1402 in the illustrated embodiment. In the illustrated embodiment, the CORESET group 1402 may include two symbols.

The pattern 3.x 1400 may further include a RMSI group 1406 (which also may be referred to as a PDSCH group). The RMSI group 1406 may include four symbols as shown. The RMSI group 1406 may overlap in frequency with the CORESET group 1402 and may be later in time than the CORESET group 1402. For example, the RMSI group 1406 and the CORESET group 1402 may have the same frequency range. The CORESET group 1402 may be right before the RMSI group 1406 in time, such that the CORE-SET group 1402 ends as the RMSI group 1406 is beginning.

The pattern 3.x 1400 may further include SSB blocks 1404. In the illustrated embodiment, the SSB blocks 1404 includes four symbols. Due to the difference in SCS between the SSB SCS and the PDSCH SCS, the time of the SSB symbols within the SSB blocks 1404 may be longer or shorter than the times of the symbols within CORESET group 1402 and the RMSI group 1406. In the illustrated embodiment, the symbols of the SSB blocks 1404 are longer in time than the times for the symbols within the CORESET group 1402 and the RMSI group 1406 due to the SSB SCS being less than the PDSCH SCS. The four symbols of the SSB blocks 1404 may correspond in time with a portion of the CORESET group 1402 and the RMSI group 1406. For example, the CORESET group 1402 may occur at a same time as a first half of a first symbol 1408 of the SSB blocks 1404. The RMSI group 1406 may occur at a same time as a second half of the first symbol 1408 of the SSB blocks 1404 and a first half of a second symbol 1410 of the SSB blocks 1404. The SSB blocks 1404 may continue until a later time than the CORESET group 1402 and the RMSI group 1406. The SSB blocks 1404 may be at different frequencies from the CORESET group 1402 and the RMSI group 1406, such that the SSB blocks 1404 do not overlap in frequency with the CORESET group 1402 and the RMSI group 1406.

FIG. 15 illustrates another example multiplexing pattern 3.x 1500 in accordance with some embodiments. The pattern 3.x 1500 may correspond to the second option for the fourth approach for the additional SCS provided above. The pattern 3.x 1500 may include a CORESET group 1502 in the illustrated embodiment. In the illustrated embodiment, the CORESET group 1502 may include two symbols.

The pattern 3.x 1500 may further include a RMSI group 1506 (which also may be referred to as a PDSCH group). The RMSI group 1506 may include four symbols as shown. The RMSI group 1506 may overlap in frequency with the CORESET group 1502 and may be later in time than the CORESET 1502. For example, the RMSI group 1506 and the CORESET group 1502 may have the same frequency range. The CORESET group 1502 may be right before the RMSI group 1506 in time, such that the CORESET group 1502 ends as the RMSI group 1506 is beginning.

The pattern 3.x 1500 may further include a definable block 1508. The definable block 1508 may include one or more symbols, where each of the symbols may be defined for a same purpose or may be defined for different purposes. The purposes that the symbols of the definable block 1508 may be defined for include an unspecified transmission, repetition of a signal, increased RMSI payload, or some combination thereof. The definable block 1508 may overlap in frequency with the CORESET group 1502 and the RMSI group 1506. For example, the definable block 1508 may have the same frequency range as the CORESET group 1502 and the RMSI group 1506. The definable block 1508 may be later in time than the CORESET group 1502 and the RMSI group 1506. For example, the RMSI group 1506 may be right before the definable block 1508, such that the RMSI group 1506 ends as the definable block 1508 is beginning.

The pattern 3.x 1500 may further include SSB blocks 1504. In the illustrated embodiment, the SSB blocks 1504 includes four symbols. Due to the difference in SCS between the SSB SCS and the PDSCH SCS, the time of the SSB symbols within the SSB blocks 1504 may be longer or shorter than the times of the symbols within CORESET group 1502 and the RMSI group 1506. In the illustrated embodiment, the symbols of the SSB blocks 1504 are longer in time than the times for the symbols within the CORESET group 1502 and the RMSI group 1506 due to the SSB SCS being less than the PDSCH SCS. The four symbols of the SSB blocks 1504 may correspond in time with the CORESET group 1502, the RMSI group 1506, and the definable block 1508. For example, the CORESET group 1502 may occur at a same time as a first half of a first symbol 1510 of the SSB blocks 1504. The RMSI group 1506 may occur at a same time as a second half of the first symbol 1510 of the SSB blocks 1504 and a first half of a second symbol 1512 of the SSB blocks 1504. The definable block 1508 may occur at a same time as a second half of the second symbol 1512, a third symbol 1514 of the SSB blocks 1504, and a fourth symbol 1516 of the SSB blocks 1504. The SSB blocks 1504 may be at different frequencies from the CORE- SET group 1502, the RMSI group 1506, and the definable block 1508, such that the SSB blocks 14504 do not overlap in frequency with the CORESET group 1502, the RMSI group 1506, and the definable block.

FIG. 16 illustrates example details for some designs utilizing legacy SSB and at 120 kHz SCS in accordance with some embodiments. In particular, FIG. 16 provides a table 1600 showing details regarding multiplexing patterns for SCS of 120 kHz for the SSB SCS. The table 1600 provides six designs for SSB SCS being equal to 120 kHz.

The table 1600 may include data SCS values 1604, ratio values 1606, legacy multiplexing patterns 1608, enhanced multiplexing patterns 1610, and notes 1612 for each of the designs 1602. For design 1, the data SCS 1604 may be 120 kHz, the ratio 1606 may be 1, and the legacy multiplexing patterns 1608 that may be utilized for design 1 are pattern 1 and pattern 3. For design 2, the data SCS 1604 may be 480 kHz, the ratio 1606 may be 4, and the enhanced multiplexing pattern 1610 that may be utilized for design 2 is enhanced pattern 2. Enhanced pattern 2 may allow for early CORE-SET decoding in design 2. For design 3, the data SCS 1604 may be 960 kHz, the ratio 1606 may be 8, and the enhanced multiplexing pattern 1610 that may be utilized for design 3 is enhanced pattern 2. Enhanced pattern 2 may allow for early CORESET decoding in design 3. For design 4, the data SCS 1604 may be 120 kHz, the ratio 1606 may be 1, and the enhanced multiplexing pattern 1610 that may be utilized for design 4 is enhanced pattern 3. Enhanced pattern 3 may provide reduced RMSI payload and may increase the number of PRBs to increase the payload in design 4. For design 5, the data SCS 1604 may be 480 kHz, the ratio 1606 may be 4, and the enhanced multiplexing pattern 1610 that may be utilized for design 5 is enhanced pattern 3.x. Enhanced pattern 3.x may provide FDM, but there may not be a perfect overlap. Enhanced pattern 3.x may provide for repetition, which may increase RMSI or reduce BW to not change AGC. For design 6, the data SCS 1604 may be 960 kHz, the ratio 1606 may be 8, and the enhanced multiplexing pattern 1610 that may be utilized for design 6 is enhanced pattern 3.x. Enhanced pattern 3.x may provide FDM, but there may not be a perfect overlap. Enhanced pattern 3.x may provide for repetition, which may increase RMSI or reduce BW to not change AGC. Designs 4, 5, and 6 may provide reduced overhead while allowing for increase in RMSI payload as compared to the other designs.

FIG. 17 illustrates example details for the designs described of FIG. 16 in accordance with some embodiments. In particular, FIG. 17 provides a table 1700 showing further details regarding multiplexing patterns for SCS of 120 kHz for the SSB SCS. The table 1700 provides six designs for SSB SCS being equal to 120 kHz.

The table 1700 may include description 1704, signals 1706, SCS value 1708 for each of the signals 1706, and the timing (T)/frequency (F) resolution (Res) 1710 for each of the signals 1706 for each of the designs 1702. For design 1, pattern 2 in accordance with Rel. 15 may be utilized. For design 1, the SSB signal may have SCS of 120 kHz with a T/F Res of 20 PRBs and 4 OS, the RMSI CORESET signal may have SCS of 120 kHz with a T/F Res of 24 PRBs and 2 OS, and the RMSI may have SCS of 120 kHz with a T/F Res of 24 PRBs and 4 OS.

For design 2, enhanced pattern 2 with 480 kHz RMSI SCS may be utilized. For design 2, the SSB signal may have SCS of 120 kHz with a T/F Res of 20 PRBs and 4 OS, the RMSI CORESET signal may have SCS of 480 kHz with a T/F Res of 24 PRBs and 2 OS, and the RMSI may have SCS of 480 kHz with a T/F Res of 24 PRBs and greater than or equal to 4 OS.

For design 3, enhanced pattern 2 with 960 kHz RMSI SCS may be utilized. For design 3, the SSB signal may have SCS of 120 kHz with a T/F Res of 20 PRBs and 4 OS, the RMSI CORESET signal may have SCS of 960 kHz with a T/F Res of 24 PRBs and 2 OS, and the RMSI may have SCS of 960 kHz with a T/F Res of 24 PRBs and greater than or equal to 4 OS.

For design 4, enhanced pattern 3 with 120 kHz RMSI SCS may be utilized. For design 4, the SSB signal may have SCS of 120 kHz with a T/F Res of 20 PRBs and 4 OS, the RMSI CORESET signal may have SCS of 120 kHz with a T/F Res of 24 PRBs and 1 OS, and the RMSI may have SCS of 120 kHz with a T/F Res of 24 PRBs and 3 OS.

For design 5, enhanced pattern 3 with 480 kHz RMSI SCS may be utilized. For design 5, the SSB signal may have SCS of 120 kHz with a T/F Res of 20 PRBs and 4 OS, the RMSI CORESET signal may have SCS of 480 kHz with a T/F Res of 24 PRBs and 2 OS, and the RMSI may have SCS of 480 kHz with a T/F Res of 24 PRBs and greater than or equal to 4 OS.

For design 6, enhanced pattern 3 with 960 kHz RMSI SCS may be utilized. For design 6, the SSB signal may have SCS of 120 kHz with a T/F Res of 20 PRBs and 4 OS, the RMSI CORESET signal may have SCS of 960 kHz with a T/F Res of 24 PRBs and 2 OS, and the RMSI may have SCS of 960 kHz with a T/F Res of 24 PRBs and greater than or equal to 4OS.

Figure 18:
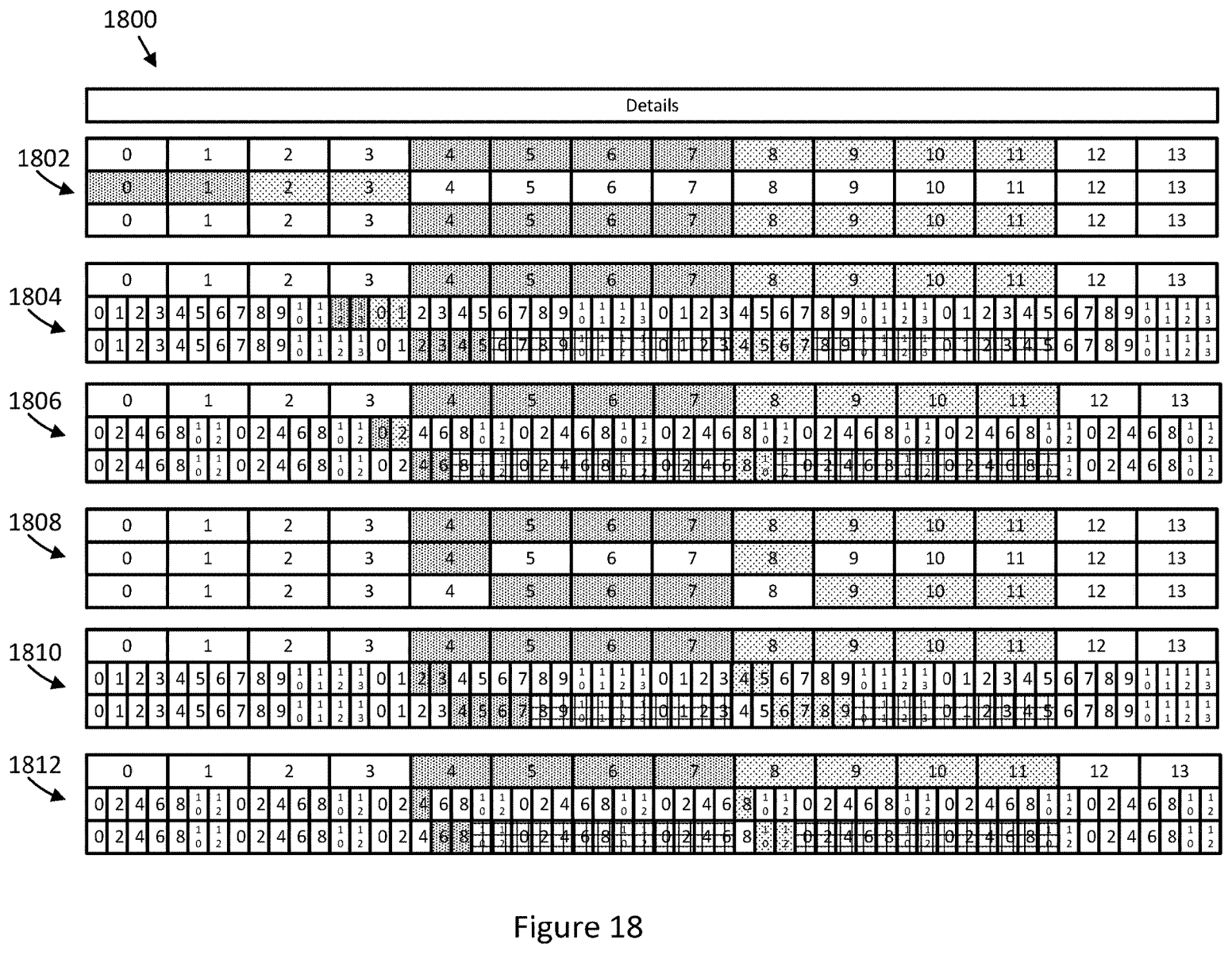

FIG. 18 illustrates example configurations 1800 of the designs of FIG. 16 in accordance with some embodiments. In particular, FIG. 18 illustrates slot arrangements of the designs for the multiplexing patterns for SCS of 120 kHz for the SSB SCS.

The configurations 1800 includes a design 1 configuration 1802. In particular, the design 1 configuration 1802 illustrates the SSB, RMSI CORESET, and RMSI symbols within slots for design 1. The SSB symbols are illustrated in the top row, the RMSI CORESET symbols are illustrated in the middle row, and the RMSI symbols are illustrated in the bottom row.

The configurations 1800 includes a design 2 configuration 1804. In particular, the design 2 configuration 1804 illustrates the SSB, RMSI CORESET, and RMSI symbols within slots for design 2. The SSB symbols are illustrated in the top row, the RMSI CORESET symbols are illustrated in the middle row, and the RMSI symbols are illustrated in the bottom row. In design 2, the RMSI CORESET symbols may be shifted to slots 10 and 11 to avoid sending the last two symbols due to conflict with an SRS. The RMSI symbols can increase in number to increase RMSI payload or repeat to prevent power change.

The configurations 1800 includes a design 3 configuration 1806. In particular, the design 3 configuration 1806 illustrates the SSB, RMSI CORESET, and RMSI symbols within slots for design 3. The SSB symbols are illustrated in the top row, the RMSI CORESET symbols are illustrated in the middle row, and the RMSI symbols are illustrated in the bottom row. In design 3, the CORESET RMSI can increase the number of symbols to increase CORESET allocation.

The configurations 1800 includes a design 4 configuration 1808. In particular, the design 4 configuration 1808 illustrates the SSB, RMSI CORESET, and RMSI symbols within slots for design 4. The SSB symbols are illustrated in the top row, the RMSI CORESET symbols are illustrated in the middle row, and the RMSI symbols are illustrated in the bottom row.

The configurations 1800 includes a design 5 configuration 1810. In particular, the design 5 configuration 1810 illustrates the SSB, RMSI CORESET, and RMSI symbols within slots for design 5. The SSB symbols are illustrated in the top row, the RMSI CORESET symbols are illustrated in the middle row, and the RMSI symbols are illustrated in the bottom row. The RMSI symbols may be increased in number to increase RMSI payload.

The configurations 1800 includes a design 6 configuration 1812. In particular, the design 6 configuration 1812 illustrates the SSB, RMSI CORESET, and RMSI symbols within slots for design 6. The SSB symbols are illustrated in the top row, the RMSI CORESET symbols are illustrated in the middle row, and the RMSI symbols are illustrated in the bottom row. The RMSI symbols may be increased in number to increase RMSI.

FIG. 19 illustrates example details for some designs utilizing legacy SSB and at 240 kHz SCS in accordance with some embodiments. In particular, FIG. 19 provides a table 1900 showing details regarding multiplexing patterns for SCS of 240 kHz for the SSB SCS. The table 1900 provides six designs for SSB SCS being equal to 240 kHz.

The table 1900 may include data SCS values 1904, ratio values 1906, enhanced multiplexing patterns 1910, and notes 1912 for each of the designs 1902. For design 7, the data SCS 1904 may be 120 kHz, the ratio 1906 may be 0.5, and the enhanced multiplexing patterns 1910 that may be utilized for design 7 is enhanced pattern 2. For design 8, the data SCS 1904 may be 480 kHz, the ratio 1906 may be 2, and the enhanced multiplexing pattern 1910 that may be utilized for design 8 is enhanced pattern 2. Enhanced pattern 2 may allow for early CORESET decoding in design 8. For design 9, the data SCS 1904 may be 960 kHz, the ratio 1906 may be 4, and the enhanced multiplexing pattern 1910 that may be utilized for design 9 is enhanced pattern 2. Enhanced pattern 2 may allow for early CORESET decoding in design 9. For design 10, the data SCS 1904 may be 120 kHz, the ratio 1906 may be 0.5, and the enhanced multiplexing pattern 1910 that may be utilized for design 10 is enhanced pattern 3. Enhanced pattern 3 may increase the number of PRBs to increase the payload in design 10. For design 11, the data SCS 1904 may be 480 kHz, the ratio 1906 may be 2, and the enhanced multiplexing pattern 1910 that may be utilized for design 11 is enhanced pattern 3.x. Enhanced pattern 3.x may provide FDM, but there may not be a perfect overlap. Enhanced pattern 3.x may provide for repetition, which may increase RMSI or reduce BW to not change AGC. For design 12, the data SCS 1904 may be 960 kHz, the ratio 1906 may be 4, and the enhanced multiplexing pattern 1910 that may be utilized for design 12 is enhanced pattern 3.x. Enhanced pattern 3.x may provide FDM, but there may not be a perfect overlap. Enhanced pattern 3.x may provide for repetition, which may increase RMSI or reduce BW to not change AGC. Designs 10, 11, and 12 may provide reduced overhead while allowing for increase in RMSI payload as compared to the other designs.

FIG. 20 illustrates example details for the designs described of FIG. 19 in accordance with some embodiments. In particular, FIG. 20 provides a table 2000 showing further details regarding multiplexing patterns for SCS of 240 kHz for the SSB SCS. The table 2000 provides six designs for SSB SCS being equal to 240 kHz.

The table 2000 may include description 2004, signals 2006, SCS value 2008 for each of the signals 2006, and the T/F Res 2010 for each of the signals 2006 for each of the designs 2002. For design 7, pattern 2 in accordance with Rel. 15 may be utilized. For design 7, the SSB signal may have SCS of 240 kHz, the RMSI CORESET signal may have SCS of 120 kHz with a T/F Res of 48 PRBs and 1 OS, and the RMSI may have SCS of 120 kHz with a T/F Res of 48 PRBs and 2 OS.

For design 8, enhanced pattern 2 with 480 kHz RMSI SCS may be utilized. For design 8, the SSB signal may have SCS of 240 kHz, the RMSI CORESET signal may have SCS of 480 kHz with a T/F Res of 48 PRBs and 1 OS, and the RMSI may have SCS of 480 kHz with a T/F Res of 48 PRBs and greater than or equal to 4 OS.

For design 9, enhanced pattern 2 with 960 kHz RMSI SCS may be utilized. For a first option of design 9, the SSB signal may have SCS of 240 kHz, the RMSI CORESET signal may have SCS of 960 kHz with a T/F Res of 48 PRBs and 1 OS, and the RMSI may have SCS of 960 kHz with a T/F Res of 48 PRBs and 4 OS. For a second option of design 9, the SSB signal may have SCS of 240 kHz, the RMSI CORESET signal may have SCS of 960 kHz with a T/F Res of 24 PRBs and 2 OS, and the RMSI may have SCS of 960 kHz with a T/F Res of 24 PRBs and 8 OS.

For design 10, enhanced pattern 3 with 120 kHz RMSI SCS may be utilized. For design 10, the SSB signal may have SCS of 240 kHz, the RMSI CORESET signal may have SCS of 120 kHz with a T/F Res of 48 PRBs and 1 OS, and the RMSI may have SCS of 120 kHz with a T/F Res of 48 PRBs and 1 OS.

For design 11, enhanced pattern 3 with 480 kHz RMSI SCS may be utilized. For design 11, the SSB signal may have SCS of 240 kHz, the RMSI CORESET signal may have SCS of 480 kHz with a T/F Res of 48 PRBs and 1 OS, and the RMSI may have SCS of 480 kHz with a T/F Res of 48 PRBs and 4 OS.

For design 12, enhanced pattern 3 with 960 kHz RMSI SCS may be utilized. For a first option of design 12, the SSB signal may have SCS of 240 kHz, the RMSI CORESET signal may have SCS of 960 kHz with a T/F Res of 48 PRBs and 1 OS, and the RMSI may have SCS of 960 kHz with a T/F Res of 48 PRBs and 4 OS. For a second option of design 12, the SSB signal may have SCS of 240 kHz, the RMSI CORESET signal may have SCS of 960 kHz with a T/F Res of 24 PRBs and 2 OS, and the RMSI may have SCS of 960 kHz with a T/F Res of 24 PRBs and 8 OS.

Figure 21:
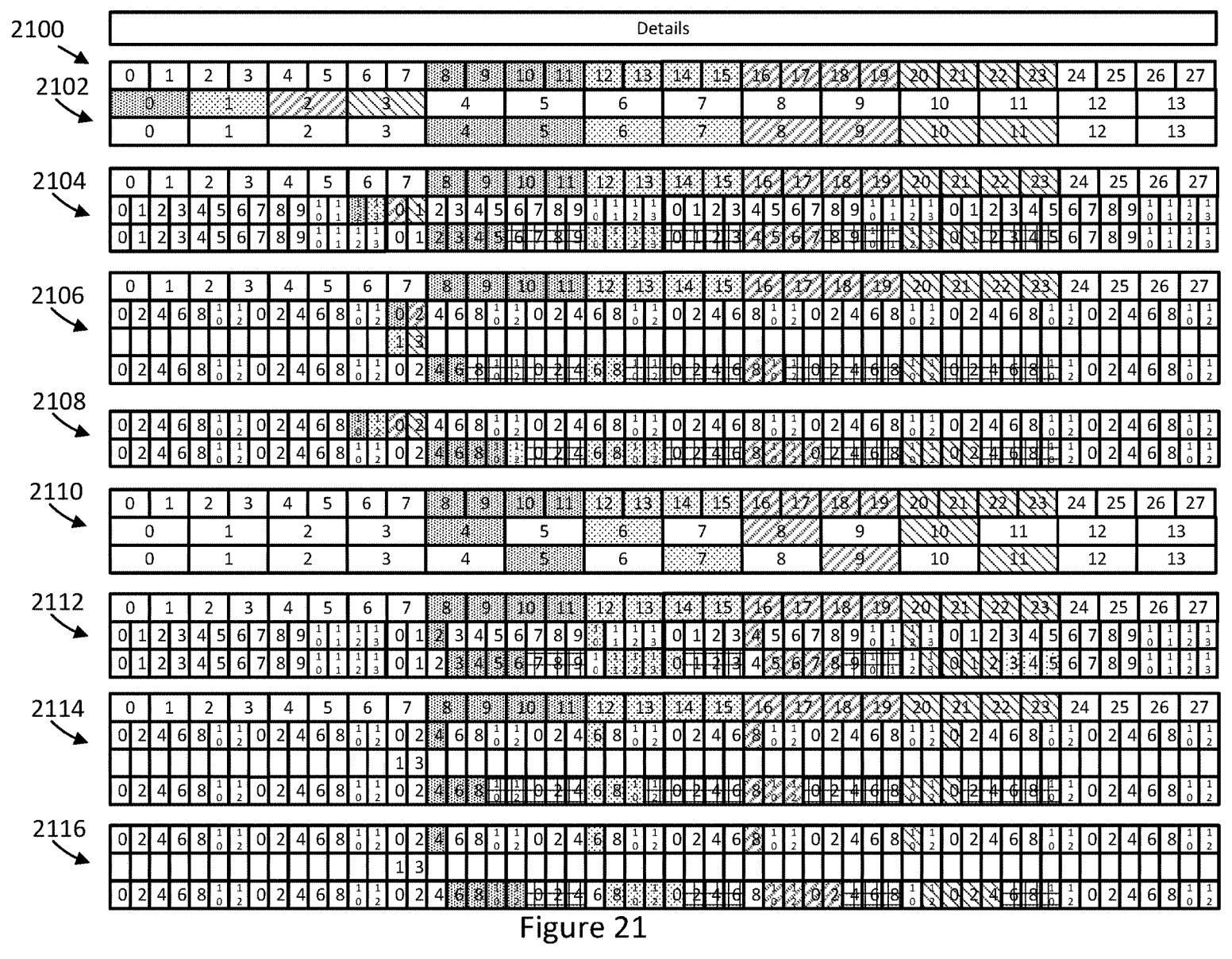

FIG. 21 illustrates example configurations 2100 of the designs of FIG. 16 in accordance with some embodiments. In particular, FIG. 21 illustrates slot arrangements of the designs for the multiplexing patterns for SCS of 240 kHz for the SSB SCS.

The configurations 2100 includes a design 7 configuration 2102. In particular, the design 7 configuration 2102 illustrates the SSB, RMSI CORESET, and RMSI symbols within slots for design 7. The SSB symbols are illustrated in the top row, the RMSI CORESET symbols are illustrated in the middle row, and the RMSI symbols are illustrated in the bottom row.

The configurations 2100 includes a design 8 configuration 2104. In particular, the design 8 configuration 2104 illustrates the SSB, RMSI CORESET, and RMSI symbols within slots for design 8. The SSB symbols are illustrated in the top row, the RMSI CORESET symbols are illustrated in the middle row, and the RMSI symbols are illustrated in the bottom row. In design 8, the RMSI CORESET symbols may be shifted to slots 10 and 11 to avoid sending the last two symbols due to conflict with an SRS. The RMSI symbols can increase in number to increase RMSI payload or repeat to prevent power change.

The configurations 2100 includes a design 9 option 1 configuration 2106. In particular, the design 9 option 1 configuration 2106 illustrates the SSB, RMSI CORESET, and RMSI symbols within slots for option 1 of design 9. The SSB symbols are illustrated in the top row, the RMSI CORESET symbols are illustrated in the middle row, and the RMSI symbols are illustrated in the bottom row. In option 1 of design 9, the RMSI can have 24 PRBs.

The configurations 2100 includes a design 9 option 2 configuration 2108. In particular, the design 9 option 2 configuration 2108 illustrates the SSB, RMSI CORESET, and RMSI symbols within slots for option 2 of design 9. The SSB symbols are illustrated in the top row, the RMSI CORESET symbols are illustrated in the middle row, and the RMSI symbols are illustrated in the bottom row.

The configurations 2100 includes a design 10 configuration 2110. In particular, the design 10 configuration 2110 illustrates the SSB, RMSI CORESET, and RMSI symbols within slots for design 10. The SSB symbols are illustrated in the top row, the RMSI CORESET symbols are illustrated in the middle row, and the RMSI symbols are illustrated in the bottom row. In design 10, there may be a reduced RMSI payload size for the RMSI CORESET and the number of PRBs may increase to increase the RMSI payload.

The configurations 2100 includes a design 11 configuration 2112. In particular, the design 11 configuration 2112 illustrates the SSB, RMSI CORESET, and RMSI symbols within slots for design 11. The SSB symbols are illustrated in the top row, the RMSI CORESET symbols are illustrated in the middle row, and the RMSI symbols are illustrated in the bottom row. The RMSI symbols may be increased in number to increase RMSI payload. In design 1, the RMSI CORESET symbols may be shifted to slots 10 and 11 to avoid sending the last two symbols due to conflict with an SRS. The RMSI symbols can increase in number to increase RMSI payload.

The configurations 2100 includes a design 12 option 1 configuration 2114. In particular, the design 12 option 1 configuration 2114 illustrates the SSB, RMSI CORESET, and RMSI symbols within slots for option 1 of design 12. The SSB symbols are illustrated in the top row, the RMSI CORESET symbols are illustrated in the middle row, and the RMSI symbols are illustrated in the bottom row.

The configurations 2100 includes a design 12 option 2 configuration 2116. In particular, the design 12 option 2 configuration 2116 illustrates the SSB, RMSI CORESET, and RMSI symbols within slots for option 2 of design 12. The SSB symbols are illustrated in the top row, the RMSI CORESET symbols are illustrated in the middle row, and the RMSI symbols are illustrated in the bottom row.

FIG. 22 illustrates example details for some designs utilizing SSB and at 480 kHz SCS and 960 kHz SCS in accordance with some embodiments. In particular, FIG. 22 provides a table 2200 showing details regarding multiplexing patterns for SCS of 480 kHz for the SSB SCS is some designs and 960 kHz for the SSB SCS in some designs. The table 2200 provides six designs for SSB SCS being equal to 480 kHz and six designs for SSB SCS being equal to 960 kHz.

The table 2200 may include SSB SCS values 2214, data SCS values 2204, ratio values 2206, legacy multiplexing patterns 2208, enhanced multiplexing patterns 2210, and notes 2212 for each of the designs 2202. Design 13 through design 18 are shown for SSB SCS values 2214 of 480 kHz.

For design 13, the data SCS 2204 may be 120 kHz, the ratio 2206 may be 0.25, and the legacy multiplexing patterns 2208 that may be utilized for design 13 is pattern 1. For design 14, the data SCS 2204 may be 480 kHz, the ratio 2206 may be 1, the legacy multiplexing pattern 2208 that may be used for design 14 are pattern 1 and 3, and the enhanced multiplexing pattern 2210 that may be utilized for design 14 is enhanced pattern 2. For design 15, the data SCS 2204 may be 960 kHz, the ratio 2206 may be 2, and the enhanced multiplexing pattern 2210 that may be utilized for design 15 is enhanced pattern 2. For design 16, the data SCS 2204 may be 120 kHz, the ratio 2206 may be 0.25, and the legacy multiplexing pattern 2208 that may be utilized for design 16 is pattern 1. For design 17, the data SCS 2204 may be 480 kHz, the ratio 2206 may be 1, and the legacy multiplexing pattern 2210 that may be utilized for design 17 are pattern 2 and pattern 3. For design 18, the data SCS 2204 may be 960 kHz, and the ratio 2206 may be 2. Designs 4, 5, and 6 may provide reduced overhead while allowing for increase in RMSI payload as compared to the other designs.

Design 16 through design 21 are shown for SSB SCS values 2214 of 960 kHz. For design 16, the data SCS 2204 may be 120 kHz, the ratio 2206 may be 0.125, and the enhanced multiplexing pattern 2210 that may be utilized for design 16 is enhanced pattern 2. For design 17, the data SCS 2204 may be 480 kHz, the ratio 2206 may be 0.5, the enhanced multiplexing pattern 2210 that may be used for design 17 is enhanced pattern 2. For design 18, the data SCS 2204 may be 960 kHz, the ratio 2206 may be 1, the legacy multiplexing patterns 2208 that may be utilized for design 18 are pattern 1 and pattern 3, and the enhanced multiplexing pattern 2210 that may be utilized for design 18 is enhanced pattern 2. For design 19, the data SCS 2204 may be 120 kHz, the ratio 2206 may be 0.125, and the legacy multiplexing pattern 2208 that may be utilized for design 19 is pattern 1. For design 20, the data SCS 2204 may be 480 kHz, the ratio 2206 may be 0.5, and the enhanced multiplexing pattern 2210 that may be utilized for design 20 is enhanced pattern 3. For design 21, the data SCS 2204 may be 960 kHz, the ratio 2206 may be 1, the legacy multiplexing patterns 2208 that may be utilized for design 21 are pattern 1 and pattern 3, and the enhanced multiplexing pattern 2210 that may be utilized for design 21 is enhanced pattern 3. Designs may be selected as same or similar if a ratio of the SSB SCS to the data SCS is same as a legacy design. For SSB SCS greater than data SCS with a ratio greater than or equal to 4, then legacy pattern 1 may be used.

There may be a requirement to change the existing 120 kHz and 240 kHz SS/PBCH transmission patterns when transmitted with 480 kHz or 960 kHz data. This may require additional spacing between the SSBs, which may be applied to the pattern designs described herein.

FIG. 23 illustrates example details for the enhanced designs in accordance with some embodiments. In particular, FIG. 23 provides a table 2300 showing details regarding multiplexing patterns for SCS of 120 kHz for the SSB SCS with additional spacing between SSBs. The table 2300 provides six designs for SSB SCS being equal to 120 kHz.

The table 2300 may include description 2304, signals 2306, SCS value 2308 for each of the signals 2306, and the T/F Res 2310 for each of the signals 2306 for each of the designs 2302. For design 1, enhanced pattern 2 may be utilized. For design 1, the SSB signal may have SCS of 120 kHz with a T/F Res of 20 PRBs and 4 OS, the RMSI CORESET signal may have SCS of 120 kHz with a T/F Res of 24 PRBs and 2 OS, and the RMSI may have SCS of 120 kHz with a T/F Res of 24 PRBs and 4 OS.

For design 2, enhanced pattern 2 with 480 kHz RMSI SCS may be utilized. For design 2, the SSB signal may have SCS of 120 kHz with a T/F Res of 20 PRBs and 4 OS, the RMSI CORESET signal may have SCS of 480 kHz with a T/F Res of 24 PRBs and 2 OS, and the RMSI may have SCS of 480 kHz with a T/F Res of 24 PRBs and greater than or equal to 4 OS.

For design 3, enhanced pattern 2 with 960 kHz RMSI SCS may be utilized. For design 9, the SSB signal may have SCS of 120 kHz with a T/F Res of 20 PRBs and 4 OS, the RMSI CORESET signal may have SCS of 960 kHz with a T/F Res of 24 PRBs and 2 OS, and the RMSI may have SCS of 960 kHz with a T/F Res of 24 PRBs and 4 OS.

For design 4, enhanced pattern 3 with 120 kHz RMSI SCS may be utilized. For design 4, the SSB signal may have SCS of 120 kHz with a T/F Res of 20 PRBs and 4 OS, the RMSI CORESET signal may have SCS of 120 kHz with a T/F Res of 24 PRBs and 2 OS, and the RMSI may have SCS of 120 kHz with a T/F Res of 24 PRBs and 4 OS.

For design 5, enhanced pattern 3 with 480 kHz RMSI SCS may be utilized. For design 5, the SSB signal may have SCS of 120 kHz with a T/F Res of 20 PRBs and 4 OS, the RMSI CORESET signal may have SCS of 480 kHz with a T/F Res of 24 PRBs and 2 OS, and the RMSI may have SCS of 480 kHz with a T/F Res of 24 PRBs and 4 OS.

For design 6, enhanced pattern 3 with 960 kHz RMSI SCS may be utilized. For design 6, the SSB signal may have SCS of 120 kHz with a T/F Res of 20 PRBs and 4 OS, the RMSI CORESET signal may have SCS of 960 kHz with a T/F Res of 24 PRBs and 2 OS, and the RMSI may have SCS of 960 kHz with a T/F Res of 24 PRBs and 4 OS.

Figure 24:
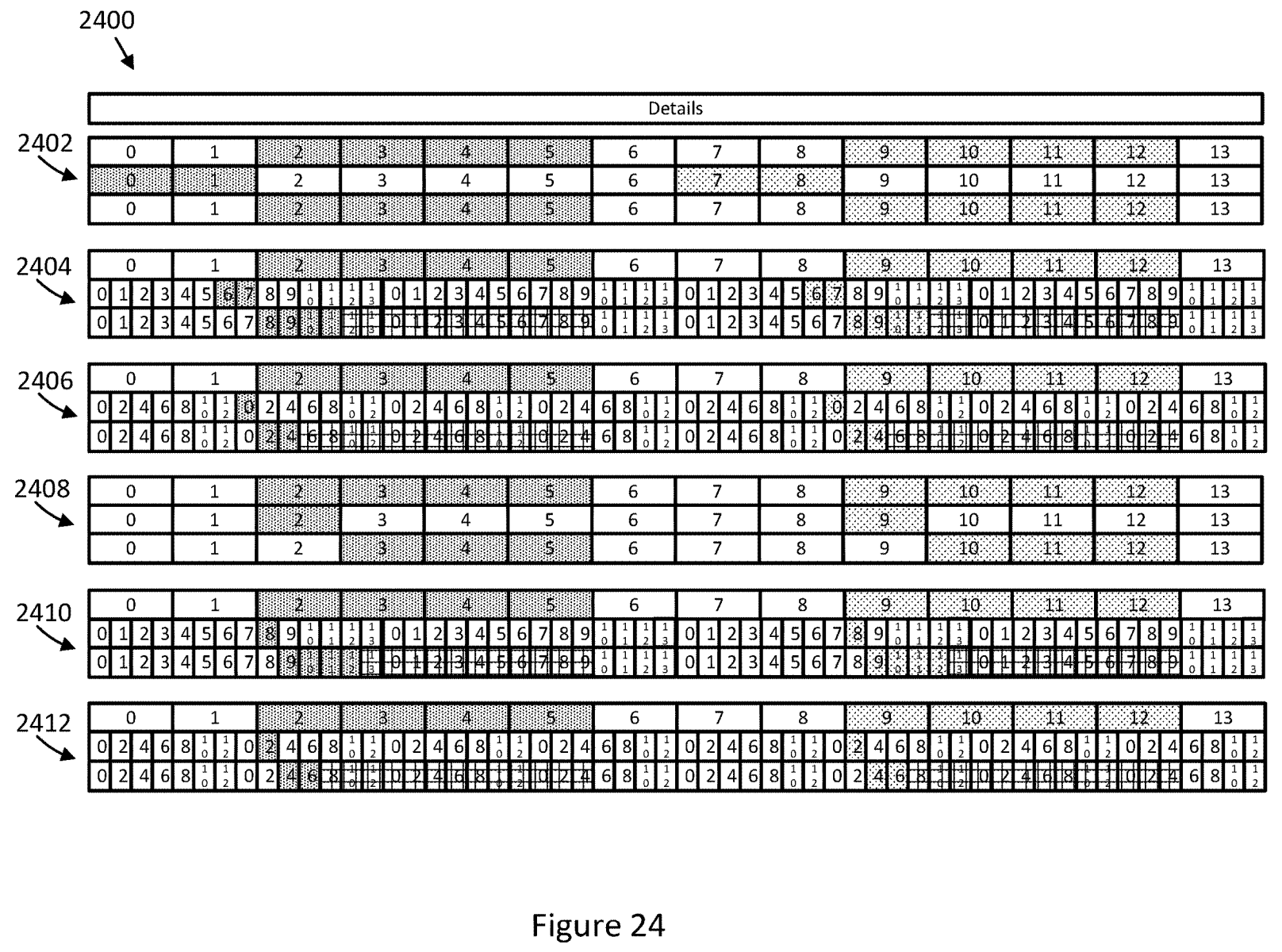

FIG. 24 illustrates example configurations 2400 of the designs of FIG. 23 in accordance with some embodiments. In particular, FIG. 24 illustrates slot arrangements of the designs for the multiplexing patterns for SCS of 120 kHz for the SSB SCS.

The configurations 2400 includes a design 1 configuration 2402. In particular, the design 1 configuration 2402 illustrates the SSB, RMSI CORESET, and RMSI symbols within slots for design 1. The SSB symbols are illustrated in the top row, the RMSI CORESET symbols are illustrated in the middle row, and the RMSI symbols are illustrated in the bottom row. For design 1, the number of RMSI symbols may be increased to increase the RMSI payload.

The configurations 2400 includes a design 2 configuration 2404. In particular, the design 2 configuration 2404 illustrates the SSB, RMSI CORESET, and RMSI symbols within slots for design 2. The SSB symbols are illustrated in the top row, the RMSI CORESET symbols are illustrated in the middle row, and the RMSI symbols are illustrated in the bottom row. For design 2, the number of RMSI symbols may be increased to increase the RMSI payload.

The configurations 2400 includes a design 3 configuration 2406. In particular, the design 3 configuration 2406 illustrates the SSB, RMSI CORESET, and RMSI symbols within slots for design 3. The SSB symbols are illustrated in the top row, the RMSI CORESET symbols are illustrated in the middle row, and the RMSI symbols are illustrated in the bottom row. For design 3, the number of RMSI symbols may be increased to increase the RMSI payload.

The configurations 2400 includes a design 4 configuration 2408. In particular, the design 4 configuration 2408 illustrates the SSB, RMSI CORESET, and RMSI symbols within slots for design 4. The SSB symbols are illustrated in the top row, the RMSI CORESET symbols are illustrated in the middle row, and the RMSI symbols are illustrated in the bottom row. For design 4, the number of RMSI symbols may be increased to increase the RMSI payload.

The configurations 2400 includes a design 5 configuration 2410. In particular, the design 5 configuration 2410 illustrates the SSB, RMSI CORESET, and RMSI symbols within slots for design 5. The SSB symbols are illustrated in the top row, the RMSI CORESET symbols are illustrated in the middle row, and the RMSI symbols are illustrated in the bottom row. For design 5, the number of RMSI symbols may be increased to increase the RMSI payload.

The configurations 2400 includes a design 6 configuration 2112. In particular, the design 6 configuration 2112 illustrates the SSB, RMSI CORESET, and RMSI symbols within slots for design 6. The SSB symbols are illustrated in the top row, the RMSI CORESET symbols are illustrated in the middle row, and the RMSI symbols are illustrated in the bottom row. For design 1, the number of CORESET symbols may be increased to increase the CORESET aggregation level. Further, the number of RMSI symbols may be increased to increase the RMSI payload.

FIG. 25 illustrates example details for the enhanced designs in accordance with some embodiments. In particular, FIG. 25 provides a table 2500 showing details regarding multiplexing patterns for SCS of 240 kHz for the SSB SCS with additional spacing between SSBs. The table 2500 provides six designs for SSB SCS being equal to 240 kHz.

The table 2500 may include description 2504, signals 2506, SCS value 2508 for each of the signals 2506, and the T/F Res 2510 for each of the signals 2506 for each of the designs 2502. For option 1 of design 7, enhanced pattern 2 may be utilized. For option 1 of design 7, the SSB signal may have SCS of 240 kHz, the RMSI CORESET signal may have SCS of 120 kHz with a T/F Res of 48 PRBs and 1 OS, and the RMSI may have SCS of 120 kHz with a T/F Res of 48 PRBs and 2 OS.

For option 2 of design 7, enhanced pattern 2 may be utilized. For option 2 of design 7, the SSB signal may have SCS of 240 kHz, the RMSI CORESET signal may have SCS of 120 kHz with a T/F Res of 48 PRBs and 1 OS, and the RMSI may have SCS of 120 kHz with a T/F Res of 48 PRBs and 2 OS.

For option 3 of design 7, enhanced pattern 2 may be utilized. For option 3 of design 7, the SSB signal may have SCS of 240 kHz, the RMSI CORESET signal may have SCS of 120 kHz with a T/F Res of 48 PRBs and 1 OS, and the RMSI may have SCS of 120 kHz with a T/F Res of 48 PRBs and 2 OS.

For option 1 of design 8, enhanced pattern 2 with 480 kHz RMSI SCS may be utilized. For option 1 of design 8, the SSB signal may have SCS of 240 kHz, the RMSI CORESET signal may have SCS of 480 kHz with a T/F Res of 48 PRBs and 1 OS, and the RMSI may have SCS of 480 kHz with a T/F Res of 48 PRBs and 4 OS.

For option 2 of design 8, enhanced pattern 2 with 480 kHz RMSI SCS may be utilized. For option 2 of design 8, the SSB signal may have SCS of 240 kHz, the RMSI CORESET signal may have SCS of 480 kHz with a T/F Res of 24 PRBs and 2 OS, and the RMSI may have SCS of 480 kHz with a T/F Res of 24 PRBs and 8 OS.

For option 1 of design 9, enhanced pattern 2 with 960 kHz RMSI SCS may be utilized. For option 1 of design 9, the SSB signal may have SCS of 240 kHz, the RMSI CORESET signal may have SCS of 960 kHz with a T/F Res of 48 PRBs and 1 OS, and the RMSI may have SCS of 960 kHz with a T/F Res of 48 PRBs and 4 OS.

For option 2 of design 9, enhanced pattern 2 with 960 kHz RMSI SCS may be utilized. For option 2 of design 9, the SSB signal may have SCS of 240 kHz, the RMSI CORESET signal may have SCS of 960 kHz with a T/F Res of 24 PRBs and 1 OS, and the RMSI may have SCS of 960 kHz with a T/F Res of PRBs and 4 OS.

For design 10, enhanced pattern 3 with 120 kHz RMSI SCS may be utilized. For design 10, the SSB signal may have SCS of 240 kHz, the RMSI CORESET signal may have SCS of 120 kHz with a T/F Res of 48 PRBs and 1 OS, and the RMSI may have SCS of 120 kHz with a T/F Res of 48 PRBs and 2 OS.

For design 11, enhanced pattern 3 with 480 kHz RMSI SCS may be utilized. For design 11, the SSB signal may have SCS of 240 kHz, the RMSI CORESET signal may have SCS of 480 kHz with a T/F Res of 48 PRBs and 1 OS, and the RMSI may have SCS of 480 kHz with a T/F Res of 48 PRBs and 1 OS.

For option 1 of design 12, enhanced pattern 3 with 960 kHz RMSI SCS may be utilized. For option 1 of design 12, the SSB signal may have SCS of 240 kHz, the RMSI CORESET signal may have SCS of 960 kHz with a T/F Res of 48 PRBs and 1 OS, and the RMSI may have SCS of 960 kHz with a T/F Res of 48 PRBs and 4 OS.

For option 2 of design 12, enhanced pattern 3 with 960 kHz RMSI SCS may be utilized. For option 2 of design 12, the SSB signal may have SCS of 240 kHz, the RMSI CORESET signal may have SCS of 960 kHz with a T/F Res of 48 PRBs and 1 OS, and the RMSI may have SCS of 960 kHz with a T/F Res of 48 PRBs and 4 OS.

Figure 26:
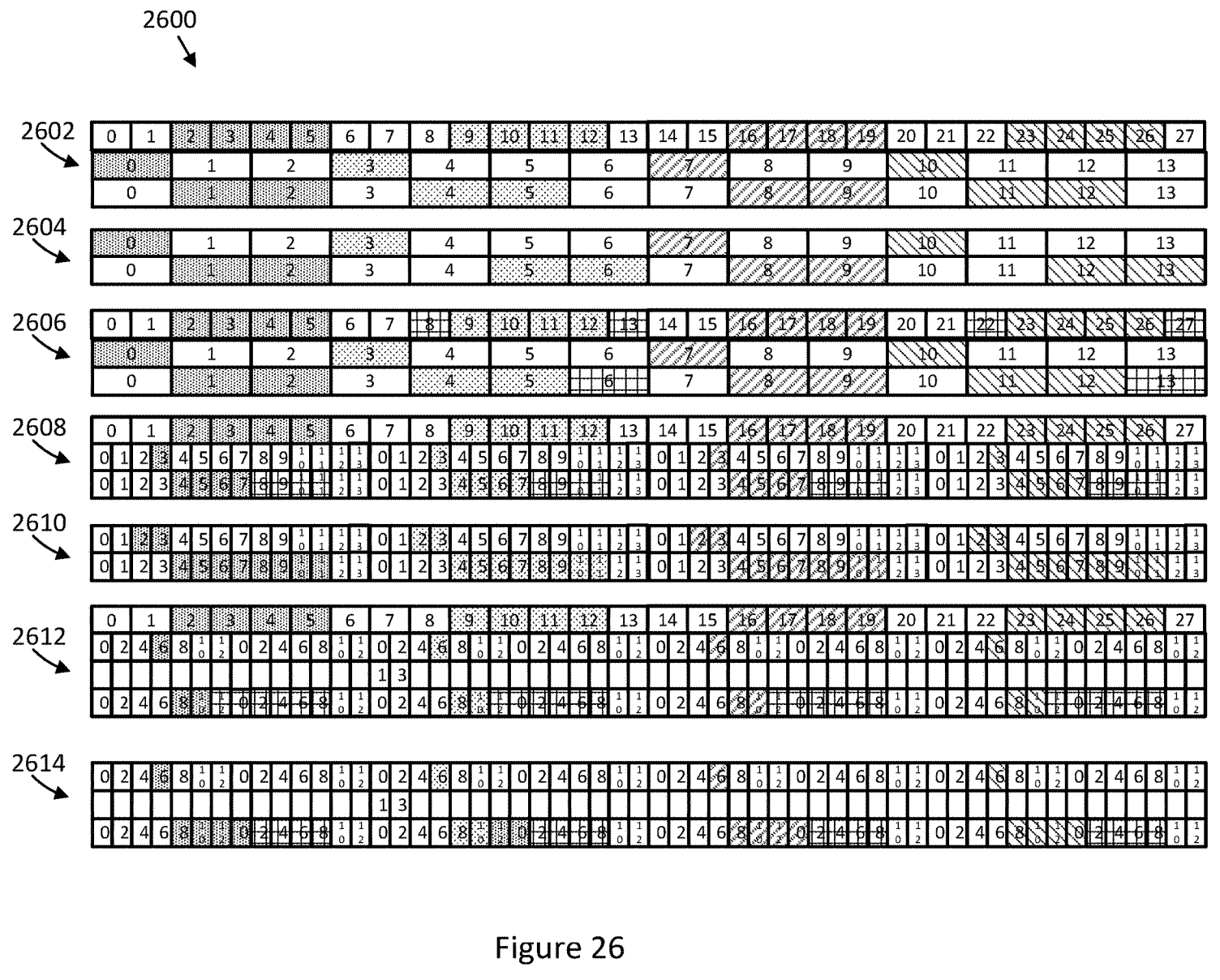

FIG. 26 illustrates example configurations 2600 of a first portion of the designs of FIG. 25 in accordance with some embodiments. In particular, FIG. 26 illustrates slot arrangements of the designs for the multiplexing patterns for SCS of 240 kHz for the SSB SCS.

The configurations 2600 includes a design 7 option 1 configuration 2602. In particular, the design 7 option 1 configuration 2602 illustrates the SSB, RMSI CORESET, and RMSI symbols within slots for the option 1 of design 7. The SSB symbols are illustrated in the top row, the RMSI CORESET symbols are illustrated in the middle row, and the RMSI symbols are illustrated in the bottom row. For design 7, the pattern 2 may not be perfect.

The configurations 2600 includes a design 7 option 2 configuration 2604. In particular, the design 7 option 2 configuration 2604 illustrates the SSB, RMSI CORESET, and RMSI symbols within slots for the option 2 of design 7. The SSB symbols are the same as illustrated in the top row of design 7 option 1. The RMSI CORESET symbols are illustrated in the top row, and the RMSI symbols are illustrated in the bottom row.

The configurations 2600 includes a design 7 option 3 configuration 2606. In particular, the design 7 option 3 configuration 2606 illustrates the SSB, RMSI CORESET, and RMSI symbols within slots for the option 3 of design 7. The SSB symbols are illustrated in the top row, the RMSI CORESET symbols are illustrated in the middle row, and the RMSI symbols are illustrated in the bottom row.

The configurations 2600 includes a design 8 option 1 configuration 2608. In particular, the design 8 option 1 configuration 2608 illustrates the SSB, RMSI CORESET, and RMSI symbols within slots for the option 1 of design 8. The SSB symbols are illustrated in the top row, the RMSI CORESET symbols are illustrated in the middle row, and the RMSI symbols are illustrated in the bottom row. For option 1 of design 8, the RMSI CORESET symbols can be shifted to 10 or 11 to avoid sending in the last two symbols due to conflict with SRS. Further, the number of symbols of the RMSI may be increased to increase the RMSI payload.

The configurations 2600 includes a design 8 option 2 configuration 2610. In particular, the design 8 option 2 configuration 2610 illustrates the SSB, RMSI CORESET, and RMSI symbols within slots for the option 2 of design 8. The SSB symbols are the same as illustrated in the top row of design 8 option 1. The RMSI CORESET symbols are illustrated in the top row, and the RMSI symbols are illustrated in the bottom row.

The configurations 2600 includes a design 9 option 1 configuration 2612. In particular, the design 9 option 1 configuration 2612 illustrates the SSB, RMSI CORESET, and RMSI symbols within slots for the option 1 of design 9. The SSB symbols are illustrated in the top row, the RMSI CORESET symbols are illustrated in the middle row, and the RMSI symbols are illustrated in the bottom row.

The configurations 2600 includes a design 9 option 2 configuration 2614. In particular, the design 9 option 2 configuration 2614 illustrates the SSB, RMSI CORESET, and RMSI symbols within slots for the option 2 of design 9. The SSB symbols are the same as illustrated in the top row of design 9 option 1. The RMSI CORESET symbols are illustrated in the top row, and the RMSI symbols are illustrated in the bottom row.

Figure 27:
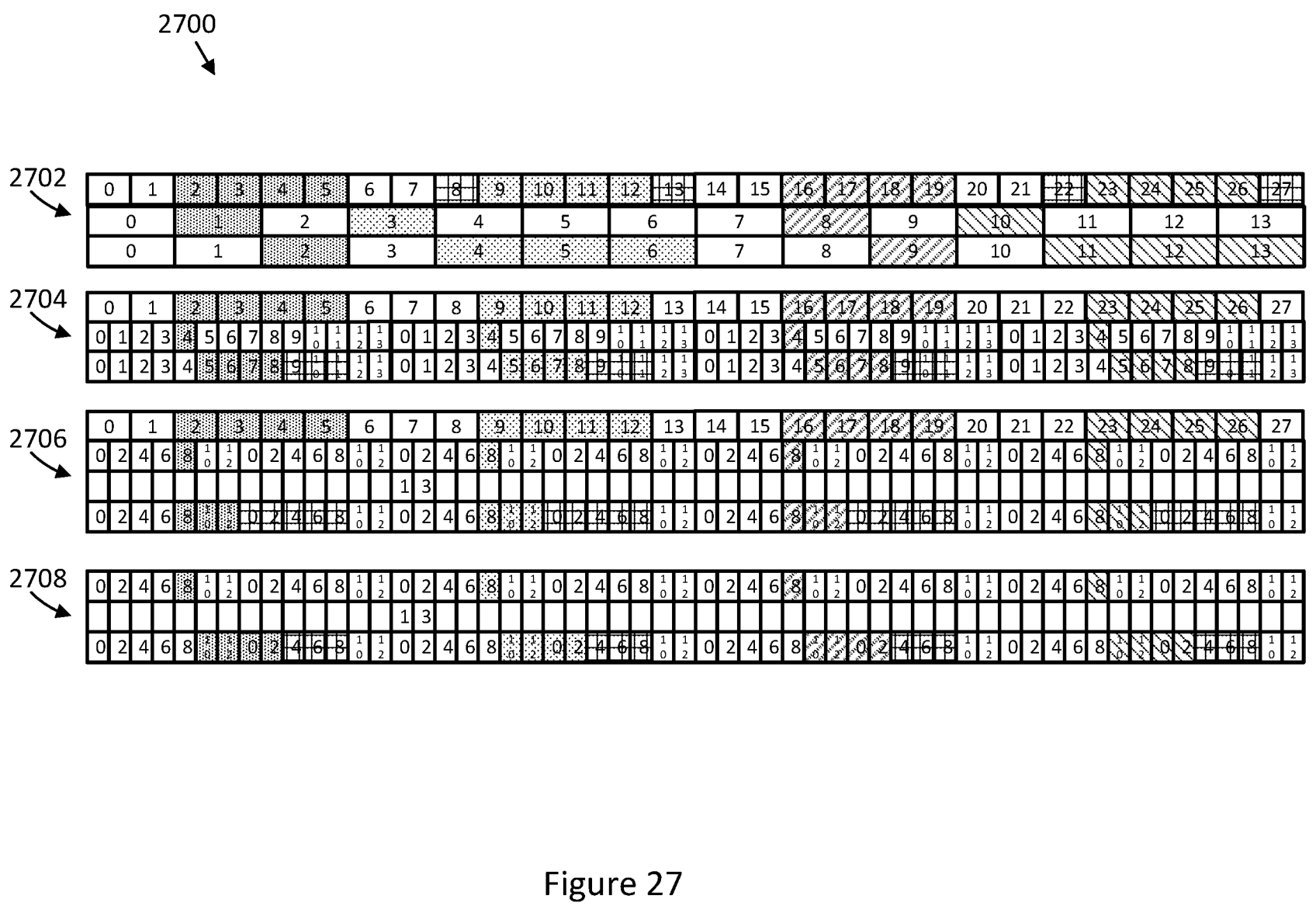

FIG. 27 illustrates example configurations 2700 of a second portion of the designs of FIG. 25 in accordance with some embodiments. In particular, FIG. 27 illustrates slot arrangements of the designs for the multiplexing patterns for SCS of 240 kHz for the SSB SCS.

The configurations 2700 includes a design 10 configuration 2702. In particular, the design 10 configuration 2702 illustrates the SSB, RMSI CORESET, and RMSI symbols within slots for design 10. The SSB symbols are illustrated in the top row, the RMSI CORESET symbols are illustrated in the middle row, and the RMSI symbols are illustrated in the bottom row. For design 10, the pattern 2 may not be perfect.

The configurations 2700 includes a design 11 configuration 2704. In particular, the design 11 configuration 2704 illustrates the SSB, RMSI CORESET, and RMSI symbols within slots for design 11. The SSB symbols are illustrated in the top row, the RMSI CORESET symbols are illustrated in the middle row, and the RMSI symbols are illustrated in the bottom row. For design 11, the RMSI CORESET symbols may be shifted to 10 or 11 to avoid sending in the last two symbols due to conflict with SRS. Further, the number of RMSI symbols can be increased to increase the RMSI payload.

The configurations 2700 includes a design 12 option 1 configuration 2706. In particular, the design 12 option 1 configuration 2706 illustrates the SSB, RMSI CORESET, and RMSI symbols within slots for the option 1 of design 12. The SSB symbols are illustrated in the top row, the RMSI CORESET symbols are illustrated in the middle row, and the RMSI symbols are illustrated in the bottom row.

The configurations 2700 includes a design 12 option 2 configuration 2708. In particular, the design 12 option 2 configuration 2708 illustrates the SSB, RMSI CORESET, and RMSI symbols within slots for the option 2 of design 12. The SSB symbols are the same as illustrated in the top row of design 12 option 1. The RMSI CORESET symbols are illustrated in the top row, and the RMSI symbols are illustrated in the bottom row.

Figure 28:
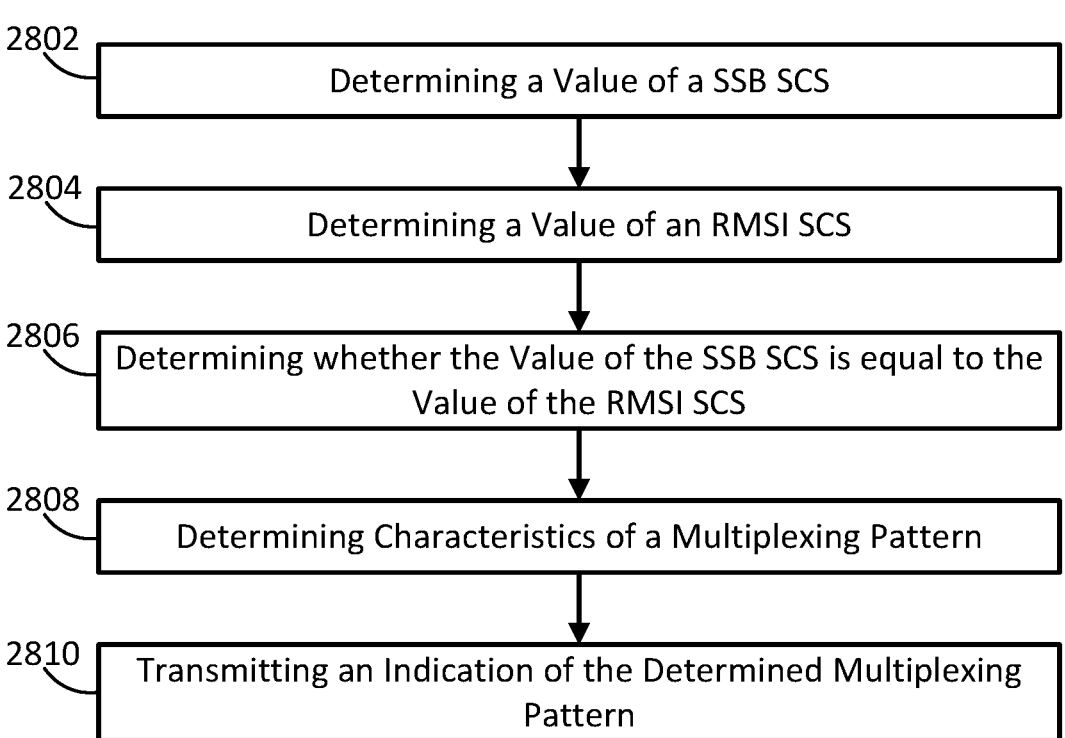
FIG. 28 illustrates an example procedure for determining and transmitting a multiplexing pattern in accordance with some embodiments.

FIG. 28 illustrates an example procedure 2800 for determining and transmitting a multiplexing pattern in accordance with some embodiments. A gNB (such as the gNB 3600 (FIG. 36)) may perform the procedure 2800. In particular, the gNB may perform the procedure 2800 for determining a multiplexing pattern to be utilized for communication with a UE (such as the UE 3500 (FIG. 35)).

The procedure 2800 may include determining a value of a SSB SCS in 2802. In particular, the gNB may determine a value of a SSB SCS for a multiplexing pattern between a SSB and RMSI to operate between 52.6 GHz and 71 GHz. For example, the communication between the gNB and the UE may be to operate in NR operating between 52.6 GHz and 71 GHz. The gNB may determine the value of the SSB SCS to be any of the SSB SCS values described throughout this disclosure.

The procedure 2800 may include determining a value of an RMSI SCS in 2804. In particular, the gNB may determine a value of the RMSI SCS for the multiplexing pattern. The gNB may determine the value of the RMSI SCS to be any of the RMSI SCS values described throughout this disclosure.

The procedure 2800 may include determining whether the value of the SSB SCS is equal to the value of the RMSI SCS in 2806. In particular, the gNB may determine whether the value of the SSB SCS determined in 2802 is equal to the value of the RMSI SCS determined in 2804. In some instances, the gNB may determine that the value of the SSB SCS is equal to the value of the RMSI SCS. In other instances, the gNB may determine that the value of the SSB SCS is different from the value of the RMSI SCS.

The procedure 2800 may include determining characteristics for a multiplexing pattern in 2808. In particular, the gNB may determine characteristics and/or the multiplexing pattern to be utilized for multiplexed SSB and RMSI transmissions between the gNB and the UE. The gNB may determine the characteristics and/or the multiplexing pattern based on whether the value of the SSB SCS is equal to the value of the RMSI SCS, as determined in 2806. The characteristics and/or the multiplexing pattern may be any of the characteristics and/or multiplexing patterns described throughout the disclosure.

Determining the characteristics may include determining that the multiplexing pattern is to utilize a RB size of 24, 36, 48, 60, 72, 84, 96, or 192 RBs for an RMSI payload when the value of the SSB SCS is different from the value of the RMSI. For example, the gNB may determine that the multiplexing pattern is to utilize a maximum RB size of 24, 36, 48, 60, 72, 84, 96, or 192 RBs for the RMSI payload. Determining the characteristics may further include determining that the multiplexing pattern is to include a multiplexing pattern 3 with a one or two symbol CORSET and a two or three symbol PDSCH in some instances when the value of the SSB SCS is equal to the RMSI SCS. In other instances when the value of the SSB SCS is equal to the RMSI SCS, determining the characteristics may include determining that the multiplexing pattern is to include a multiplexing pattern 2 with a one or two symbol CORESET and a four symbol PDSCH. The multiplexing pattern 3 may have a PDSCH duration of three or six symbols and/or may utilize an RB size of 36, 60, 72, 84, or 96 RBs. The multiplexing pattern 2 may utilize an RB size of 36, 60, 72, 84, or 96 RBs.

The gNB may determine that multiplexing pattern is to utilize an RB size of 46, 96, or 192 RBs within a multiplexing pattern 3 with a one symbol CORESET and a one symbol RMSI based on the value of the SSB SCS being determined to be different from the value of the RMSI SCS. In other instances, the gNB may determine that the multiplexing pattern is to utilize an RB size of 36, 60, 72, 84, or 96 RBs within a multiplexing pattern 2 based on the value of the SSB SCS being determined to be different from the value of the RMSI SCS.

In some embodiments, the multiplexing pattern 2 is to have the one or two symbol CORESET transmitted in a same frequency range as the four symbol PDSCH. Further the one or two symbol CORESET may be transmitted at an earlier time than the four symbol PDSCH. The one or two symbol CORESET may also be transmitted in a different frequency range and at an earlier time than SSBs of the multiplexing pattern 2. The four symbol PDSCH may be transmitted in a different frequency range and at a same time as the SSBs of the multiplexing pattern 2. In some embodiments, the one or two symbol CORESET may be transited directly prior in time to the four symbol PDSCH.

The procedure 2800 may include transmitting the determined multiplexing pattern in 2810. In particular, the gNB may transmit the multiplexing pattern and/or the characteristics of the multiplexing pattern to the UE. The multiplexing pattern may indicate to the UE the multiplexing pattern that the gNB will be utilizing for transmitting the multiplexed SSB and RMSI transmissions to the UE to facilitate processing of the SSB and RMSI transmissions by the UE. In some embodiments, transmitting the multiplexing pattern may include transmitting an indication of the multiplexing pattern.

Figure 29:
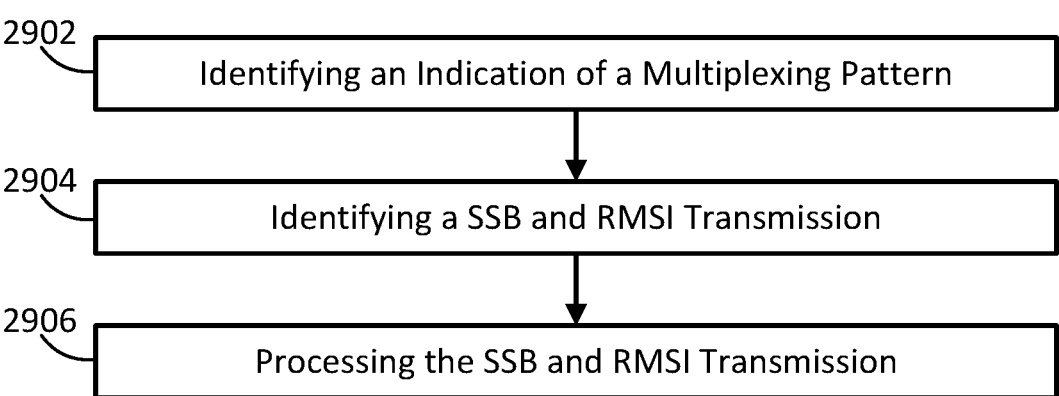
FIG. 29 illustrates an example procedure for processing of SSB and remaining minimum system information (RMSI) transmissions in accordance with some embodiments.

FIG. 29 illustrates an example procedure 2900 for processing of SSB and RMSI transmissions in accordance with some embodiments. The procedure 2900 may be performed by a UE (such as the UE 3500 (FIG. 35)) to process multiplexed SSB and RMSI transmissions provided by a gNB (such as the gNB 3600 (FIG. 36)).

The procedure 2900 may include identifying a multiplexing pattern in 2902. In particular, the UE may identify a multiplexing pattern to be utilized by a gNB for providing multiplexed SSB and RMSI transmissions to the UE. The gNB may have determined to utilize one of the multiplexing patterns described herein for providing multiplexed SSB and RMSI transmissions and may provide the multiplexing pattern to the UE. In some embodiments, providing the multiplexing pattern to the UE may include providing an indication of the multiplexing pattern to the UE.

The multiplexing pattern may be a multiplexing pattern between a SSB and RMSI for operation between 526 GHz and 71 GHz to be provided by the gNB. The multiplexing pattern may include a pattern 2 multiplexing pattern with a one or two symbol CORESET and a four symbol PDSCH. In other instances, the multiplexing pattern may include a pattern 2 multiplexing pattern having a 36, 60, 72, 84, or 96 RB size. Further, the multiplexing pattern may include a pattern 3 multiplexing pattern with a one, two, or three symbol CORESET and a two or three symbol PDSCH, or a pattern 3 multiplexing pattern having a 48, 96, or 192 RB size in other instances.

The pattern 2 multiplexing pattern with the one or two symbol CORESET and the four symbol PDSCH is to have up to three symbols between the one or two symbol CORESET and the four symbol PDSCH in some instances. Further, the pattern 3 multiplexing pattern having the 48, 96, or 192 RB size may have a one symbol CORESET and a 1 symbol RMSI in some instances.

The multiplexing pattern may be determined based on whether a value of SSB SCS is equal to a value of RMSI SCS. For example, the pattern 2 multiplexing pattern with the one or two symbol CORESET and the four symbol PDSCH is to be utilized when a value of the SSB SCS is equal to a value of the RMSI SCS. In some instances, the pattern 2 multiplexing pattern having 36, 60, 72, 84, or 96 RB is to be utilized when a value of the SSB SCS is different than a value of RMSI SCS. In other instances, the pattern 3 multiplexing pattern having the 48, 96, or 192 RB size is to be utilized when a value of the SSB SCS is different than a value of the RMSI SCS.

The procedure 2900 may include identifying a SSB and RMSI transmission in 2904. In particular, the UE may identify a multiplexed SSB and RMSI transmission received from the gNB. The multiplexed SSB and RMSI transmission may be multiplexed in accordance with the multiplexing pattern provided in 2902.

The procedure 2900 may include processing the SSB and RMSI transmission in 2906. In particular, the UE may process the multiplexed SSB and RMSI transmission received from the gNB.

FIG. 30 illustrates an example procedure 3000 for providing a selected multiplexing pattern in accordance with some embodiments. The procedure 3000 may be performed by a gNB, such as the gNB 3600 (FIG. 36). The gNB may perform the procedure 3000 to indicate to a UE (such as the UE 3500 (FIG. 35)) a multiplexing pattern the gNB will be utilizing to provide multiplexed SSB and RMSI to the UE.

The procedure 3000 may include selecting a multiplexing pattern in 3002. In particular, the gNB may select a multiplexing pattern for between a SSB and RMSI for operation within the frequency range between 62.6 GHz and 71 GHz. The gNB may select a multiplexing pattern from a plurality of multiplexing patterns, such as the multiplexing patterns described throughout this disclosure.

In some embodiments, the multiplexing patterns from which the gNB may select may include a pattern 2 multiplexing pattern with a one or two symbol CORESET and a four symbol PDSCH, and up to three symbols between SSB block. The multiplexing patterns for selection may further include a pattern 3 multiplexing pattern with a one, two, or three symbol CORESET and a two or three symbol PDSCH, and a PDSCH duration of three or six symbols. The multiplexing patterns for selection may further include a pattern 2 multiplexing pattern with a number of RBs for a CORESET being equal to 24 or 48 and a two symbol RMSI. Further, the multiplexing patterns for selection may include a pattern 3 multiplexing pattern with a one symbol CORESET and a one symbol RMSI.

Selecting the multiplexing pattern may include determining that a value of SSB SCS is equal to a value of RMSI SCS in some embodiments. Further, selecting the multiplexing pattern may include to select from the pattern 2 multiplexing pattern with the one or two symbol CORESET and the four symbol PDSCH and the pattern 3 multiplexing pattern with the one, two, or three symbol CORESET and the two or three symbol PDSCH based on the value of the SSB SCS being equal to the value of the RMSI SCS.

Selecting the multiplexing pattern may include determining that a value of the SSB SCS is different from a value of the RMSI SCS. Further, selecting the multiplexing pattern may include selecting from the pattern 2 multiplexing pattern with the number of RBs for the CORESET being equal to 24 or 48 and the two symbol RMSI, and the pattern 3 multiplexing pattern with the one symbol CORESET and the one symbol RMSI based on the value of the SSB SCS being different from the value of the RMSI SCS.

The pattern 2 multiplexing pattern with the one or two symbol CORESET and the four symbol PDSCH may have an RMSI payload of 36, 60, 72, 84, or 96 RBs in some embodiments. Further, the pattern 3 multiplexing pattern with the one, two, or three symbol CORESET and the two or three symbol PDSCH may have an RMSI payload of 36, 60, 72, 84, or 96 RBs in some embodiments. In some embodiments, the pattern 2 multiplexing pattern with a number of RBs for the CORESET being equal to 24 or 48 and the two symbol RMSI may have a RMSI payload of 36, 60, 72, 84, or 96 RBs. The pattern 3 multiplexing pattern with the one symbol CORESET and the one symbol RMSI has an RMSI payload of 48, 96, or 192 RBs in some embodiments.

The procedure 3000 may include storing the selected multiplexing pattern in 3004. In particular, the gNB may store the multiplexing pattern or an indication of the multiplexing pattern in a memory of the gNB.

The procedure 3000 may include providing an selected multiplexing pattern in 3006. In particular, the gNB may provide the selected multiplexing pattern to the UE. In some embodiments, the multiplexing pattern provided may be an indication of the multiplexing pattern and the indication provided may be the indication stored in the memory of the gNB or may be an indication based off the multiplexing pattern stored in the memory of the gNB. The multiplexing pattern that the gNB will utilize for providing multiplexed SSB and RMSI transmission to the UE.

Figure 31:
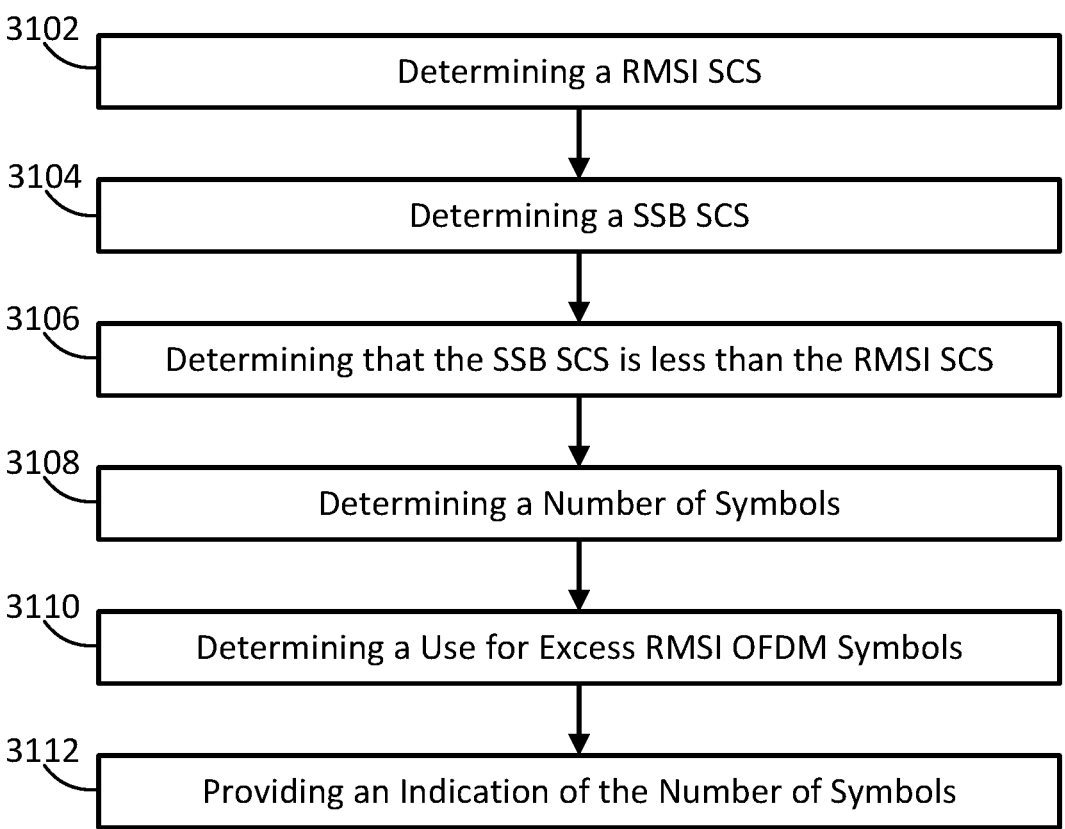
FIG. 31 illustrates an example procedure for determining a number of symbols of a multiplexing pattern to be utilized for the RMSI in accordance with some embodiments.

FIG. 31 illustrates an example procedure 3100 for determining a number of symbols of a multiplexing pattern to be utilized for the RMSI in accordance with some embodiments. In particular, a gNB (such as the gNB 3600 (FIG. 36)) may perform the procedure 3100 to determine a number of symbols.

The procedure 3100 may include determining a RMSI SCS in 3102. In particular, a gNB may determine a RMSI SCS for a multiplexing pattern between a SSB and RMSI to be utilized for transmission to a UE (such as the UE 3500 (FIG. 35)) that is to operate in mmWave. The RMSI SCS may be any of the values of RMSI SCS described throughout the disclosure.

The procedure 3100 may include determining a SSB SCS in 3104. In particular, the gNB may determine a SSB SCS for the multiplexing pattern. The SSB SCS may be any of the values of SSB SCS described throughout the disclosure.

The procedure 3100 may include determining that the SSB SCS is less than the RMSI in 3106. In particular, the gNB may compare the RMSI SCS determined in 3102 and the SSB SCS determined in 3104. Based on the comparison the gNB may determine that the RMSI SCS is less than the SSB SCS.

The procedure 3100 may include determining a number of symbols in 3108. In particular, the gNB may determine a number of symbols of the multiplexing pattern to be utilized for the RMSI based on the SSB SCS being less than the RMSI SCS. For example, the gNB may determine the number of symbols to be utilized for the RMSI based on the ratio between the SSB SCS and the RMSI SCS. Due to the RMSI SCS being larger than the SSB SCS, there may be more RMSI symbols than there are SSB SCS symbols in a same time period. The number of RMSI symbols may be determined based on a size of RMSI to be transmitted, any possible transmission conflicts, symbols available for transmission or some combination thereof. In some embodiments, determining the number of symbols to be utilized for RMSI may include determining that regions of the RMSI that are non-overlapping with the SSB are to be utilized for transmission of garbage/unspecified (for example, random data that may not be processed), repetition of the RMSI, or longer RMSI.

The procedure 3100 may further include determining a user for excess RMSI OFDM symbols in 3110. In particular, the gNB may determine a use for excess RMSI OFDM symbols of the multiplexing produced due to the value of the SSB SCS being less than the value of the RMSI. In some embodiments, the gNB may determine to use the excess RMSI OFDM symbols for RMSI payload increase. In other embodiments, the gNB may determine to use the excess RMSI OFDM symbols to reduce a number of PRBs blocks with the RMSI OFDM symbols or to perform RMSI repetition.

The procedure 3100 may include providing an indication of the number of symbols in 3112. In particular, the gNB may provide an indication of the number of symbols to be utilized for the RMSI to the UE. The gNB may provide the indication via a PBCH or a DCI field in a CORESET #0. In some embodiments, the indication of the number of symbols may include an indication of a TDRA table that indicates the number of symbols. The indication of the TDRA table may be provided via a PBCH or a DCI field in a CORESET #0. The TDRA table may include a two-bit multiplication factor, where a length in a TDRA field of the TDRA is to be multiplied by the two-bit multiplication factor. For example, the length may indicate a standard number of symbols to be utilized for the RMSI and the multiplication factor may adjust the number of symbols based on factors, such as the ratio of the SSB SCS to the RMSI SCS.

FIG. 32 illustrates an example procedure 3200 for processing an SSB and RMSI transmission in accordance with some embodiments. In particular, a UE (such as the UE 3500 (FIG. 35)) may perform the procedure 3200 to process an SSB and RMSI transmission received from a gNB (such as the gNB 3600 (FIG. 36)).

The procedure 3200 may include identifying an indication of a number of RMSI symbols in 3202. In particular, the UE may identify an indication of a number of RMSI symbols for a multiplexing pattern between a SSB and RMSI that is to operate in mmWave. Identifying the indication may include identifying the indication of the number of RMSI symbols transmitted from the gNB via a PBCH or a DCI field in a CORESET #0 in some embodiments. In other embodiments, identifying the indication may include identifying the indication of the number of RMSI symbols in a TDRA table. For example, the TDRA table may be stored in a memory of the UE and the UE may access the TDRA table from the memory. The TDRA table may include a multiplication factor, wherein a length in a TDRA field of the TDRA table is to be multiplied by the multiplication factor to produce the indication of the number of RMSI symbols. In some embodiments, the UE may identify the indication of the number of RMSI symbols from the memory of the UE.

The procedure 3200 may include identifying a SSB and RMSI transmission in 3204. In particular, the UE may identify a SSB and RMSI transmission having the multiplexing pattern transmitted by the gNB.

The procedure 3200 may include processing the SSB and RMSI transmission in 3206. In particular, the UE may process the SSB and RMSI transmission based on the number of RMSI symbols indicated in 3202. For example, the UE may utilize the number of RMSI symbols along with the multiplexing pattern to process the SSB and RMSI transmission.

FIG. 33 illustrates an example procedure 3300 for determining a use for excess symbols in a multiplexing pattern in accordance with some embodiments. In particular, a gNB (such as gNB 3600 (FIG. 36)) may determine a use of excess symbols of a multiplexing pattern to be utilized for an SSB and RMSI transmission to a UE (such as the UE 3500 (FIG. 35)).

The procedure 3300 may include determining a SSB SCS and a RMSI SCS in 3302. In particular, the gNB may determine a SSB and a RMSI SCS for a multiplexing pattern between SSB and RMSI for operation in mmWave. In some embodiments, the multiplexing pattern may have a RMSI CORESET that is begin transmission at a same time as the SSB. The transmission of the RMSI CORESET and the RMSI of the multiplexing pattern is to finish before transmission of the SSB is to finish.

The procedure 3300 may include determining that the SSB SCS is less than the RMSI SCS in 3304. In particular, the gNB may determine that the SSB SCS for the multiplexing pattern is less than the RMSI for the multiplexing pattern.

The procedure 3300 may include determining a number of symbols in 3306. In particular, the gNB may determine a number of symbols of the multiplexing pattern to be utilized for the RMSI based on the RMSI SCS. In some embodiments, the number of symbols may be determined based on a ratio between the RMSI SCS and the SSB SCS.

The procedure 3300 may include determining a use for excess symbols in 3308. In particular, the gNB may determine a use for excess symbols of the multiplexing pattern due to the SSB SCS being less than the RMSI SCS. In some embodiments, determining the use of the excess symbols may include determining to use the excess symbols for RMSI payload, reduction of resource blocks within symbols of the multiplexing patter, or RMSI repetition.

The procedure 3300 may include providing an indication of the number of symbols in 3310. In particular, the gNB may provide an indication of the number of symbols to be utilized for the RMSI to the UE via a PBCH or a DCI field in a CORESET #0.

Figure 34:
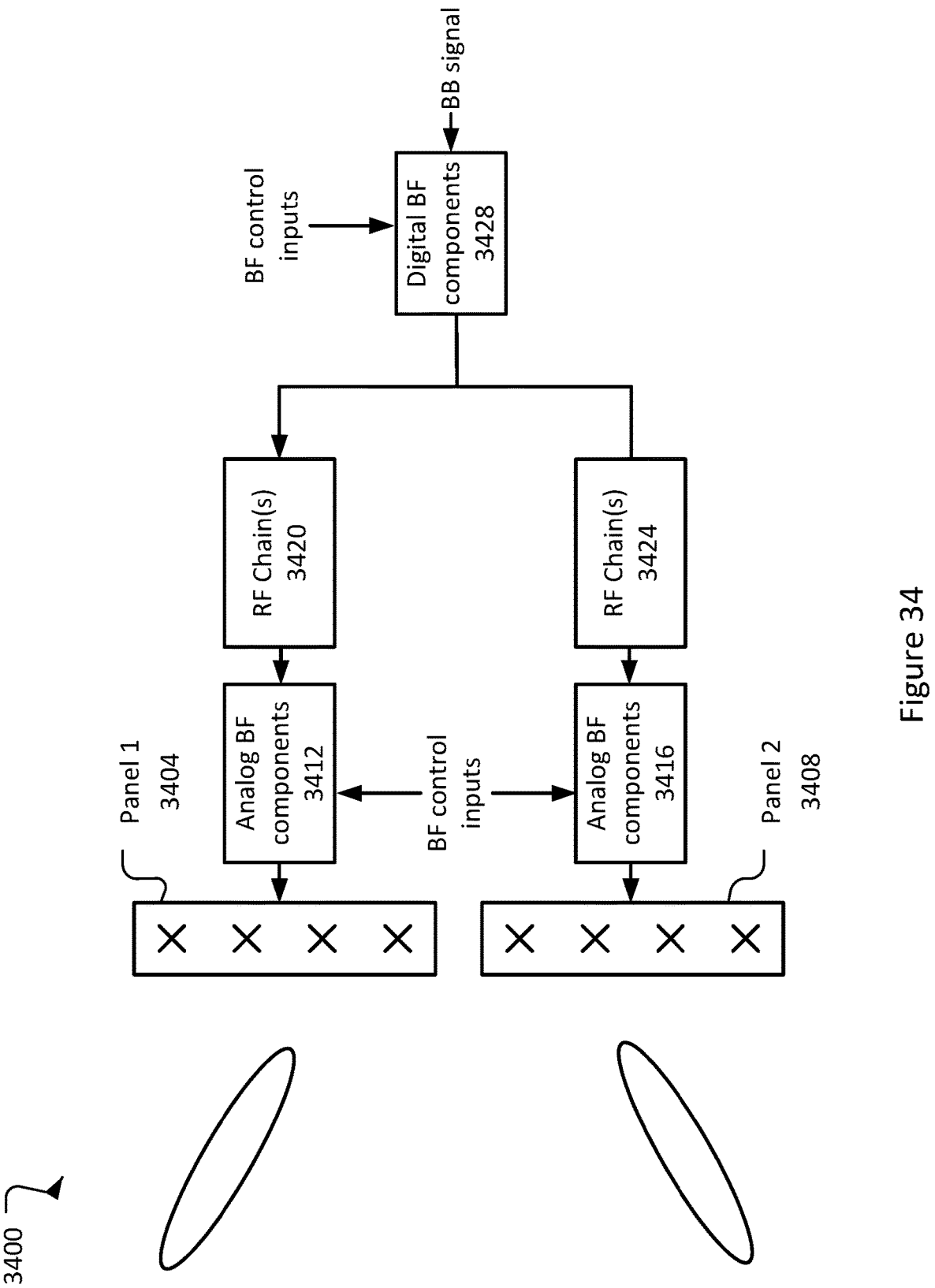
FIG. 34 illustrates example beamforming circuitry in accordance with some embodiments.

FIG. 34 illustrates example beamforming circuitry 3400 in accordance with some embodiments. The beamforming circuitry 3400 may include a first antenna panel, panel 1 3404, and a second antenna panel, panel 2 3408. Each antenna panel may include a number of antenna elements. Other embodiments may include other numbers of antenna panels.

Digital beamforming (BF) components 3428 may receive an input baseband (BB) signal from, for example, a baseband processor such as, for example, baseband processor 3504A of FIG. 35. The digital BF components 3428 may rely on complex weights to pre-code the BB signal and provide a beamformed BB signal to parallel radio frequency (RF) chains 3420/3424.

Each RF chain 3420/3424 may include a digital-to-analog converter to convert the BB signal into the analog domain; a mixer to mix the baseband signal to an RF signal; and a power amplifier to amplify the RF signal for transmission.

The RF signal may be provided to analog BF components 3412/3416, which may apply additionally beamforming by providing phase shifts in the analog domain. The RF signals may then be provided to antenna panels 3404/3408 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

FIG. 35 illustrates an example UE 3500 in accordance with some embodiments. The UE 3500 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 3500 may be a RedCap UE or NR-Light UE.

The UE 3500 may include processors 3504, RF interface circuitry 3508, memory/storage 3512, user interface 3516, sensors 3520, driver circuitry 3522, power management integrated circuit (PMIC) 3524, antenna structure 3526, and battery 3528. The components of the UE 3500 may be implemented as integrated circuits (ICs), portions thereof, discrete electronic devices, or other modules, logic, hardware, software, firmware, or a combination thereof. The block diagram of FIG. 35 is intended to show a high-level view of some of the components of the UE 3500. However, some of the components shown may be omitted, additional components may be present, and different arrangement of the components shown may occur in other implementations.

The components of the UE 3500 may be coupled with various other components over one or more interconnects 3532, which may represent any type of interface, input/output, bus (local, system, or expansion), transmission line, trace, optical connection, etc. that allows various circuit components (on common or different chips or chipsets) to interact with one another.

The processors 3504 may include processor circuitry such as, for example, baseband processor circuitry (BB) 3504A, central processor unit circuitry (CPU) 3504B, and graphics processor unit circuitry (GPU) 3504C. The processors 3504 may include any type of circuitry or processor circuitry that executes or otherwise operates computer-executable instructions, such as program code, software modules, or functional processes from memory/storage 3512 to cause the UE 3500 to perform operations as described herein.

In some embodiments, the baseband processor circuitry 3504A may access a communication protocol stack 3536 in the memory/storage 3512 to communicate over a 3GPP compatible network. In general, the baseband processor circuitry 3504A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 3508.

The baseband processor circuitry 3504A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 3512 may include one or more non-transitory, computer-readable media that includes instructions (for example, communication protocol stack 3536) that may be executed by one or more of the processors 3504 to cause the UE 3500 to perform various operations described herein. The memory/storage 3512 include any type of volatile or non-volatile memory that may be distributed throughout the UE 3500. In some embodiments, some of the memory/storage 3512 may be located on the processors 3504 themselves (for example, L1 and L2 cache), while other memory/storage 3512 is external to the processors 3504 but accessible thereto via a memory interface. The memory/storage 3512 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 3508 may include transceiver circuitry and radio frequency front module (RFEM) that allows the UE 3500 to communicate with other devices over a radio access network. The RF interface circuitry 3508 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 3526 and proceed to filter and amplify (with a low-noise amplifier) the signal. The signal may be provided to a receiver of the transceiver that down-converts the RF signal into a baseband signal that is provided to the baseband processor of the processors 3504.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 3526.

In various embodiments, the RF interface circuitry 3508 may be configured to transmit/receive signals in a manner compatible with NR access technologies.

The antenna 3526 may include antenna elements to convert electrical signals into radio waves to travel through the air and to convert received radio waves into electrical signals. The antenna elements may be arranged into one or more antenna panels. The antenna 3526 may have antenna panels that are omnidirectional, directional, or a combination thereof to enable beamforming and multiple input, multiple output communications. The antenna 3526 may include microstrip antennas, printed antennas fabricated on the surface of one or more printed circuit boards, patch antennas, phased array antennas, etc. The antenna 3526 may have one or more panels designed for specific frequency bands including bands in FR1 or FR2.

In some embodiments, the UE 3500 may include the beamforming circuitry 3400 (FIG. 34), where the beamforming circuitry 3400 may be utilized for communication with the UE 3500. In some embodiments, components of the UE 3500 and the beamforming circuitry may be shared. For example, the antennas 3526 of the UE may include the panel 1 3404 and the panel 2 3408 of the beamforming circuitry 3400.

The user interface circuitry 3516 includes various input/output (I/O) devices designed to enable user interaction with the UE 3500. The user interface 3516 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 3500.

The sensors 3520 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 3522 may include software and hardware elements that operate to control particular devices that are embedded in the UE 3500, attached to the UE 3500, or otherwise communicatively coupled with the UE 3500. The driver circuitry 3522 may include individual drivers allowing other components to interact with or control various input/output (I/O) devices that may be present within, or connected to, the UE 3500. For example, driver circuitry 3522 may include a display driver to control and allow access to a display device, a touchscreen driver to control and allow access to a touchscreen interface, sensor drivers to obtain sensor readings of sensor circuitry 3520 and control and allow access to sensor circuitry 3520, drivers to obtain actuator positions of electro-mechanic components or control and allow access to the electro-mechanic components, a camera driver to control and allow access to an embedded image capture device, audio drivers to control and allow access to one or more audio devices.

The PMIC 3524 may manage power provided to various components of the UE 3500. In particular, with respect to the processors 3504, the PMIC 3524 may control power-source selection, voltage scaling, battery charging, or DC-to-DC conversion.

In some embodiments, the PMIC 3524 may control, or otherwise be part of, various power saving mechanisms of the UE 3500. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 3500 may power down for brief intervals of time and thus save power. If there is no data traffic activity for an extended period of time, then the UE 3500 may transition off to an RRC_Idle state, where it disconnects from the network and does not perform operations such as channel quality feedback, handover, etc. The UE 3500 goes into a very low power state and it performs paging where again it periodically wakes up to listen to the network and then powers down again. The UE 3500 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 3528 may power the UE 3500, although in some examples the UE 3500 may be mounted deployed in a fixed location, and may have a power supply coupled to an electrical grid. The battery 3528 may be a lithium ion battery, a metal-air battery, such as a zinc-air battery, an aluminum-air battery, a lithium-air battery, and the like. In some implementations, such as in vehicle-based applications, the battery 3528 may be a typical lead-acid automotive battery.

FIG. 36 illustrates an example gNB 3600 in accordance with some embodiments. The gNB 3600 may include processors 3604, RF interface circuitry 3608, core network (CN) interface circuitry 3612, memory/storage circuitry 3616, and antenna structure 3626.

The components of the gNB 3600 may be coupled with various other components over one or more interconnects 3628.

The processors 3604, RF interface circuitry 3608, memory/storage circuitry 3616 (including communication protocol stack 3310), antenna structure 3626, and interconnects 3628 may be similar to like-named elements shown and described with respect to FIG. 35.

The CN interface circuitry 3612 may provide connectivity to a core network, for example, a 5th Generation Core network (5GC) using a 5GC-compatible network interface protocol such as carrier Ethernet protocols, or some other suitable protocol. Network connectivity may be provided to/from the gNB 3600 via a fiber optic or wireless backhaul. The CN interface circuitry 3612 may include one or more dedicated processors or FPGAs to communicate using one or more of the aforementioned protocols. In some implementations, the CN interface circuitry 3612 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include one or more computer-readable media having instructions that, when executed by one or more processors, cause a next generation nodeB (gNB) to determine a remaining minimum system information (RMSI) subcarrier spacing (SCS) for a multiplexing pattern between a synchronization signal/physical broadcast channel block (SSB) and remaining minimum system information (RMSI) to be utilized for transmission to a UE that is to operate in millimeter wave (mmWave), determine a SSB SCS for the multiplexing pattern, determine that the SSB SCS is less than the RMSI SCS, determine a number of symbols of the multiplexing pattern to be utilized for the RMSI based on the SSB SCS being less than the RMSI SCS, and provide an indication of the number of symbols to the UE.

Example 2 may include the one or more computer-readable media of example 1, wherein the indication is to be provided via a physical broadcast channel (PBCH) or a downlink control information (DCI) field in a control resource set (CORESET) #0.

Example 3 may include the one or more computer-readable media of example 1 or example 2, wherein to provide the indication of the number of symbols includes to provide an indication of a time domain resource allocation (TDRA) table that indicates the number of symbols.

Example 4 may include the one or more computer-readable media of example 3, wherein the indication of the TDRA table is to be provided via a physical broadcast channel (PBCH) or a downlink control information (DCI) field in a control resource set (CORESET) #0.

Example 5 may include the one or more computer-readable media of example 3, wherein the TDRA table includes a two-bit multiplication factor, wherein a length in a TDRA field is to be multiplied by the two-bit multiplication factor.

Example 6 may include the one or more computer-readable media of example 1 or example 2, wherein the instructions, when executed by the one or more processors, further cause the gNB to determine a use for excess RMSI orthogonal frequency division multiplexing (OFDM) symbols of the multiplexing pattern due to the value of the SSB SCS being less than the value of the RMSI SCS.

Example 7 may include the one or more computer-readable media of example 6, wherein to determine the use for the excess RMSI OFDM symbols includes to determine to utilize the excess RMSI OFDM symbols for RMSI payload increase.

Example 8 may include the one or more computer-readable media of example 7, wherein the excess RMSI OFDM symbols are utilized to increase an RMSI payload for the multiplexing pattern to four OFDM symbols for the RMSI payload increase.

Example 9 may include the one or more computer-readable media of example 6, wherein to determine the use for the excess RMSI OFDM symbols includes to reduce a number of physical resource blocks within the excess RMSI OFDM symbols or perform RMSI repetition.

Example 10 may include the one or more computer-readable media of example 1 or example 2, wherein to determine the number of symbols includes to determine that regions of the RMSI that are non-overlapping with the SSB are to be utilized for transmission of garbage/unspecified signals, repetition of the RMSI, or longer RMSI.

Example 11 may include one or more computer-readable media having instructions that, when executed by one or more processors, cause a user equipment (UE) to identify an indication of a number of remaining minimum system information (RMSI) symbols for a multiplexing pattern between a synchronization signal/physical broadcast channel block (SSB) and RMSI that is to operate in millimeter wave (mmWave), identify a SSB and RMSI transmission having the multiplexing pattern from a next generation NodeB (gNB), and process the SSB and RMSI transmission based on the number of RMSI symbols.

Example 12 may include the one or more computer-readable media of example 11, wherein to identify the indication includes to identify the indication of the number of RMSI symbols transmitted from the gNB via a physical broadcast channel (PBCH) or a downlink control information (DCI) field in a control resource set (CORESET) #0.

Example 13 may include the one or more computer-readable media of example 11, wherein to identify the indication includes to identify the indication of the number of RMSI symbols in a time domain resource allocation (TDRA) table.

Example 14 may include the one or more computer-readable media of example 13, wherein the TDRA table includes a multiplication factor, and wherein a length in a TDRA field of the TDRA table is to be multiplied by the multiplication factor to produce the indication of the number of RMSI symbols.

Example 15 may include the one or more computer-readable media of any of examples 11-14, wherein to identify the indication includes to identify the indication of the number of RMSI symbols in a memory of the UE.

Example 16 may include a next generation NodeB (gNB) comprising a memory to store remaining minimum system information (RMSI) for transmission to a user equipment within a multiplexing pattern between a synchronization signal/physical broadcast channel block (SSB) and RMSI for operation in millimeter wave (mmWave), and one or more processors coupled to the memory to determine a SSB subcarrier spacing (SCS) and a RMSI SCS for the multiplexing pattern, determine that the SSB SCS is less than the RMSI SCS, and determine a use for excess symbols of the multiplexing pattern due to the SSB SCS being less than the RMSI SCS.

Example 17 may include the gNB of example 16, wherein to determine the use for the excess symbols includes to determine to use the excess symbols for RMSI payload, reduction of resource blocks within symbols of the multiplexing pattern, or RMSI repetition.

Example 18 may include the gNB of example 17, wherein the one or more processors are further to determine a number of symbols to be utilized for the RMSI based on the RMSI SCS.

Example 19 may include the gNB of example 18, wherein the one or more processors are further to provide an indication of the number of symbols via a physical broadcast channel (PBCH) or a downlink control information (DCI) field in a control resource set (CORESET) #0.

Example 20 may include the gNB of example any of examples 16-19, wherein the multiplexing pattern has a RMSI control resource set (CORESET) that is to begin transmission at a same time as the SSB, and wherein transmission of the RMSI CORESET and the RMSI is to finish before transmission of the SSB is to finish.

Example 21 may include one or more computer-readable media having instructions that, when executed by one or more processors, cause a next generation nodeB (gNB) to determine a value of a synchronization signal/physical broadcast channel block (SSB) subcarrier spacing (SCS) for a multiplexing pattern between a SSB and remaining minimum system information (RMSI) to operate between 52.26 gigahertz (GHz) and 71 GHz, determine a value of an RMSI SCS for the multiplexing pattern, determine whether the value of the SSB SCS is equal to the value of the RMSI SCS, determine that the multiplexing pattern is to utilize a resource block (RB) size of 24, 36, 48, 60, 72, 84, 96, or 192 RBs for an RMSI payload when the value of the SSB SCS is different from the value of the RMSI SCS, and include a multiplexing pattern 3 with a one, two, or three symbol control resource set (CORESET) and a two or three symbol physical downlink shared channel (PDSCH) or a multiplexing pattern 2 with a one or two symbol CORESET and a four symbol PDSCH when the value of the SSB SCS is equal to the value of the RMSI SCS, and transmit, to a user equipment (UE), the determined multiplexing pattern to be utilized for SSB and RMSI transmissions to the UE.

Example 22 may include the one or more computer-readable media of example 21, wherein to determine whether the value of the SSB SCS is equal to the value of the RMSI SCS includes to determine that the SSB SCS is different from the value of the RMSI SCS, and determine the multiplexing pattern includes to determine that the multiplexing pattern is to utilize an RB size of 48, 96, or 192 RBs within a multiplexing pattern 3 with a one symbol CORESET and a one symbol RMSI.

Example 23 may include the one or more computer-readable media of example 21, wherein to determine whether the value of the SSB SCS is equal to the value of the RMSI SCS includes to determine that the SSB SCS is different from the value of the RMSI SCS, and determine the multiplexing pattern includes to determine that the multiplexing pattern is to utilize an RB size of 36, 60, 72, 84, or 96 RBs within a multiplexing pattern 2.

Example 24 may include the one or more computer-readable media of any of examples 21-23, wherein the multiplexing pattern 3 has a PDSCH duration of three or six symbols.

Example 25 may include the one or more computer-readable media of any of examples 21-23, wherein the multiplexing pattern 3 utilizes an RB size of 36, 60, 72, 84, or 96 RBs.

Example 26 may include the one or more computer-readable media of any of examples 21-23, wherein the multiplexing pattern 2 utilizes an RB size of 36, 60, 72, 84, or 96 RBs.

Example 27 may include the one or more computer-readable media of any of examples 21-23, wherein the multiplexing pattern 3 is to have the one symbol CORESET transmitted in a same frequency range and at an earlier time than the two or three symbol PDSCH, and the one symbol CORESET and the two or three symbol PDSCH in transmitted in a different frequency range and at a same time as SSBs of the multiplexing pattern 3.

Example 28 may include the one or more computer-readable media of any of examples 21-23, wherein the multiplexing pattern 2 is to have the one or two symbol CORESET transmitted in a same frequency range and at an earlier time than the four symbol PDSCH, the one or two symbol CORESET transmitted in a different frequency range and at an earlier time than SSBs of the multiplexing pattern 2, and the four symbol PDSCH transmitted in a different frequency range and at a same time as the SSBs of the multiplexing pattern 2.

Example 29 may include the one or more computer-readable media of example 28, wherein the one or two symbol CORESET of the multiplexing pattern 2 is to be transmitted directly prior in time to the four symbol PDSCH.

Example 30 may include one or more computer-readable media having instructions that, when executed by one or more processors, cause a user equipment (UE) to identify a multiplexing pattern between a synchronization signal/physical broadcast channel block (SSB) and remaining minimum system information (RMSI) for operation between 52.26 gigahertz (GHz) and 71 GHz from a next generation NodeB (gNB), the multiplexing pattern comprising a pattern 2 multiplexing pattern with a one or two symbol control resource set (CORESET) and a four symbol physical downlink shared channel (PDSCH), a pattern 2 multiplexing pattern having a 36, 60, 72, 84, or 96 resource block (RB) size, a pattern 3 multiplexing pattern with a one, two, or three symbol CORESET and a two or three symbol PDSCH, or a pattern 3 multiplexing pattern having a 48, 96, or 192 RB size, identify a SSB and RMSI transmission from the gNB, and process the SSB and RMSI transmission according to the multiplexing pattern received from the gNB.

Example 31 may include the one or more computer-readable media of example 30, wherein the pattern 2 multiplexing pattern with the one or two symbol CORESET and the four symbol PDSCH is to be utilized when a value of SSB subcarrier spacing (SCS) is equal to a value of RMSI SCS.

Example 32 may include the one or more computer-readable media of example 30, wherein the pattern 2 multiplexing pattern having the 36, 60, 72, 84, or 96 RB size is to be utilized when a value of SSB subcarrier spacing (SCS) is different than a value of RMSI SCS.

Example 33 may include the one or more computer-readable media of example 30, wherein the pattern 3 multiplexing pattern with the one, two, or three symbol CORESET and the two or three symbol PDSCH is to be utilized when a value of SSB subcarrier spacing (SCS) is equal to a value of RMSI SCS.

Example 34 may include the one or more computer-readable media of example 30, wherein the pattern 3 multiplexing pattern having the 48, 96, or 192 RB size is to be utilized when a value of SSB subcarrier spacing (SCS) is different than a value of RMSI SCS.

Example 35 may include the one or more computer-readable media of any of examples 30-34, wherein the pattern 2 multiplexing pattern with the one or two symbol CORESET and the four symbol PDSCH is to have up to three symbols between the one or two symbol CORESET and the four symbol PDSCH.

Example 36 may include the one or more computer-readable media of any of examples 30-34, wherein the pattern 3 multiplexing pattern having the 48, 96, or 192 RB size has a one symbol CORESET and a 1 symbol RMSI.

Example 37 may include a next generation nodeB (gNB) comprising a memory to store a selected multiplexing pattern between a synchronization signal/physical broadcast channel block (SSB) and remaining minimum system information (RMSI) for operation between 52.26 gigahertz (GHz) and 71 GHz, and one or more processors coupled to the memory to select the selected multiplexing pattern from a pattern 2 multiplexing pattern with a one or two symbol control resource set (CORESET) and a four symbol physical downlink shared channel (PDSCH), and up to three symbols between SSB blocks, a pattern 3 multiplexing pattern with a one, two, or three symbol CORESET and a two or three symbol PDSCH, and a PDSCH duration of three or six symbols, a pattern 2 multiplexing pattern with a number of resource blocks (RBs) for a CORESET being equal to 24 or 48 and a two symbol RMSI, and a pattern 3 multiplexing pattern with a one symbol CORESET and a one symbol RMSI, store the selected multiplexing pattern in the memory, and provide the selected multiplexing pattern to a user equipment.

Example 38 may include the gNB of example 37, wherein to select the selected multiplexing pattern includes to determine that a value of SSB subcarrier spacing (SCS) is equal to a value of RMSI SCS, and select from the pattern 2 multiplexing pattern with the one or two symbol CORESET and the four symbol PDSCH, and the pattern 3 multiplexing pattern with the one, two, or three symbol CORESET and the two or three symbol PDSCH.

Example 39 may include the gNB of example 37, wherein to select the selected multiplexing pattern includes to determine that a value of SSB subcarrier spacing (SCS) is different from a value of RMSI SCS, and select from the pattern 2 multiplexing pattern with the number of RBs for the CORESET being equal to 24 or 48 and the two symbol RMSI, and the pattern 3 multiplexing pattern with the one symbol CORESET and the one symbol RMSI.

Example 40 may include the gNB of any of examples 37-39, wherein the pattern 2 multiplexing pattern with the one or two symbol CORESET and four symbol PDSCH, the pattern 3 multiplexing pattern with the one or two symbol CORESET and the two or three symbol PDSCH, and the pattern 2 multiplexing pattern with a number of RBs for the CORESET being equal to 24 or 48 and the two symbol RMSI have an RMSI payload of 36, 60, 72, 84, or 96 RBs, and the pattern 3 multiplexing pattern with the one symbol CORESET and the one symbol RMSI has an RMSI payload of 48, 96, or 192 RBs.

Example 61 may include a method comprising performance of the operations of any of examples 1-40.

Example 62 may include an apparatus comprising means to perform one or more elements of any of examples 1-40.

Example 63 may include a signal as described in or related to any of examples 1-40, or portions or parts thereof.

Example 64 may include a datagram, information element, packet, frame, segment, PDU, or message as described in or related to any of examples 1-40, or portions or parts thereof, or otherwise described in the present disclosure.

Example 65 may include a signal encoded with data as described in or related to any of examples 1-40, or portions or parts thereof, or otherwise described in the present disclosure.

Example 66 may include a signal encoded with a datagram, IE, packet, frame, segment, PDU, or message as described in or related to any of examples 1-40, or portions or parts thereof, or otherwise described in the present disclosure.

Example 67 may include an electromagnetic signal carrying computer-readable instructions, wherein execution of the computer-readable instructions by one or more processors is to cause the one or more processors to perform the method, techniques, or process as described in or related to any of examples 1-40, or portions thereof.

Example 68 may include a signal in a wireless network as shown and described herein.

Example 69 may include a method of communicating in a wireless network as shown and described herein.

Example 70 may include a system for providing wireless communication as shown and described herein.

Example 71 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:

determining a value of a synchronization signal/physical broadcast channel block (SSB) subcarrier spacing (SCS) for a multiplexing pattern between an SSB and remaining minimum system information (RMSI) to operate between 52.6 gigahertz (GHz) and 71 GHz;

determining a value of an RMSI SCS for the multiplexing pattern;

determining whether the value of the SSB SCS is equal to the value of the RMSI SCS;

determining that the multiplexing pattern includes a first multiplexing pattern with a one, two, or three symbol control resource set (CORESET) or a second multiplexing pattern with a one or two symbol CORESET when the value of the SSB SCS is equal to the value of the RMSI SCS; and generating a message, for transmission to a user equipment (UE), including an indication of the multiplexing pattern to be utilized for SSB and RMSI transmissions to the UE.

2. The method of claim 1, wherein:

determining whether the value of the SSB SCS is equal to the value of the RMSI SCS includes determining that the value of the SSB SCS is equal to the value of the RMSI SCS; and determining that the multiplexing pattern includes the first multiplexing pattern or the second multiplexing pattern includes determining that the multiplexing pattern includes a multiplexing pattern 3 with the one, two, or three symbol CORESET based at least in part on the value of the SSB SCS being equal to the value of the RMSI SCS.

3. The method of claim 2, wherein the one, two, or three symbol CORESET comprises a two symbol CORESET.

4. The method of claim 2, wherein the multiplexing pattern 3 utilizes a resource block (RB) size of 24 or 48 RBs.

5. The method of claim 2, wherein the multiplexing pattern 3 has offset resource blocks of 24 or 48.

6. The method of claim 2, wherein the multiplexing pattern 3 has offset resource blocks of −20 if $k_{SSB}$=0 or −21 if $k_{SSB}$>0.

7. The method of claim 2, wherein the multiplexing pattern 3 has a physical downlink shared channel (PDSCH) duration of three or six symbols.

8. A method comprising:

identifying a multiplexing pattern between a synchronization signal/physical broadcast channel block (SSB) and remaining minimum system information (RMSI) for operation between 52.6 gigahertz (GHz) and 71

GHz from a base station, the multiplexing pattern comprising a first multiplexing pattern with a one or two symbol control resource set (CORESET) and a four symbol physical downlink shared channel (PDSCH), a second multiplexing pattern having a 36, 60, 72, 84, or 96 resource block (RB) size, a third multiplexing pattern with a one, two, or three symbol CORESET, or a fourth multiplexing pattern having a 48, 96, or 192 RB size;

identifying an SSB and RMSI transmission from the base station; and processing the SSB and RMSI transmission according to the multiplexing pattern received from the base station.

9. The method of claim 8, wherein identifying the multiplexing pattern includes determining that a value of an SSB subcarrier spacing (SCS) of the multiplexing pattern is equal to a value of a RMSI SCS of the multiplexing pattern, and wherein the method further comprises:

determining a value of an SSB SCS spacing for the SSB and RMSI transmission is equal to a value of a RMSI SCS of the SSB and RMSI transmission, wherein the SSB and RMSI transmission is processed according to the multiplexing pattern based at least in part on the value of the SSB SCS spacing for the SSB and RMSI transmission being equal to the value of the RMSI SCS of the SSB and RMSI transmission.

10. The method of claim 8, wherein the third multiplexing pattern includes a pattern 3 multiplexing pattern, and wherein the multiplexing pattern comprises the pattern 3 multiplexing pattern with the one, two, or three symbol CORESET.

11. The method of claim 10, wherein the one, two, or three symbol CORESET comprises a two symbol CORESET.

12. The method of claim 10, wherein the pattern 3 multiplexing pattern utilizes a resource block (RB) size of 24 or 48 RBs.

13. The method of claim 10, wherein the pattern 3 multiplexing pattern has offset resource blocks of 24 or 48.

14. The method of claim 10, wherein the pattern 3 multiplexing pattern has offset resource blocks of −20 if $k_{SSB}$=0 or −21 if $k_{SSB}$>0.

15. A method comprising:

selecting a selected multiplexing pattern between a synchronization signal/physical broadcast channel block (SSB) and remaining minimum system information (RMSI) for operation between 52.6 gigahertz (GHz) and 71 GHz, the selected multiplexing pattern selected from:

a first multiplexing pattern with a one or two symbol control resource set (CORESET) and a four symbol physical downlink shared channel (PDSCH), and up to three symbols between SSB blocks;

a second multiplexing pattern with a one, two, or three symbol CORESET;

a third multiplexing pattern with a number of resource blocks (RBs) for a CORESET being equal to 24 or 48 and a two symbol RMSI; and a fourth multiplexing pattern with a one symbol CORESET and a one symbol RMSI;

storing the selected multiplexing pattern; and providing the selected multiplexing pattern to a user equipment.

16. The method of claim 15, wherein the second multiplexing pattern includes a pattern 3 multiplexing pattern, and wherein the method further comprises determining that a value of an SSB subcarrier spacing (SCS) for the SSB and the RMSI is equal to a value of an RMSI SCS for the SSB and the RMSI, wherein the pattern 3 multiplexing pattern with the one, two, or three symbol CORESET is selected based at least in part on the value of an SSB subcarrier spacing (SCS) being equal to the value of an RMSI SCS.

17. The method of claim 16, wherein the one, two, or three symbol CORESET comprises a two symbol CORESET.

18. The method of claim 16, wherein the pattern 3 multiplexing pattern with the one, two, or three symbol CORESET utilizes a resource block (RB) size of 24 or 48 RBs.

19. The method of claim 16, wherein the pattern 3 multiplexing pattern with the one, two, or three symbol CORESET has offset resource blocks of 24 or 48.

20. The method of claim 16, wherein the pattern 3 multiplexing pattern with the one, two, or three symbol CORESET has offset resource blocks of –20 if $k_{SSB}$=0 or –21 if $k_{SSB}$>0.

* * * * *